(12) United States Patent
Ezoe et al.

(10) Patent No.: US 9,810,821 B2
(45) Date of Patent: Nov. 7, 2017

(54) INFRARED RAY CUTOFF FILTER

(71) Applicant: FUJIFILM Corporation, Tokyo (JP)

(72) Inventors: Toshihide Ezoe, Shizuoka (JP); Kazuto Shimada, Shizuoka (JP); Shinichiro Sonoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 14/735,330

(22) Filed: Jun. 10, 2015

(65) Prior Publication Data
US 2015/0277002 A1    Oct. 1, 2015

Related U.S. Application Data

(63) Continuation of application No. PCT/JP2013/084756, filed on Dec. 25, 2013.

(30) Foreign Application Priority Data

Dec. 28, 2012  (JP) .................................. 2012-288697
Dec. 25, 2013  (JP) .................................. 2013-267582

(51) Int. Cl.
*F21V 9/04* (2006.01)
*G02B 5/20* (2006.01)
*B32B 7/02* (2006.01)
(Continued)

(52) U.S. Cl.
CPC ................. *G02B 5/208* (2013.01); *B32B 7/02* (2013.01); *B32B 27/08* (2013.01); *B32B 27/20* (2013.01);
(Continued)

(58) Field of Classification Search
CPC ..... G02B 5/003; G02B 5/0816; G02B 5/0825; G02B 5/0841; G02B 5/20; G02B 5/208;
(Continued)

(56) References Cited

U.S. PATENT DOCUMENTS 5,243,255 A * 9/1993 Iwasaki ................... C03C 17/22
                                                            313/112
2008/0129174 A1* 6/2008 Schafer ................... G02B 5/281
                                                            313/112
(Continued)

FOREIGN PATENT DOCUMENTS

JP    2005-144849 A    6/2005
JP    2005-345680 A    12/2005
(Continued)

OTHER PUBLICATIONS

Communication from the State Intellectual Property Office of P.R. China dated May 23, 2016 in a counterpart Chinese application No. 201380068176.4.
(Continued)

*Primary Examiner* — Arnel C Lavarias
(74) *Attorney, Agent, or Firm* — Sughrue Mion, PLLC

(57)    ABSTRACT

An infrared ray cutoff filter including two or more high refractive index layers with a refractive index ranging from 1.65 to 2.00 and two or more low refractive index layers with a refractive index ranging from 1.20 to 1.45. At least one layer of the two or more high refractive index layers and the two or more low refractive index layers contains a dye having a maximum absorption wavelength in a range of 600 nm to 820 nm, and the two or more low refractive index layers are a plurality of kinds of layers which have different film thickness within a range of 50 nm to 250 nm.

10 Claims, 2 Drawing Sheets

(51) Int. Cl.

| | | |
|---|---|---|
| *C08L 101/12* | (2006.01) | |
| *G02B 5/22* | (2006.01) | |
| *G02B 5/28* | (2006.01) | |
| *C09D 5/33* | (2006.01) | |
| *C09D 183/04* | (2006.01) | |
| *B32B 27/08* | (2006.01) | |
| *B32B 27/20* | (2006.01) | |
| *B32B 27/28* | (2006.01) | |
| *C08K 3/22* | (2006.01) | |
| *C08K 5/16* | (2006.01) | |
| *C08K 5/3417* | (2006.01) | |
| *G02B 1/04* | (2006.01) | |
| *H04N 9/04* | (2006.01) | |
| *C08K 5/00* | (2006.01) | |

(52) U.S. Cl.
CPC .............. *B32B 27/283* (2013.01); *C08K 3/22* (2013.01); *C08K 5/16* (2013.01); *C08K 5/3417* (2013.01); *C08L 101/12* (2013.01); *C09D 5/004* (2013.01); *C09D 183/04* (2013.01); *G02B 1/04* (2013.01); *G02B 5/223* (2013.01); *G02B 5/282* (2013.01); *H04N 9/045* (2013.01); *B32B 2264/102* (2013.01); *B32B 2307/4026* (2013.01); *B32B 2307/418* (2013.01); *B32B 2457/00* (2013.01); *C08K 5/0041* (2013.01); *C08K 2003/2241* (2013.01)

(58) Field of Classification Search
CPC . G02B 5/22; G02B 5/223; G02B 5/28; G02B 5/281; G02B 5/282; G02B 5/285; G02B 5/286; G02B 5/287; G03B 7/18; G03B 11/00; G03B 17/12
USPC ....... 359/359, 350, 577, 580, 584, 586, 588, 359/589, 590, 885, 888, 892; 396/275
See application file for complete search history.

(56) References Cited

U.S. PATENT DOCUMENTS

| | | | |
|---|---|---|---|
| 2012/0008024 A1 | 1/2012 | Takimoto | |
| 2014/0055652 A1 | 2/2014 | Hasegawa et al. | |
| 2016/0334649 A1* | 11/2016 | Merrill ................... | G02B 5/285 |

FOREIGN PATENT DOCUMENTS

| | | |
|---|---|---|
| JP | 2009-024150 A | 2/2009 |
| JP | 2009-86659 A | 4/2009 |
| JP | 2012-18951 A | 1/2012 |
| JP | 2012-028620 A | 2/2012 |
| JP | 2012-139948 A | 7/2012 |
| JP | 2012-185385 A | 9/2012 |
| JP | 2012-237888 A | 12/2012 |
| JP | 2012-255128 A | 12/2012 |
| JP | 2014-025016 A | 2/2014 |
| JP | 2014-63144 A | 4/2014 |

OTHER PUBLICATIONS

Notification of Transmittal of translation of the International Preliminary Report on Patentability for PCT/JP2013/084756 dated Jul. 9, 2015 [PCT/IB/338].
International Preliminary Report on Patentability for PCT/JP2013/084756 dated Jun. 30, 2015 [PCT/IB/373].
English translation of the Written Opinion for PCT/JP2013/084756 dated Apr. 1, 2014 [PCT/ISA/237].
Office Action dated Dec. 8, 2015, by the Japanese Patent Office in counterpart Japanese Application No. 2013-267582.
International Search Report for PCT/JP2013/084756 dated Apr. 1, 2014 [PCT/ISA/210].
Written Opinion for PCT/JP2013/084756 dated Apr. 1, 2014 [PCT/ISA/237].
Communication dated Aug. 9, 2016, issued by the Japanese Intellectual Property Office in counterpart Japanese Application No. 2013-267582.
Office Action dated Aug. 22, 2016, issued by the Korean Intellectual Property Office in counterpart Korean Application No. 10-2015-7016225.
Office Action dated Apr. 4, 2017, issued by the Japanese Patent Office in counterpart Japanese Application No. 2013-267582.
Communication dated Dec. 9, 2015 issued by the European Patent Office in counterpart European Patent Application No. 13867254.8.
Chunfei Li et al; "Dynamic and steady-state behaviors of reverse saturable absorption in metallophthalocyanine" Physical Review A; Feb. 1994; vol. 49; No. 2; XP-002751454; 9 pgs. total.

* cited by examiner

INFRARED RAY CUTOFF FILTER

CROSS REFERENCE TO RELATED APPLICATIONS

This is a continuation of International Application No. PCT/JP2013/084756 filed on Dec. 25, 2013, and claims priority from Japanese Patent Application Nos. 2012-288697 filed on Dec. 28, 2012, and 2013-267582 filed on Dec. 25, 2013, the entire disclosures of which are incorporated herein by reference.

BACKGROUND

1. Technical Field

The present invention relates to a curable resin composition, an infrared ray cutoff filter and a solid-state imaging device using the same.

2. Background Art

A CCD or CMOS image sensor, which is a solid-state imaging device for a color image, is used in, for example, a video camera, a digital still camera, or a mobile phone mounted with a camera function. Such a solid-state imaging device employs a silicon photodiode in its light receiving portion, the silicon photodiode having a sensitivity to near infrared rays. Thus, the solid-state imaging device is required to perform a visibility correction, and thus employs an infrared ray cutoff filter (see, e.g., Japanese Patent Application Laid-Open No. 2012-28620).

As for such an infrared ray cutoff filter, a dielectric multilayer film-using type filter, and an infrared absorbing agent-using type filter are known.

As for the dielectric multilayer film-using type infrared ray cutoff filter, for example, an infrared ray cutoff filter using a blue glass substrate as a base material is known.

Also, as for the infrared absorbing agent-using type filter, an infrared ray cutoff filter of which most of constituent materials are made of glass is mainly known.

For example, Japanese Patent Application Laid-Open No. 2012-185385 discloses a near infrared ray absorbing filter which employs a specific copper complex.

The dielectric multilayer film described above is known to have an infrared reflectivity, and has conventionally been formed by vapor deposition. However, the vapor deposition requires a high temperature of, for example, 250° C. For example, when in manufacturing a solid-state imaging device, a dielectric multilayer film is formed on a substrate having a color filter layer, there has been a problem in that a color filter layer may be denatured or degraded by vapor deposition. Therefore, it has been studied to form a functional layer having an infrared reflectivity without depending on vapor deposition.

Also, a blue glass substrate used in the above described dielectric multilayer film-using type infrared ray cutoff filter is known to have a near infrared ray absorbing ability.

However, the blue glass substrate is fragile, and for example, when an infrared ray cutoff filter employing the blue glass substrate is used in manufacturing the solid-state imaging device, there has been a problem such as degradation of production suitability in that, for example, dicing cannot be performed.

Therefore, it has been studied to develop an infrared ray cutoff filter having an infrared reflective film not formed by vapor deposition, which does not use a blue glass substrate, but has a near infrared ray and infrared ray shielding property equal to or greater than a case where the blue glass substrate is used.

Also, when the surface of a substrate of a solid-state imaging device is opposite to an infrared ray cutoff filter across a space, incident angle dependence of light received by the solid-state imaging device may be increased, thereby causing a problem of color shading.

An object of the present invention is to provide a curable resin composition capable of forming an infrared ray cutoff filter which has a near infrared light shielding property, and an infrared light shielding property without vapor deposition, and the infrared ray cutoff filter obtained therefrom.

Also, by using the curable resin composition, the infrared ray cutoff filter, and the surface of the substrate in the solid-state imaging device may be brought into close contact with each other with no intervening space, and thus an object of the present invention is to provide a solid-state imaging device with a suppressed color-shading.

SUMMARY

The above described problems were solved by the following means.

[1] A curable resin composition containing a dye having a maximum absorption wavelength in a range of 600 nm to 820 nm, and capable of forming a high refractive index layer with a refractive index ranging from 1.65 to 2.00.

[2] A curable resin composition containing a dye having a maximum absorption wavelength in a range of 600 nm to 820 nm, and capable of forming a low refractive index layer with a refractive index ranging from 1.20 to 1.45.

[3] The curable resin composition described in [1], in which the curable resin composition capable of forming the high refractive index layer contains metal oxide particles, a binder and a dispersant.

[4] The curable resin composition described in [2], in which the curable resin composition capable of forming the low refractive index layer contains a siloxane resin.

[5] The curable resin composition described in any one of [1] to [4], in which the dye having a maximum absorption wavelength in a range of 600 nm to 820 nm is at least one kind selected from the group consisting of a cyanine dye, a phthalocyanine dye, an aminium dye, an iminium dye, an azo dye, an anthraquinone dye, a diimonium dye, a squarylium dye, a porphyrin dye and a copper complex.

[6] An infrared ray cutoff filter having two or more high refractive index layers with a refractive index ranging from 1.65 to 2.00, and two or more low refractive index layers with a refractive index ranging from 1.20 to 1.45, in which at least one layer of the two or more high refractive index layers and the two or more low refractive index layers contains a dye having a maximum absorption wavelength in a range of 600 nm to 820 nm.

[7] The infrared ray cutoff filter described in [6], in which the high refractive index layers and the low refractive index layers are alternately laminated.

[8] The infrared ray cutoff filter described in [6] or [7], in which the two or more high refractive index layers are a plurality of kinds of layers which have different refractive indexes within a range of 1.65 to 2.00.

[9] The infrared ray cutoff filter described in any one of [6] to [8], in which the two or more high refractive index layers are a plurality of kinds of layers which have different film thicknesses within a range of 50 nm to 250 nm.

[10] The infrared ray cutoff filter described in any one of [6] to [9], in which the two or more low refractive index layers are a plurality of kinds of layers which have different refractive indexes within a range of 1.20 to 1.45.

[11] The infrared ray cutoff filter described in any one of [6] to [10], in which the two or more low refractive index layers are a plurality of kinds of layers which have different film thicknesses within a range of 50 nm to 250 nm.

[12] The infrared ray cutoff filter described in any one of [6] to [11], in which a number of laminations of the two or more high refractive index layers and the two or more low refractive index layers ranges from 4 to 60.

[13] A solid-state imaging device having the infrared ray cutoff filter described in any one of [6] to [12], on a substrate.

[14] The solid-state imaging device described in [13], in which the substrate has a color filter layer.

According to the present invention, it is possible to provide a curable resin composition capable of forming an infrared ray cutoff filter which has a near infrared light shielding property, and an infrared light shielding property without vapor deposition, and the infrared ray cutoff filter obtained using the same.

According to the present invention, by using the curable resin composition, the infrared ray cutoff filter, and the surface of the substrate in the solid-state imaging device may be brought into close contact with each other with no intervening space, and thus the solid-state imaging device with a suppressed color-shading may be provided.

DETAILED DESCRIPTION OF EXEMPLARY EMBODIMENTS

In representing a group (atomic group) in the present specification, the representation which does not describe the substitution and unsubstitution also includes having substituents along with having no substituent. For example, "an alkyl group" includes not only an alkyl group having no substituent (an unsubstituted alkyl group) but also an alkyl group having a substituent (a substituted alkyl group). Also, in the present specification, a viscosity value indicates a value at 25° C.

The present invention relates to a curable resin composition which contains a dye having a maximum absorption wavelength in a range of 600 nm to 820 nm, and is capable of forming a high refractive index layer with a refractive index ranging from 1.65 to 2.00 (hereinafter, also referred to as "curable resin composition for forming a high refractive index layer").

Also, the present invention relates to a curable resin composition which contains a dye having a maximum absorption wavelength in a range of 600 nm to 820 nm, and is capable of forming a low refractive index layer with a refractive index ranging from 1.20 to 1.45 (hereinafter, also referred to as "curable resin composition for forming a low refractive index layer").

Figure 1:
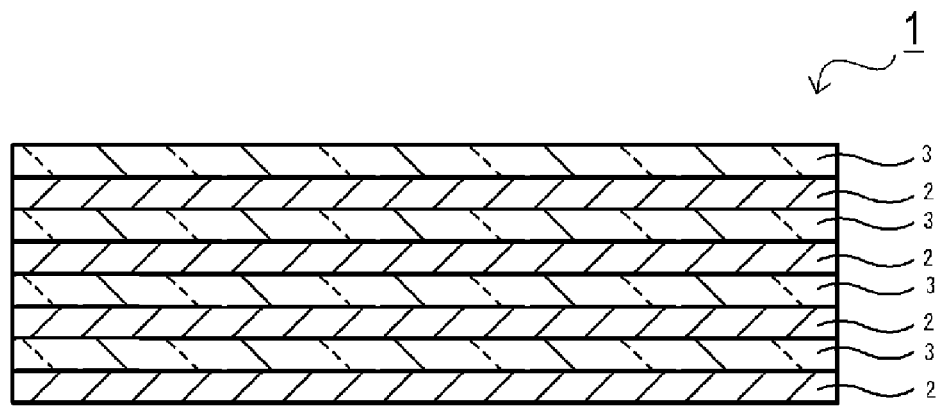
FIG. 1 is a schematic cross-sectional view of an infrared ray cutoff filter of the present invention.

FIG. 1 is a schematic cross-sectional view of an infrared ray cutoff filter of the present invention.

Also, the present invention relates to an infrared ray cutoff filter 1 as illustrated in FIG. 1 which includes two or more high refractive index layers 2 with a refractive index ranging from 1.65 to 2.00, and two or more low refractive index layers 3 with a refractive index ranging from 1.20 to 1.45, in which at least one layer of the respective layers contains a dye having a maximum absorption wavelength in a range of 600 nm to 820 nm.

In the infrared ray cutoff filter of the present invention, a layer containing a dye having a maximum absorption wavelength in a range of 600 nm to 820 nm may be only a high refractive index layer with a refractive index ranging from 1.65 to 2.00, which is formed by the curable resin composition for forming the high refractive index layer, or only a high refractive index layer with a refractive index ranging from 1.65 to 2.00, which is formed by the curable resin composition for forming the low refractive index layer.

In the present invention, the curable resin composition may be either only a thermosetting resin composition or only a photocurable resin composition.

A high refractive index layer formed by the curable resin composition for forming a high refractive index layer has a refractive index of preferably 1.85 or more, and more preferably 1.89 or more. The corresponding refractive index is more preferably 1.95 or less, and further more preferably 1.93 or less. Also, in the present invention, the refractive index refers to a value measured by the measuring method illustrated in Examples below, otherwise specified.

A low refractive index layer formed by the curable resin composition for forming a low refractive index layer has a refractive index of preferably 1.20 or more, and more preferably 1.25 or more. The corresponding refractive index is more preferably 1.40 or less, and further more preferably 1.35 or less.

<Dye Having Maximum Absorption Wavelength in Range of 600 nm to 820 nm>

As described above, the curable resin composition for forming the high refractive index layer or the low refractive index layer, according to the present invention, contains a dye having a maximum absorption wavelength in a range of 600 nm to 820 nm.

Also, in the infrared ray cutoff filter of the present invention, at least one layer among the two or more high refractive index layers and the two or more low refractive index layers, respectively, contains a dye having a maximum absorption wavelength in a range of 600 nm to 820 nm.

There is no particular limitation in the dye having a maximum absorption wavelength in a range of 600 nm to 820 nm, which is used in the present invention, as long as it has a maximum absorption wavelength ($\lambda_{max}$) in a wavelength range of 600 nm to 820 nm. A dye or a copper complex is preferred.

An absorption maximum wavelength in the dye is based on a value obtained from a film with a film thickness of 1 μm by using a spectrophotometer in which the film is obtained by coating a solution prepared by a dye and a resin at a solid content of 20% by mass with respect to a total amount of the solution.

The dye used in the curable resin composition of the present invention is not particularly limited as long as it has a maximum absorption wavelength ($\lambda_{max}$) in a wavelength range of 600 nm to 820 nm. Preferred examples thereof may include at least one kind selected from the group consisting of a cyanine dye, a phthalocyanine dye, a quaterrylene dye, an aminium dye, an iminium dye, an azo dye, an anthraquinone dye, a diimonium dye, a squarylium dye and a porphyrin dye. Among them, a cyanine dye, a phthalocyanine dye, or a quaterrylene dye is preferred, and a cyanine dye, or a phthalocyanine dye is more preferred.

When the maximum absorption wavelength is less than 600 nm, or the maximum absorption wavelength is greater than 820 nm, a shielding property against the near infrared rays with a wavelength of about 700 nm is low. Thus, a satisfactory result cannot be obtained.

It is preferred to have a maximum absorption wavelength in a range of 640 nm to 770 nm, and particularly preferred to have an absorption maximum in a range of 660 nm to 720 nm.

Specific examples of the cyanine dye or the quaterrylene dye may include compounds described in, for example, paragraph 0160 of Japanese Patent Application Laid-Open No. 2012-215806, or paragraph 0021 of Japanese Patent Application Laid-Open No. 2008-009206.

Specific examples of the phthalocyanine compound may include compounds described in Japanese Patent Application Laid-Open No. S60-224589, Japanese National Publication of International Patent Application No. 2005-537319, Japanese Patent Application Laid-Open No. H4-23868, Japanese Patent Application Laid-Open No. H4-39361, Japanese Patent Application Laid-Open No. H5-78364, Japanese Patent Application Laid-Open No. H5-222047, Japanese Patent Application Laid-Open No. H5-222301, Japanese Patent Application Laid-Open No. H5-222302, Japanese Patent Application Laid-Open No. 115-345861, Japanese Patent Application Laid-Open No. H6-25548, Japanese Patent Application Laid-Open No. H6-107663, Japanese Patent Application Laid-Open No. H6-192584, Japanese Patent Application Laid-Open No. H6-228533, Japanese Patent Application Laid-Open No. H7-118551, Japanese Patent Application Laid-Open No. H7-118552, Japanese Patent Application Laid-Open No. H8-120186, Japanese Patent Application Laid-Open No. 118-225751, Japanese Patent Application Laid-Open No. H9-202860, Japanese Patent Application Laid-Open No. 1110-120927, Japanese Patent Application Laid-Open No. H10-182995, Japanese Patent Application Laid-Open No. H11-35838, Japanese Patent Application Laid-Open No. 2000-26748, Japanese Patent Application Laid-Open No. 2000-63691, Japanese Patent Application Laid-Open No. 2001-106689, Japanese Patent Application Laid-Open No. 2004-18561, Japanese Patent Application Laid-Open No. 2005-220060, and Japanese Patent Application Laid-Open No. 2007-169343.

Hereinafter, specific examples of the azo dye, the anthraquinone dye (anthraquinone compound), and the squarylium dye (squarylium compound) may include compounds described in, for example, paragraphs 0114 to 0117, 0128, 0129, and 0177 of Japanese Patent Application Laid-Open No. 2012-215806.

The dyes are available as commercial products, and examples thereof may include Lumogen IR765 and Lumogen IR788 (manufactured by BASF); ABS643, ABS654, ABS667, ABS670T, IRA693N and IRA735 (manufactured by Exciton); SDA3598, SDA6075, SDA8030, SDA8303, SDA8470, SDA3039, SDA3040, SDA3922, and SDA7257 (manufactured by H. W. SANDS); and TAP-15 and IR-706 (manufactured by Yamada Chemical Industries, Ltd.). Particularly, as for the cyanine dye, Daito chemix 1371F (manufactured by Daito Chemical Co., Ltd.) may be exemplified, and as for the phthalocyanine dye, Excolor series, Excolor TX-EX720, and TX-EX708K (manufactured by Nippon Shokubai) may be exemplified, but not limited thereto.

The dye is preferably a fine particle. The average particle diameter of the dye is preferably 800 nm or less, more preferably 400 nm or less, and further preferably 200 nm or less. When the average particle diameter is in such a range, it becomes difficult that the dye shields visible light by light scattering. Thus, a light transmitting property in a visible light region may become more reliable. From the viewpoint of avoiding light scattering, a smaller average particle diameter is preferred. However, due to ease of handling in manufacturing, the average particle diameter of a dye is generally 1 nm or more.

The dye having a maximum absorption wavelength in a range of 600 nm to 820 nm, in the present invention, may be only a copper complex.

The copper complex used in the present invention is not particularly limited as long as it has a maximum absorption wavelength in a wavelength range of 600 nm to 820 nm (in a near infrared ray region). The copper complex is preferably represented by Formula (1) below, and is more preferably a phosphorous-containing copper complex.

$$Cu(L)_n \cdot X \qquad \text{Formula(1)}$$

(In Formula (1) above,

L represents a ligand coordinated to copper,

X may be not present or represents a halogen atom, $H_2O$, $NO_3$, $ClO_4$, $SO_4$, CN, SCN, $BF_4$, $PF_6$, $BPh_4$ (Ph represents a phenyl group) or alcohol. n represents an integer of 1 to 4.)

There is no particular limitation in the ligand L coordinated to copper as long as it can be coordinated to copper ions. It is preferred to have a substituent including an atom capable of coordinating to copper, such as C, N, O, or S, and more preferred to have a group having a lone electron pair such as N, O, or S.

The kinds of the compound for forming the ligand L may include compounds having, for example, phosphoric acid ester, phosphonic acid, phosphonic acid ester, phosphinic acid, carboxylic acid, carbonyl (ester, ketone), amine, amide, sulfonamide, urethane, urea, alcohol, or thiol. Among these, phosphoric acid, phosphoric acid ester, phosphonic acid, phosphonic acid ester, or phosphinic acid is preferred, and specifically, compounds disclosed in No. WO2005/030898 may be used.

Also, the group capable of coordinating is not limited to one kind of group in a molecule, but two or more kinds of groups may be included. The group may be either dissociative or non-dissociative. When the group is non-dissociative, X is not present.

The compound for forming the ligand L used in the present invention is preferably a phosphorous atom-containing compound, and more preferably a compound represented by Formula (2) below.

$$(HO)_n\text{—}P(=O)\text{—}(OR^2)_{3-n} \qquad \text{Formula (2)}$$

(in Formula (2) above, $R^2$ represents an alkyl group having 1 to 18 carbon atoms, a aryl group having 6 to 18 carbon atoms, an aralkyl group having 1 to 18 carbon atoms, or an alkenyl group having 1 to 18 carbon atoms, —$OR^2$ represents a polyoxyalkyl group having 4 to 100 carbon atoms, a (meth)acryloyloxyalkyl group having 4 to 100 carbon atoms, or a (meth)acryloylpolyoxyalkyl group having 4 to 100 carbon atoms, and n represents 1 or 2.)

When n is 1, $R^2$'s each may be the same or different.

Each of a polyoxyalkyl group having 4 to 100 carbon atoms, a (meth)acryloyloxy alkyl group having 4 to 100 carbon atoms, or a (meth)acryloylpolyoxyalkyl group having 4 to 100 carbon atoms may preferably have a carbon number ranging from 4 to 20, and more preferably from 4 to 10.

In the present invention, when n is 1, one of $R^2$ is preferably —$OR^2$ which represents a (meth)acryloyloxyalkyl group having 4 to 100 carbon atoms, or a (meth) acryloyl polyoxyalkyl group having 4 to 100 carbon atoms, and the other is preferably —$OR^2$ described above or an alkyl group.

The molecular weight of the phosphorous atom-containing compound used in the present invention preferably ranges from 300 to 1500, and more preferably from 320 to 900.

As for an infrared ray absorbing material, a phosphorous atom-containing compound (preferably, a phosphoric acid ester copper complex) has a form of copper complex (copper compound) in which phosphoric acid ester is coordinated to copper as a central metal. The copper in the phosphoric acid ester copper complex is divalent copper, and may be produced by reaction between a copper salt and a phosphoric acid ester. Accordingly, in an "infrared ray absorbing composition containing a copper and a phosphoric acid ester compound," it is assumed that a phosphoric acid copper complex is formed in the composition.

Specific examples of the compound for forming the ligand may include the compounds (A-1) to (A-219) exemplified below.

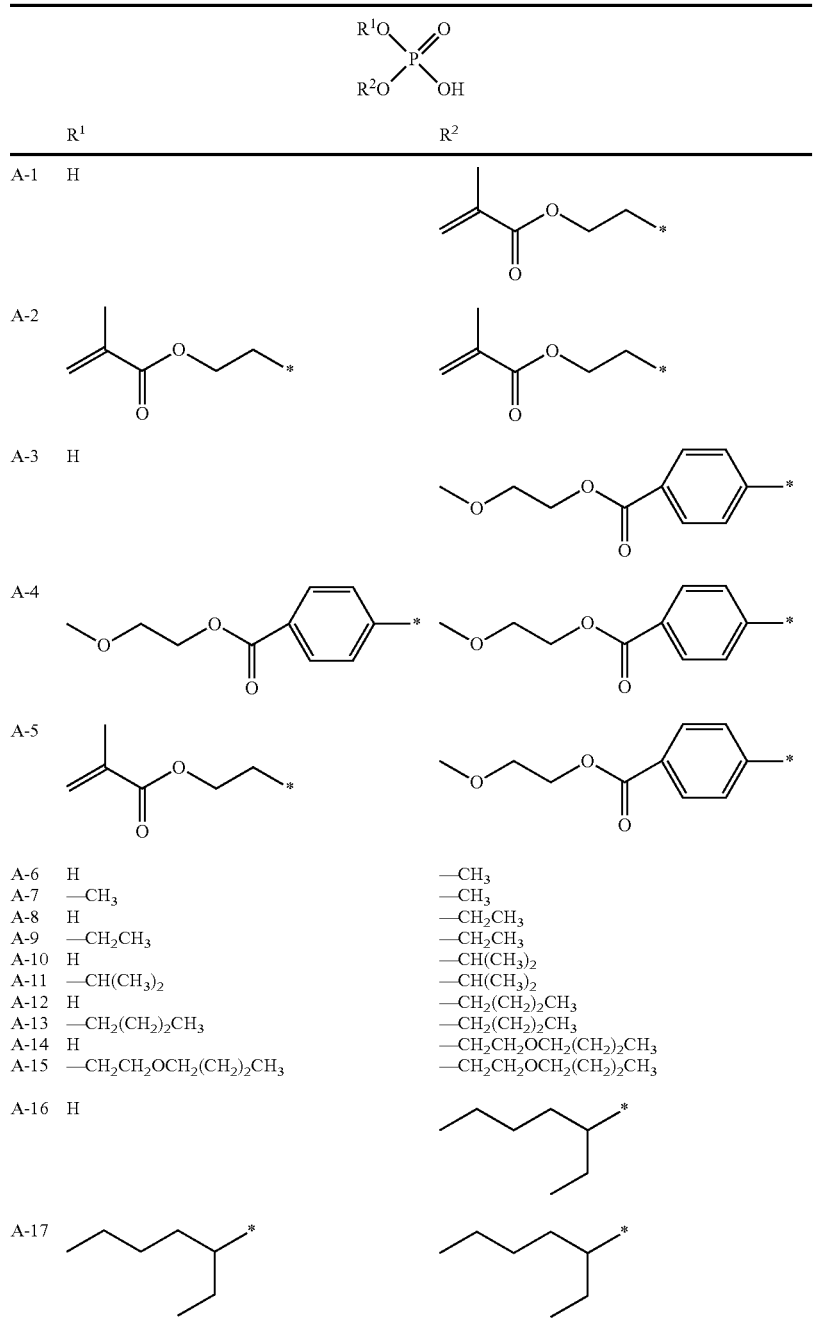

TABLE 1

TABLE 1-continued $$\begin{array}{c} R^1O \\ R^2O \end{array} \!\!\! P \!\!\! \begin{array}{c} O \\ OH \end{array}$$

| | R¹ | R² |
|---|---|---|
| A-18 | H | —CH$_2$(CH$_2$)$_8$CH$_3$ |
| A-19 | —CH$_2$(CH$_2$)$_8$CH$_3$ | —CH$_2$(CH$_2$)$_8$CH$_3$ |
| A-20 | H | —CH$_2$(CH$_2$)$_6$CH(CH$_3$)$_2$ |

In Table, * represents a binding site to an oxygen molecule.

TABLE 2

$$\begin{array}{c} R^1O \\ R^2O \end{array} \!\!\! P \!\!\! \begin{array}{c} O \\ OH \end{array}$$

| | R¹ | R² |
|---|---|---|
| A-21 | —CH$_2$(CH$_2$)$_6$CH(CH$_3$)$_2$ | —CH$_2$(CH$_2$)$_6$CH(CH$_3$)$_2$ |
| A-22 | H | *—(long unsaturated alkyl chain) |
| A-23 | *—(long unsaturated alkyl chain) | *—(long unsaturated alkyl chain) |
| A-24 | H | —CH$_2$(CH$_2$)$_{14}$CH(CH$_3$)$_2$ |
| A-25 | —CH$_2$(CH$_2$)$_{14}$CH(CH$_3$)$_2$ | —CH$_2$(CH$_2$)$_{14}$CH(CH$_3$)$_2$ |
| A-26 | H | —C$_6$H$_5$ |
| A-27 | —C$_6$H$_5$ | —C$_6$H$_5$ |
| A-28 | H | —CH$_2$CH$_2$OCH$_3$ |
| A-29 | —CH$_2$CH$_2$CH$_3$ | —CH$_2$CH$_2$OCH$_3$ |
| A-30 | H | —CH$_2$CH$_2$OCH$_2$CH$_3$ |
| A-31 | —CH$_2$CH$_2$OCH$_2$CH$_3$ | —CH$_2$CH$_2$OCH$_2$CH$_3$ |
| A-32 | H | —(C$_2$H$_4$O)$_2$C$_2$H$_5$ |
| A-33 | —(C$_2$H$_4$O)$_2$C$_2$H$_5$ | —(C$_2$H$_4$O)$_2$C$_2$H$_5$ |
| A-34 | H | —(C$_2$H$_4$O)$_2$C$_4$H$_9$ |
| A-35 | —(C$_2$H$_4$O)$_2$C$_4$H$_9$ | —(C$_2$H$_4$O)$_2$C$_4$H$_9$ |
| A-36 | H | —C$_4$H$_4$OCH$_2$CHCH$_3$)$_2$ |
| A-37 | —C$_2$H$_4$OCH$_2$CHCH$_3$)$_2$ | —C$_2$H$_4$OCH$_2$CHCH$_3$)$_2$ |
| A-38 | H | —(C$_2$H$_4$O)$_2$CH$_2$CHCH$_3$)$_2$ |
| A-39 | —(C$_2$H$_4$O)$_2$CH$_2$CHCH$_3$)$_2$ | —(C$_2$H$_4$O)$_2$CH$_2$CHCH$_3$)$_2$ |
| A-40 | H | —CH(CH$_3$)CH$_2$OCH$_3$ |

In Table, * represents a binding site to an oxygen molecule.

TABLE 3

$$\begin{array}{c} R^1O \\ R^2O \end{array} \!\!\! P \!\!\! \begin{array}{c} O \\ OH \end{array}$$

| | R¹ | R² |
|---|---|---|
| A-41 | H | —CH(CH$_3$)CH$_2$OCH$_3$ |
| A-42 | —CH(CH$_3$)CH$_2$CH$_3$ | —CH(CH$_3$)CH$_2$OCH$_3$ |
| A-43 | H | —(CH(CH$_3$)CH$_2$O)$_2$CH$_3$ |
| A-44 | —(CH(CH$_3$)CH$_2$O)$_2$CH$_3$ | —(CH(CH$_3$)CH$_2$O)$_2$CH$_3$ |
| A-45 | H | —(CH(CH$_3$)CH$_2$O)$_3$CH$_3$ |
| A-46 | —(CH(CH$_3$)CH$_2$O)$_3$CH$_3$ | —(CH(CH$_3$)CH$_2$O)$_3$CH$_3$ |
| A-47 | H | —CH$_2$CH(CH$_3$)OCH$_3$ |
| A-48 | —CH$_2$CH(CH$_3$)OCH$_3$ | —CH$_2$CH(CH$_3$)OCH$_3$ |
| A-49 | H | —(CH$_2$CH(CH$_3$)O)$_2$CH$_3$ |
| A-50 | —(CH$_2$CH(CH$_3$)O)$_2$CH$_3$ | —(CH$_2$CH(CH$_3$)O)$_2$CH$_3$ |
| A-51 | H | —(CH$_2$CH(CH$_3$)O)$_3$CH$_3$ |

TABLE 3-continued $$\begin{array}{c} R^1O \\ R^2O \end{array} \!\!\! P \!\!\! \begin{array}{c} O \\ OH \end{array}$$

| | R¹ | R² |
|---|---|---|
| A-52 | —(CH$_2$CH(CH$_3$)O)$_3$CH$_3$ | —(CH$_2$CH(CH$_3$)O)$_3$CH$_3$ |
| A-53 | H | —CH(CH$_3$)CH$_2$OC(=O)CH$_3$ |
| A-54 | —CH(CH$_3$)CH$_2$OC(=O)CH$_3$ | —CH(CH$_3$)CH$_2$OC(=O)CH$_3$ |
| A-55 | H | —CH$_2$CH(CH$_3$)OC(=O)CH$_3$ |
| A-56 | —CH$_2$CH(CH$_3$)OC(=O)CH$_3$ | —CH$_2$CH(CH$_3$)OC(=O)CH$_3$ |
| A-57 | —CH$_2$CH(CH$_3$)OC(=O)CH$_3$ | —CH$_2$CH(CH$_3$)OC(=O)CH$_3$ |
| A-58 | H | —CH(CH$_3$)CH$_2$OC(=O)CH$_2$CH$_3$ |
| A-59 | —CH(CH$_3$)CH$_2$OC(=O)CH$_2$CH$_3$ | —CH(CH$_3$)CH$_2$OC(=O)CH$_2$CH$_3$ |
| A-60 | H | —CH$_2$CH(CH$_3$)OC(=O)CH$_2$CH$_3$ |

TABLE 4

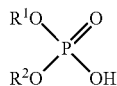

| | R¹ | R² |
|---|---|---|
| A-61 | —CH$_2$CH(CH$_3$)OC(=O)CH$_2$CH$_3$ | —CH$_2$CH(CH$_3$)OC(=O)CH$_2$CH$_3$ |
| A-62 | —CH$_2$CH(CH$_3$)OC(=O)CH$_2$CH$_3$ | —CH(CH$_3$)CH$_2$OC(=O)CH$_2$CH$_3$ |
| A-63 | H | —CH(CH$_2$CH$_3$)CH$_2$OC(=O)CH$_3$ |
| A-64 | —CH(CH$_2$CH$_3$)CH$_2$OC(=O)CH$_3$ | —CH(CH$_2$CH$_3$)CH$_2$OC(=O)CH$_3$ |
| A-65 | H | —CH$_2$CH(CH$_2$CH$_3$)OC(=O)CH$_3$ |
| A-66 | —CH$_2$CH(CH$_2$CH$_3$)OC(=O)CH$_3$ | —CH$_2$CH(CH$_2$CH$_3$)OC(=O)CH$_3$ |
| A-67 | —CH(CH$_2$CH$_3$)CH$_2$OC(=O)CH$_3$ | —CH$_2$CH(CH$_2$CH$_3$)OC(=O)CH$_3$ |
| A-68 | H | —CH(CH$_2$CH$_3$)CH$_2$OC(=O)CH$_2$CH$_3$ |
| A-69 | —CH(CH$_2$CH$_3$)CH$_2$OC(=O)CH$_2$CH$_3$ | —CH(CH$_2$CH$_3$)CH$_2$OC(=O)CH$_2$CH$_3$ |
| A-70 | H | —CH$_2$CH(CH$_2$CH$_3$)OC(=O)CH$_2$CH$_3$ |
| A-71 | —CH$_2$CH(CH$_2$CH$_3$)OC(=O)CH$_2$CH$_3$ | —CH$_2$CH(CH$_2$CH$_3$)OC(=O)CH$_2$CH$_3$ |
| A-72 | —CH(CH$_2$CH$_3$)CH$_2$OC(=O)CH$_2$CH$_3$ | —CH$_2$CH(CH$_2$CH$_3$)OC(=O)CH$_2$CH$_3$ |
| A-73 | H | —CH(CH$_3$)CH$_2$OC(=O)CH(CH$_3$)$_2$ |
| A-74 | —CH(CH$_3$)CH$_2$OC(=O)CH(CH$_3$)$_2$ | —CH(CH$_3$)CH$_2$OC(=O)CH(CH$_3$)$_2$ |
| A-75 | H | —CH$_2$CH(CH$_3$)OC(=O)CH(CH$_3$)$_2$ |
| A-76 | —CH$_2$CH(CH$_3$)OC(=O)CH(CH$_3$)$_2$ | —CH$_2$CH(CH$_3$)OC(=O)CH(CH$_3$)$_2$ |
| A-77 | —CH$_2$CH(CH$_3$)OC(=O)CH(CH$_3$)$_2$ | —CH(CH$_3$)CH$_2$OC(=O)CH(CH$_3$)$_2$ |
| A-78 | H | —CH(CH$_2$CH$_3$)CH$_2$OC(=O)CH(CH$_3$)$_2$ |
| A-79 | —CH(CH$_2$CH$_3$)CH$_2$OC(=O)CH(CH$_3$)$_2$ | —CH(CH$_2$CH$_3$)CH$_2$OC(=O)CH(CH$_3$)$_2$ |
| A-80 | H | —CH$_2$CH(CH$_2$CH$_3$)OC(=O)CH(CH$_3$)$_2$ |

TABLE 5

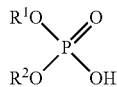

| | R¹ | R² |
|---|---|---|
| A-81 | —CH$_2$CH(CH$_2$CH$_3$)OC(=O)CH(CH$_3$)$_2$ | —CH$_2$CH(CH$_2$CH$_3$)OC(=O)CH(CH$_3$)$_2$ |
| A-82 | —CH$_2$CH(CH$_2$CH$_3$)OC(=O)CH(CH$_3$)$_2$ | —CH(CH$_2$CH$_3$)CH$_2$OC(=O)CH(CH$_3$)$_2$ |
| A-83 | —(CH(CH$_2$CH$_3$)CH$_2$O)$_2$C(=O)CH$_3$ | H |
| A-84 | —(CH(CH$_2$CH$_3$)CH$_2$O)$_2$C(=O)CH$_3$ | —(CH(CH$_2$CH$_3$)CH$_2$O)$_2$C(=O)CH$_3$ |
| A-85 | H | —CH(CH$_3$)CH$_2$C(=O)OCH$_3$ |
| A-86 | —CH(CH$_3$)CH$_2$C(=O)OCH$_3$ | —CH(CH$_3$)CH$_2$C(=O)OCH$_3$ |
| A-87 | H | —CH(CH$_3$)CH$_2$C(=O)OCH$_2$CH$_3$ |
| A-88 | —CH(CH$_3$)CH$_2$C(=O)OCH$_2$CH$_3$ | —CH(CH$_3$)CH$_2$C(=O)OCH$_2$CH$_3$ |
| A-89 | H | —CH$_2$CH(CH$_3$)C(=O)OCH$_3$ |
| A-90 | —CH$_2$CH(CH$_3$)C(=O)OCH$_3$ | —CH$_2$CH(CH$_3$)C(=O)OCH$_3$ |
| A-91 | H | —CH$_2$C(CH$_3$)$_2$C(=O)OCH$_3$ |
| A-92 | —CH$_2$C(CH$_3$)$_2$C(=O)OCH$_3$ | —CH$_2$C(CH$_3$)$_2$C(=O)OCH$_3$ |
| A-93 | —CH$_2$CH(C$_2$H$_5$)CH$_2$CH$_2$CH$_3$ | —CH$_2$CH(C$_2$H$_5$)CH$_2$CH$_2$CH$_3$ |
| A-94 | H | —CH(CH$_3$)CH$_2$OC$_6$H$_5$ |
| A-95 | H | —CH$_2$CH(CH$_3$)OC$_6$H$_5$ |
| A-96 | —CH$_2$CH(CH$_3$)OC$_6$H$_5$ | —CH$_2$CH(CH$_3$)OC$_6$H$_5$ |
| A-97 | —CH(CH$_3$)CH$_2$OC$_6$H$_5$ | —CH$_2$CH(CH$_3$)OC$_6$H$_5$ |
| A-98 | —CH(CH$_3$)CH$_2$OC$_6$H$_5$ | —CH(CH$_3$)CH$_2$OC$_6$H$_5$ |
| A-99 | H | —CH(CH$_2$OCH$_3$)CH$_2$OC$_6$H$_5$ |
| A-100 | —CH(CH$_2$OCH$_3$)CH$_2$OC$_6$H$_5$ | —CH(CH$_2$OCH$_3$)CH$_2$OC$_6$H$_5$ |

TABLE 6

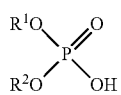

| | R¹ | R² |
|---|---|---|
| A-101 | H | —CH$_2$CH$_2$CH(CH$_3$)OCH$_3$ |
| A-102 | —CH$_2$CH$_2$CH(CH$_3$)OCH$_3$ | —CH$_2$CH$_2$CH(CH$_3$)OCH$_3$ |

TABLE 6-continued $$\begin{array}{c} R^1O \diagdown \hspace{-2pt} \overset{O}{\underset{\displaystyle R^2O}{\overset{\displaystyle \|}{P}}} \diagup OH \end{array}$$

| | R¹ | R² |
|---|---|---|
| A-103 | H | *-CH(CH₃)-CH₂-O-CH₂-C₆H₄-Cl (4-Cl) |
| A-103 | H | *-CH₂-CH(CH₃)-O-CH₂-C₆H₄-Cl (4-Cl) |
| A-104 | *-CH₂-CH(CH₃)-O-CH₂-C₆H₄-Cl (4-Cl) | *-CH₂-CH(CH₃)-O-CH₂-C₆H₄-Cl (4-Cl) |
| A-105 | *-CH(CH₃)-CH₂-O-CH₂-C₆H₄-Cl (4-Cl) | *-CH₂-CH(CH₃)-O-CH₂-C₆H₄-Cl (4-Cl) |
| A-106 | *-CH(CH₃)-CH₂-O-CH₂-C₆H₄-Cl (4-Cl) | *-CH₂-CH(CH₃)-O-CH₂-C₆H₄-Cl (4-Cl) |

TABLE 7

[Quinoline-2-carboxylate structure with (R²) substituent and —C(O)OR¹ group]

| | R¹ | R² |
|---|---|---|
| A-107 | H | H |
| A-108 | —CH₃ | H |
| A-109 | CH₂=C(CH₃)—C(O)—O—CH₂CH₂—* | H |
| A-110 | —CH₃ | —COCH₃ |
| A-111 | CH₂=C(CH₃)—C(O)—O—CH₂CH₂—* | CH₃O—CH₂CH₂—O—C(O)—C₆H₄—* |
| A-112 | CH₂=C(CH₃)—C(O)—O—CH₂CH₂—* | —COCH₃ |

In Table, * represents a binding site to the formula described above.

TABLE 8
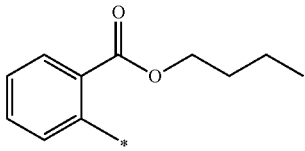
| | R¹ | R² |
|---|---|---|
| A-113 | —CH₃ | — |
| A-114 | —C₆H₅ | — |
| A-115 | 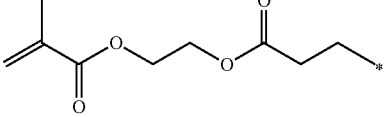 | — |
| A-116 | 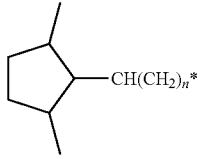 | — |
| A-117 | CH₂=CH(Me)— | — |
| A-118 | H | — |
| A-119 | —n-C₁₇H₃₅ | — |
| A-120 | 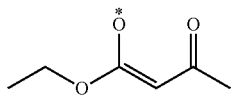 | — |
| A-121 | 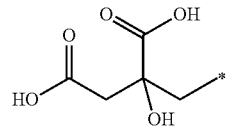 | — |
| A-122 | 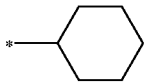 | — |
In Table, * represents a binding site to a COOH group.
TABLE 9
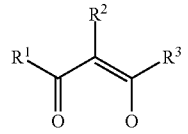
| | R¹ | R² | R³ |
|---|---|---|---|
| A-123 | CH₃ | H | C₆H₅ |
| A-124 | C₆H₅ | H | C₆H₅ |
| A-125 | CH₃ | CH₃ | C₆H₅ |
| A-126 | CH₂(CH₂)₂CH₃ | CH₃ | C₆H₅ |
| A-127 | CH₂(CH₂)₂CH₃ | CH₃ | 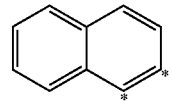 |
TABLE 9-continued
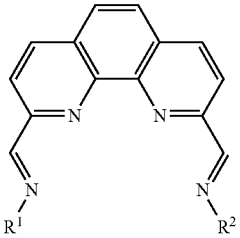
| | R¹ | R² | R³ |
|---|---|---|---|
| A-128 | H | | 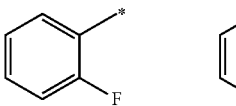 |
In Table, * represents a binding site to the formula described above.
TABLE 10
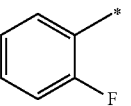
| | R¹ | R² |
|---|---|---|
| A-129 | 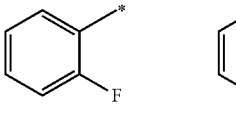 | 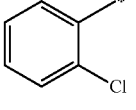 |
| A-130 | 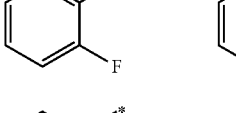 | 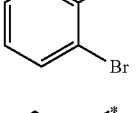 |
| A-131 | 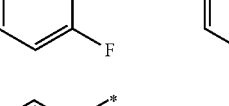 | 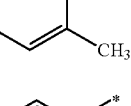 |
| A-132 | 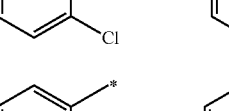 | 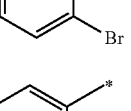 |
| A-133 | 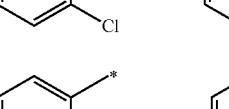 | 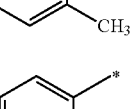 |
| A-134 | 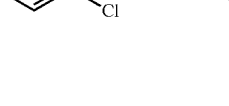 | 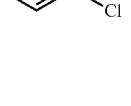 |
| A-135 | | |

TABLE 10-continued

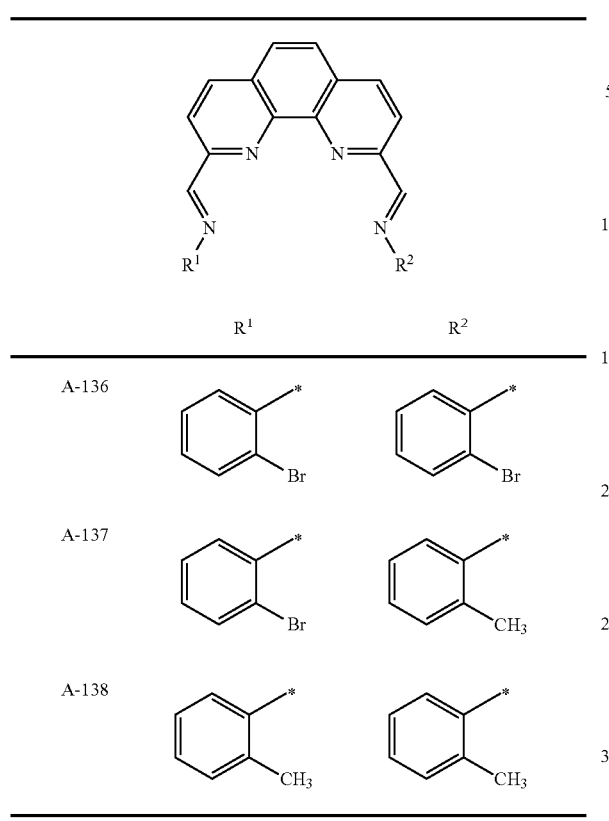

| | R¹ | R² |
|---|---|---|
| A-136 | | |
| A-137 | | |
| A-138 | | |

In Table, * represents a binding site to a nitrogen atom.

TABLE 11

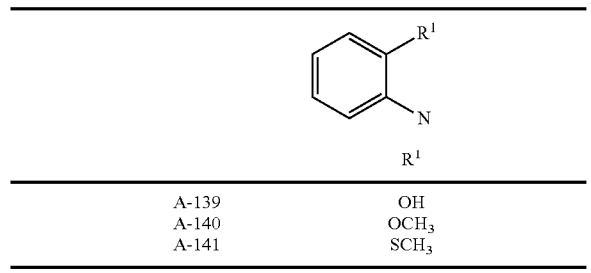

| A-139 | OH |
| A-140 | OCH₃ |
| A-141 | SCH₃ |

TABLE 12

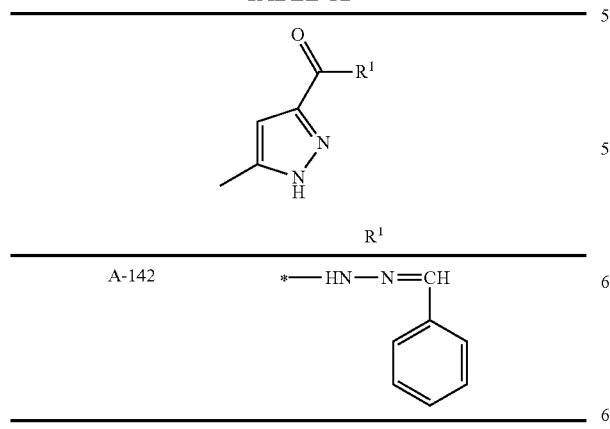

| | R¹ |
|---|---|
| A-142 | *—HN—N=CH— (phenyl) |

In Table, * represents a binding site to the formula described above.

TABLE 13

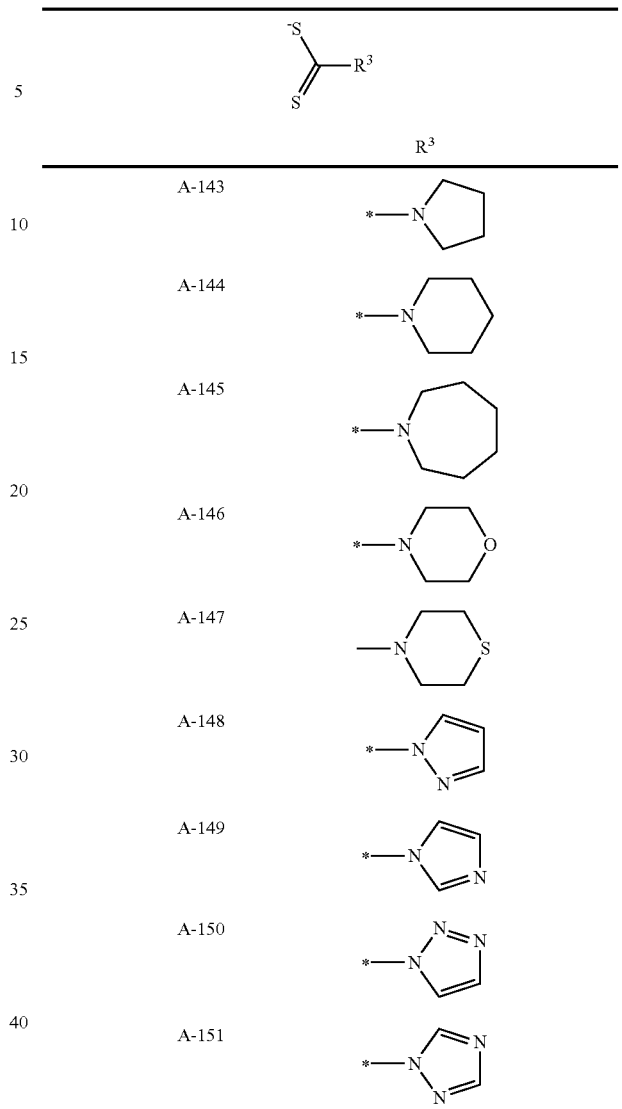

| | R³ |
|---|---|
| A-143 | pyrrolidinyl |
| A-144 | piperidinyl |
| A-145 | azepanyl |
| A-146 | morpholinyl |
| A-147 | thiomorpholinyl |
| A-148 | pyrazolyl |
| A-149 | imidazolyl |
| A-150 | 1,2,3-triazolyl |
| A-151 | 1,2,4-triazolyl |

In Table, * represents a binding site to the formula described above.

TABLE 14

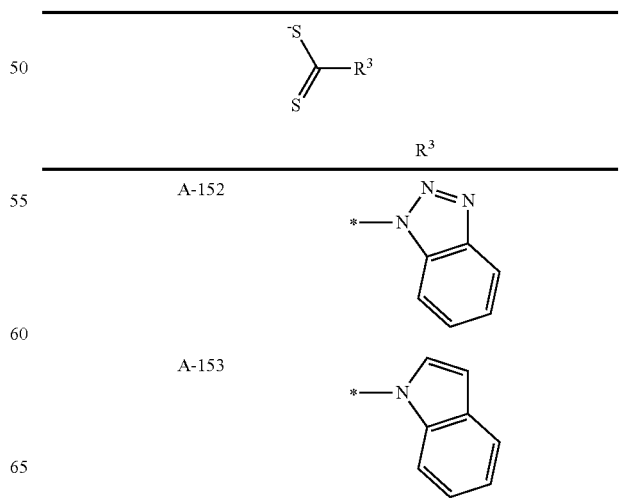

| | R³ |
|---|---|
| A-152 | benzotriazolyl |
| A-153 | indolyl |

TABLE 14-continued

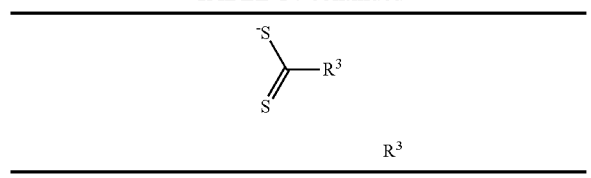

| | R³ |
|---|---|
| A-154 | 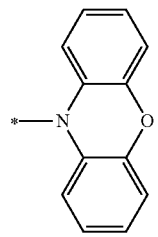 |
| A-155 | 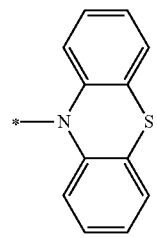 |
| A-156 | |
| A-157 | |

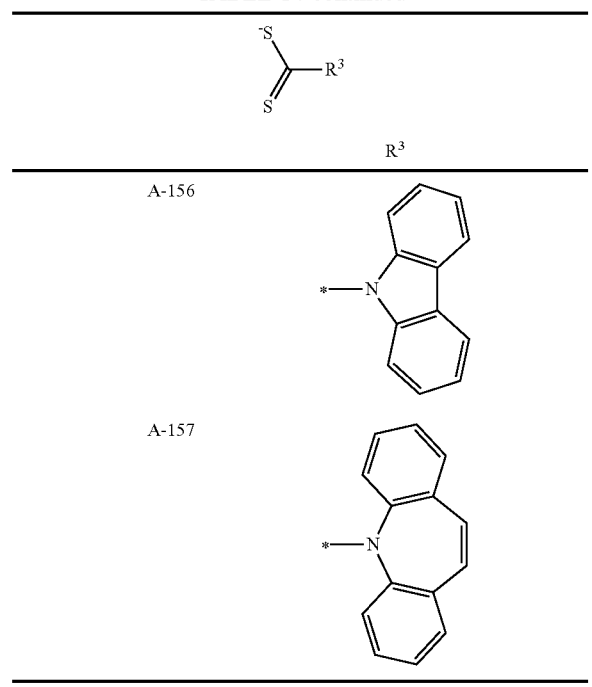

In Table, * represents a binding site to the formula described above.

TABLE 15

| | R¹ | R² | R³ | R⁴ | R⁵ | R⁶ | R⁷ | R⁸ |
|---|---|---|---|---|---|---|---|---|
| A-158 | H | H | H | F | H | H | F | H |
| A-159 | H | H | H | CF₃ | H | H | CF₃ | H |
| A-160 | H | H | H | CN | H | H | CN | H |
| A-161 | H | H | H | COOCH₃ | H | H | COOCH₃ | H |
| A-162 | CH₃ | CH₃ | H | F | H | H | F | H |
| A-163 | CH₃ | CH₃ | H | CF₃ | H | H | CF₃ | H |
| A-164 | CH₃ | CH₃ | H | CN | H | H | CN | H |
| A-165 | CH₃ | CH₃ | H | COOCH₃ | H | H | COOCH₃ | H |
| A-166 | H | CH₃ | H | F | H | H | F | H |
| A-167 | H | CH₃ | H | CF₃ | H | H | CF₃ | H |
| A-168 | H | CH₃ | H | CN | H | H | CN | H |
| A-169 | H | CH₃ | H | COOCH₃ | H | H | COOCH₃ | H |
| A-170 | H | H | F | H | F | F | H | F |
| A-171 | H | H | CF₃ | H | CF₃ | CF₃ | H | CF₃ |
| A-172 | H | H | CN | H | CN | CN | H | CN |
| A-173 | H | H | CN | COOCH₃ | CN | CN | COOCH₃ | CN |
| A-174 | CH₃ | CH₃ | F | H | F | F | H | F |
| A-175 | CH₃ | CH₃ | CF₃ | H | CF₃ | CF₃ | H | CF₃ |
| A-176 | CH₃ | CH₃ | CN | H | CN | CN | H | CN |
| A-177 | CH₃ | CH₃ | COOCH₃ | H | COOCH₃ | COOCH₃ | H | COOCH₃ |
| A-178 | H | CH₃ | F | H | F | F | H | F |
| A-179 | H | CH₃ | CF₃ | H | CF₃ | CF₃ | H | CF₃ |

TABLE 15-continued

| | R¹ | R² | R³ | R⁴ | R⁵ | R⁶ | R⁷ | R⁸ |
|---|---|---|---|---|---|---|---|---|
| A-180 | H | CH₃ | CN | H | CN | CN | H | CN |
| A-181 | H | CH₃ | COOCH₃ | H | COOCH₃ | COOCH₃ | H | COOCH₃ |

In Table, * represents a binding site to a metal atom.

TABLE 16

| | R¹ | R² | R³ | R⁴ |
|---|---|---|---|---|
| A-182 | H | H | H | 2-pyridyl |
| A-183 | H | H | H | isoquinolin-1-yl |
| A-184 | H | H | H | 2-thienyl |
| A-185 | H | H | H | benzothiazol-2-yl |
| A-186 | H | H | H | 4-methylpyridin-2-yl |
| A-187 | H | H | H | 5-methylpyridin-2-yl |
| A-188 | H | H | H | 3-methylpyridin-2-yl |
| A-189 | H | H | H | 4-phenylpyridin-2-yl |

In Table, * represents a binding site to the formula described above.
In Table, ** represents a binding site to a metal atom.

TABLE 17

[Structure: phenyl ring with R¹, R², R³, R⁴ substituents and ** binding site]

| | R¹ | R² | R³ | R⁴ |
|---|---|---|---|---|
| A-190 | H | H | H | 2-(5-phenyl)pyridyl* |
| A-191 | H | H | H | 2-(3-phenyl)pyridyl* |
| A-192 | H | CH₃ | H | 2-pyridyl* |
| A-193 | CH₃ | H | H | 2-pyridyl* |
| A-194 | H | H | CH₃ | 2-pyridyl* |
| A-195 | H | C₆H₅ | H | 2-pyridyl* |
| A-196 | C₆H₅ | H | H | 2-pyridyl* |
| A-197 | H | H | C₆H₅ | 2-pyridyl* |

In Table, * represents a binding site to the formula described above.
In Table, ** represents a binding site to a metal atom.

TABLE 18

[Structure: phenyl ring with R¹, R², R³, R⁴ substituents and ** binding site]

| | R¹ | R² | R³ | R⁴ |
|---|---|---|---|---|
| A-198 | F | H | H | 2-pyridyl* |
| A-199 | CF₃ | H | H | 2-pyridyl* |
| A-200 | F | H | H | 1-isoquinolyl* |
| A-201 | CH₂CH₃ | H | H | 2-pyridyl* |
| A-202 | n-C₃H₇ | H | H | 2-pyridyl* |
| A-203 | n-C₄H₉ | H | H | 2-pyridyl* |
| A-204 | n-C₃H₇ | H | H | 1-isoquinolyl* |
| A-205 | n-C₄H₉ | H | H | 1-isoquinolyl* |

TABLE 18-continued

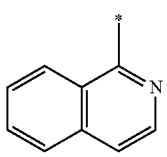

| | R¹ | R² | R³ | R⁴ |
|---|---|---|---|---|
| A-206 | n-C₆H₁₃ | H | H | 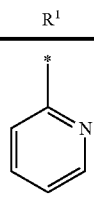 * |

In Table, * represents a binding site to the formula described above.
In Table, ** represents a binding site to a metal atom.

TABLE 19

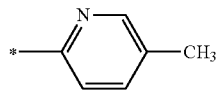

| | R¹ |
|---|---|
| A-207 | 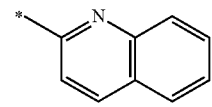 |
| A-208 | 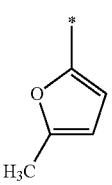 |
| A-209 | 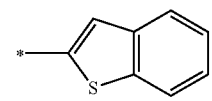 |
| A-210 |

$\begin{array}{c}\includegraphics*{}\end{array}$

|
| A-211 | furan with H₃C substituent

|

TABLE 19-continued benzothiophene structure with R¹ and ** markers

| | R¹ |
|---|---|
| A-212 | isoquinoline with * marker

|
| A-213 | C₆H₅ |

In Table, * represents a binding site to the formula described above.
In Table, ** represents a binding site to a metal atom.

TABLE 20

$$R^1\text{-}N(R^2)\text{-}C(=O)\text{-}R^3$$

| | R¹ | R² | R³ |
|---|---|---|---|
| A-214 | CH₃ | CH₃ | H |

TABLE 21 pyridine-2-carboxylate ester with (R²)ₙ substituents and OR¹ group

| | R¹ | R² |
|---|---|---|
| A-215 | H | H |
| A-216 | CH₃ | H |
| A-217 | methacrylate-CH₂-CH₂-* | H |
| A-218 | CH₃ | COCH₃ |
| A-219 | methacrylate-CH₂-CH₂-* | COCH₃ |

In Table, * represents a binding site to an oxygen molecule.
n represents an integer of 1 to 4.

In the compound synthesis method for forming the ligand, the synthesis may be performed with reference to a conventionally known method. For example, a tetrahydrofuran (THF) solution of 2,4-dimethyl pentanol is added with trimethylamine, and stirred at 0° C. for 5 min, and phosphorous oxychloride is added dropwise thereto, followed by stirring at room temperature for 6 hours to complete the reaction. After the reaction is completed, the reaction solution is decanted with water and is separated with chloroform/water in such a manner that the temperature is not increased up to 30° C. or more. The solvent of an organic layer is removed to obtain the phosphoric acid ester described below.

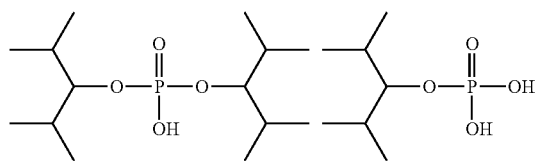

Also, in the synthesis of the phosphoric acid ester copper compound, as a commercially available product, a phosphonic acid such as, for example, Phosmer-M, Phosmer-PE, and Phosmer-PP (manufactured by Uni-Chemical Co., Ltd.) may be used.

The copper salt used herein is preferably a divalent or trivalent copper, and a divalent copper is more preferred. As the copper salt, copper acetate, copper chloride, copper formate, copper stearate, copper benzoate, copper ethylacetoacetate, copper pyrophosphate, copper naphthenate, copper citrate, copper nitrate, copper sulfate, copper carbonate, copper chloride, copper (meth)acrylate are more preferred, and copper benzoate and copper (meth)acrylate are further preferred.

Specific examples of the copper complex used in the present invention may include compounds (Cu-1) to (Cu-219) exemplified below. It is natural that the present invention is not limited thereto.

TABLE 22

| $Cu(L)_n \cdot X$ Formula(1) | | | |
|---|---|---|---|
| | L | n | X |
| Cu-1 | A-1 | 2 | — |
| Cu-2 | A-2 | 2 | — |
| Cu-3 | A-3 | 2 | — |
| Cu-4 | A-4 | 2 | — |
| Cu-5 | A-5 | 2 | — |
| Cu-6 | A-6 | 2 | — |
| Cu-7 | A-7 | 2 | — |
| Cu-8 | A-8 | 2 | — |
| Cu-9 | A-9 | 2 | — |
| Cu-10 | A-10 | 2 | — |
| Cu-11 | A-11 | 2 | — |
| Cu-12 | A-12 | 2 | — |
| Cu-13 | A-13 | 2 | — |
| Cu-14 | A-14 | 2 | — |
| Cu-15 | A-15 | 2 | — |
| Cu-16 | A-16 | 2 | — |
| Cu-17 | A-17 | 2 | — |
| Cu-18 | A-18 | 2 | — |
| Cu-19 | A-19 | 2 | — |
| Cu-20 | A-20 | 2 | — |

TABLE 23

| $Cu(L)_n \cdot X$ Formula(1) | | | |
|---|---|---|---|
| | L | n | X |
| Cu-21 | A-21 | 2 | — |
| Cu-22 | A-22 | 2 | — |
| Cu-23 | A-23 | 2 | — |
| Cu-24 | A-24 | 2 | — |
| Cu-25 | A-25 | 2 | — |
| Cu-26 | A-26 | 2 | — |
| Cu-27 | A-27 | 2 | — |
| Cu-28 | A-28 | 2 | — |
| Cu-29 | A-29 | 2 | — |
| Cu-30 | A-30 | 2 | — |
| Cu-31 | A-31 | 2 | — |
| Cu-32 | A-32 | 2 | — |
| Cu-33 | A-33 | 2 | — |
| Cu-34 | A-34 | 2 | — |
| Cu-35 | A-35 | 2 | — |
| Cu-36 | A-36 | 2 | — |
| Cu-37 | A-37 | 2 | — |
| Cu-38 | A-38 | 2 | — |
| Cu-39 | A-39 | 2 | — |
| Cu-40 | A-40 | 2 | — |

TABLE 24

| $Cu(L)_n \cdot X$ Formula(1) | | | |
|---|---|---|---|
| | L | n | X |
| Cu-41 | A-41 | 2 | — |
| Cu-42 | A-42 | 2 | — |
| Cu-43 | A-43 | 2 | — |
| Cu-44 | A-44 | 2 | — |
| Cu-45 | A-45 | 2 | — |
| Cu-46 | A-46 | 2 | — |
| Cu-47 | A-47 | 2 | — |
| Cu-48 | A-48 | 2 | — |
| Cu-49 | A-49 | 2 | — |
| Cu-50 | A-50 | 2 | — |
| Cu-51 | A-51 | 2 | — |
| Cu-52 | A-52 | 2 | — |
| Cu-53 | A-53 | 2 | — |
| Cu-54 | A-54 | 2 | — |
| Cu-55 | A-55 | 2 | — |
| Cu-56 | A-56 | 2 | — |
| Cu-57 | A-57 | 2 | — |
| Cu-58 | A-58 | 2 | — |
| Cu-59 | A-59 | 2 | — |
| Cu-60 | A-60 | 2 | — |

TABLE 25

| $Cu(L)_n \cdot X$ Formula(1) | | | |
|---|---|---|---|
| | L | n | X |
| Cu-61 | A-61 | 2 | — |
| Cu-62 | A-62 | 2 | — |
| Cu-63 | A-63 | 2 | — |
| Cu-64 | A-64 | 2 | — |
| Cu-65 | A-65 | 2 | — |
| Cu-66 | A-66 | 2 | — |
| Cu-67 | A-67 | 2 | — |
| Cu-68 | A-68 | 2 | — |
| Cu-69 | A-69 | 2 | — |
| Cu-70 | A-70 | 2 | — |
| Cu-71 | A-71 | 2 | — |
| Cu-72 | A-72 | 2 | — |
| Cu-73 | A-73 | 2 | — |
| Cu-74 | A-74 | 2 | — |
| Cu-75 | A-75 | 2 | — |
| Cu-76 | A-76 | 2 | — |
| Cu-77 | A-77 | 2 | — |
| Cu-78 | A-78 | 2 | — |

TABLE 25-continued

Cu(L)$_n$·X Formula(1)

| | L | n | X |
|---|---|---|---|
| Cu-79 | A-79 | 2 | — |
| Cu-80 | A-80 | 2 | — |

TABLE 26

Cu(L)$_n$·X Formula(1)

| | L | n | X |
|---|---|---|---|
| Cu-81 | A-81 | 2 | — |
| Cu-82 | A-82 | 2 | — |
| Cu-83 | A-83 | 2 | — |
| Cu-84 | A-84 | 2 | — |
| Cu-85 | A-85 | 2 | — |
| Cu-86 | A-86 | 2 | — |
| Cu-87 | A-87 | 2 | — |
| Cu-88 | A-88 | 2 | — |
| Cu-89 | A-89 | 2 | — |
| Cu-90 | A-90 | 2 | — |
| Cu-91 | A-91 | 2 | — |
| Cu-92 | A-92 | 2 | — |
| Cu-93 | A-93 | 2 | — |
| Cu-94 | A-94 | 2 | — |
| Cu-95 | A-95 | 2 | — |
| Cu-96 | A-96 | 2 | — |
| Cu-97 | A-97 | 2 | — |
| Cu-98 | A-98 | 2 | — |
| Cu-99 | A-99 | 2 | — |
| Cu-100 | A-100 | 2 | — |

TABLE 27

Cu(L)$_n$·X Formula(1)

| | L | n | X |
|---|---|---|---|
| Cu-101 | A-101 | 2 | — |
| Cu-102 | A-102 | 2 | — |
| Cu-103 | A-103 | 2 | — |
| Cu-103 | A-103 | 2 | — |
| Cu-104 | A-104 | 2 | — |
| Cu-105 | A-105 | 2 | — |
| Cu-106 | A-106 | 2 | — |
| Cu-107 | A-107 | 2 | SO$_4$ |
| Cu-108 | A-108 | 2 | SO$_4$ |
| Cu-109 | A-109 | 2 | SO$_4$ |
| Cu-110 | A-110 | 2 | (NO$_3$)$_2$ |
| Cu-111 | A-111 | 2 | (NO$_3$)$_2$ |
| Cu-112 | A-112 | 2 | (ClO$_4$)$_2$ |
| Cu-113 | A-113 | 2 | — |
| Cu-114 | A-114 | 2 | — |
| Cu-115 | A-115 | 2 | — |
| Cu-116 | A-116 | 2 | — |
| Cu-117 | A-117 | 2 | — |
| Cu-118 | A-118 | 2 | — |
| Cu-119 | A-119 | 2 | — |
| Cu-120 | A-120 | 2 | — |

TABLE 28

Cu(L)$_n$·X Formula(1)

| | L | n | X |
|---|---|---|---|
| Cu-121 | A-121 | 2 | — |
| Cu-122 | A-122 | 2 | — |
| Cu-123 | A-123 | 2 | — |
| Cu-124 | A-124 | 2 | — |
| Cu-125 | A-125 | 2 | — |

TABLE 28-continued

Cu(L)$_n$·X Formula(1)

| | L | n | X |
|---|---|---|---|
| Cu-126 | A-126 | 2 | — |
| Cu-127 | A-127 | 2 | — |
| Cu-128 | A-128 | 2 | — |
| Cu-129 | A-129 | 1 | (ClO$_4$)$_2$ |
| Cu-130 | A-130 | 1 | (ClO$_4$)$_2$ |
| Cu-131 | A-131 | 1 | (ClO$_4$)$_2$ |
| Cu-132 | A-132 | 1 | (ClO$_4$)$_2$ |
| Cu-133 | A-133 | 1 | (ClO$_4$)$_2$ |
| Cu-134 | A-134 | 1 | (ClO$_4$)$_2$ |
| Cu-135 | A-135 | 1 | (ClO$_4$)$_2$ |
| Cu-136 | A-136 | 1 | (ClO$_4$)$_2$ |
| Cu-137 | A-137 | 1 | (ClO$_4$)$_2$ |
| Cu-138 | A-138 | 1 | (ClO$_4$)$_2$ |
| Cu-139 | A-139 | 2 | — |
| Cu-140 | A-140 | 2 | — |

TABLE 29

Cu(L)$_n$·X Formula(1)

| | L | n | X |
|---|---|---|---|
| Cu-141 | A-141 | 2 | — |
| Cu-142 | A-142 | 2 | Cl$_2$ |
| Cu-143 | A-143 | 2 | — |
| Cu-144 | A-144 | 2 | — |
| Cu-145 | A-145 | 2 | — |
| Cu-146 | A-146 | 2 | — |
| Cu-147 | A-147 | 2 | — |
| Cu-148 | A-148 | 2 | — |
| Cu-149 | A-149 | 2 | — |
| Cu-150 | A-150 | 2 | — |
| Cu-151 | A-151 | 2 | — |
| Cu-152 | A-152 | 2 | — |
| Cu-153 | A-153 | 2 | — |
| Cu-154 | A-154 | 2 | — |
| Cu-155 | A-155 | 2 | — |
| Cu-156 | A-156 | 2 | — |
| Cu-157 | A-157 | 2 | — |
| Cu-158 | A-158 | 2 | — |
| Cu-159 | A-159 | 2 | — |
| Cu-160 | A-160 | 2 | — |

TABLE 30

Cu(L)$_n$·X Formula(1)

| | L | n | X |
|---|---|---|---|
| Cu-161 | A-161 | 2 | — |
| Cu-162 | A-162 | 2 | — |
| Cu-163 | A-163 | 2 | — |
| Cu-164 | A-164 | 2 | — |
| Cu-165 | A-165 | 2 | — |
| Cu-166 | A-166 | 2 | — |
| Cu-167 | A-167 | 2 | — |
| Cu-168 | A-168 | 2 | — |
| Cu-169 | A-169 | 2 | — |
| Cu-170 | A-170 | 2 | — |
| Cu-171 | A-171 | 2 | — |
| Cu-172 | A-172 | 2 | — |
| Cu-173 | A-173 | 2 | — |
| Cu-174 | A-174 | 2 | — |
| Cu-175 | A-175 | 2 | — |
| Cu-176 | A-176 | 2 | — |
| Cu-177 | A-177 | 2 | — |
| Cu-178 | A-178 | 2 | — |
| Cu-179 | A-179 | 2 | — |
| Cu-180 | A-180 | 2 | — |

TABLE 31

Cu(L)$_n$·X Formula(1)

| | L | n | X |
|---|---|---|---|
| Cu-181 | A-181 | 2 | — |
| Cu-182 | A-182 | 2 | — |
| Cu-183 | A-183 | 2 | — |
| Cu-184 | A-184 | 2 | — |
| Cu-185 | A-185 | 2 | — |
| Cu-186 | A-186 | 2 | — |
| Cu-187 | A-187 | 2 | — |
| Cu-188 | A-188 | 2 | — |
| Cu-189 | A-189 | 2 | — |
| Cu-190 | A-190 | 2 | SO$_4$ |
| Cu-191 | A-191 | 2 | SO$_4$ |
| Cu-192 | A-192 | 2 | SO$_4$ |
| Cu-193 | A-193 | 2 | (NO$_3$)$_2$ |
| Cu-194 | A-194 | 2 | (NO$_3$)$_2$ |
| Cu-195 | A-195 | 2 | (ClO$_4$)$_2$ |
| Cu-196 | A-196 | 2 | Cl$_2$ |
| Cu-197 | A-197 | 2 | Cl$_2$ |
| Cu-198 | A-198 | 2 | (CN)$_2$ |
| Cu-199 | A-199 | 2 | (CN)$_2$ |
| Cu-200 | A-200 | 2 | SO$_4$ |

TABLE 32

Cu(L)$_n$·X Formula(1)

| | L | n | X |
|---|---|---|---|
| Cu-201 | A-201 | 2 | (NO$_3$)$_2$ |
| Cu-202 | A-202 | 2 | (NO$_3$)$_2$ |
| Cu-203 | A-203 | 2 | (CN)$_2$ |
| Cu-204 | A-204 | 2 | (CN)$_2$ |
| Cu-205 | A-205 | 2 | (ClO$_4$)$_2$ |
| Cu-206 | A-206 | 2 | (ClO$_4$)$_2$ |
| Cu-207 | A-207 | 2 | SO$_4$ |
| Cu-208 | A-208 | 2 | SO$_4$ |
| Cu-209 | A-209 | 2 | (NO$_3$)$_2$ |
| Cu-210 | A-210 | 2 | (CN)$_2$ |
| Cu-211 | A-211 | 2 | (SCN)$_2$ |
| Cu-212 | A-212 | 2 | (SCN)$_2$ |
| Cu-213 | A-213 | 2 | Cl$_2$ |
| Cu-214 | A-214 | 2 | Cl$_2$ |
| Cu-215 | A-215 | 2 | SO$_4$ |
| Cu-216 | A-216 | 2 | SO$_4$ |
| Cu-217 | A-217 | 2 | (NO$_3$)$_2$ |
| Cu-218 | A-218 | 2 | (NO$_3$)$_2$ |
| Cu-219 | A-219 | 2 | (ClO$_4$)$_2$ |

The dye or copper complex may be used either alone or in combination of two or more thereof. In a case of combination of two or more, a total amount is within the range described below.

The content of the dye or the copper complex ranges preferably from 0.05% by mass to 90% by mass, more preferably from 0.05% by mass to 80% by mass, and further preferably from 0.5% by mass to 30% by mass based on the mass of the total solid content of a curable resin composition for forming a high refractive index layer or a low refractive index layer.

It is desirable that a dye has a high epsilon (E) because its content is small. Meanwhile, when a dye has a low epsilon (E), its content becomes large. When the dye is a cyanine dye or a phthalocyanine dye, its content ranges preferably from 0.01% by mass to 20% by mass, and further preferably from 0.5% by mass to 10% by mass based on the mass of the total solid content of a curable resin composition for forming a high refractive index layer or a low refractive index layer.

<Curable Resin Composition for Forming High Refractive Index Layer>

A curable resin composition for forming a high refractive index layer preferably contains (A) metal oxide particles, (B) a dispersant and (C) a binder.

Also, in an infrared ray cutoff filter of the present invention, when a layer containing a dye having a maximum absorption wavelength in a range of 600 nm to 820 nm is at least one of high refractive index layers, the curable resin composition for forming a high refractive index layer may contain the dye as described above.

(A) Metal Oxide Particles

As for metal oxide particles, inorganic particles having a high refractive index, that is, oxide particles of titanium (Ti), zirconium (Zr), aluminium (Al), silicon (Si), zinc (Zn) or magnesium (Mg) may be exemplified, and titanium dioxide (TiO$_2$) particles, zirconium dioxide (ZrO$_2$) particles or silicon dioxide (SiO$_2$) particles are preferred, and among them, titanium dioxide particles (hereinafter, also simply referred to as "titanium dioxide") are more preferred.

A colorless or transparent titanium dioxide particle is represented by formula TiO$_2$, and has a purity of preferably 70% or more, more preferably 80% or more, and further preferably 85% or more. For example, low-order titanium oxide or titanium oxynitrite, which may be represented by Formula Ti$_n$O$_{2n-1}$ (n represents a number of 2 to 4), is included in an amount of preferably 30% by mass or less, more preferably 20% by mass or less, and further preferably 15% by mass or less. Also, as the titanium dioxide particles, rutile type crystals are preferred.

The metal oxide particle has a primary particle diameter ranging preferably from 1 nm to 100 nm, more preferably from 1 nm to 80 nm, and particularly preferably from 1 nm to 50 nm. When the primary particle diameter of the metal oxide particle is greater than 100 nm, the refractive index and the transmittance may be reduced. Also, when the primary particle diameter is less than 1 nm, the dispersibility or dispersion stability may be reduced due to aggregation.

It is assumed that the measurement is performed by the measurement method employed in Examples below.

The refractive index of the metal oxide particle is not particularly limited, but in view of obtaining a high refractive index, the refractive index preferably ranges from 1.75 to 2.70 and more preferably from 1.90 to 2.70. The measurement method of the refractive index may be performed by Abbe's refractometer (manufactured by Atago Co., Ltd.) (measurement temperature 25° C., wavelength 633 nm).

Also, the specific surface area of the metal oxide particle preferably ranges from 10 m$^2$/g to 400 m$^2$/g, more preferably from 20 m$^2$/g to 200 m$^2$/g, and most preferably from 30 m$^2$/g to 150 m$^2$/g.

The shape of the metal oxide particle is not particularly limited. For example, the shape may be a rice-grain shape, a spherical shape, a cubic shape, a spindle shape or an irregular shape.

The metal oxide particles have been surface-treated with an organic compound. Examples of the organic compound used in the surface treatment may include polyol, alkanolamine, stearic acid, a silane coupling agent and a titanate coupling agent. Among them, stearic acid is preferred.

The surface treatment may be performed by one kind of surface treatment agent alone or two or more kinds of surface treatment agents in combination.

Also, the surface of the metal oxide particles may be preferably treated with an oxide of, for example, aluminum, silicon, or zirconia. Accordingly, the weather resistance is improved.

As for the metal oxide particles, commercially available products may be preferably used.

Examples of the titanium dioxide particles as commercially available products may include TTO series (e.g., TTO-51(A), TTO-51(C), TTO-55(C)), TTO-S, V series (e.g., TTO-S-1, TTO-S-2, TTO-V-3) which are manufactured by Ishihara Sangyo Kaisha Ltd., and MT series manufactured by Tayca Co., Ltd. (e.g., MT-01, MT-05).

Examples of the zirconium dioxide particles as commercially available products may include UEP (manufactured by Daiichi Kigenso Kagaku Kogyo Co., Ltd.), PCS (manufactured by Nippon Denko Co., Ltd.), JS-01, JS-03, JS-04 (manufactured by Nippon Denko Co., Ltd.), and UEP-100 (manufactured by Daiichi Kigenso Kagaku Kogyo Co., Ltd.).

Examples of the silicon dioxide particles as commercially available products may include OG502-31 manufactured by Clariant Co., Ltd.

The metal oxide particles may be used either alone or in combination of two or more kinds thereof.

Also, when the curable resin composition for forming a high refractive index layer is configured, in order to obtain a very high refractive index, the content of the metal oxide particles in the composition, in view of dispersion stability, ranges preferably from 10% by mass to 90% by mass, more preferably from 10% by mass to 50% by mass, further preferably from 12% by mass to 40% by mass, and particularly preferably from 15% by mass to 35% by mass, based on the total solid content of the curable resin composition for forming a high refractive index layer.

Also, when the content of the metal oxide particles is greater than 90% by mass, based on the total solid content of the curable resin composition for forming a high refractive index layer, the dispersibility and dispersion stability may be impaired because a sufficient amount of dispersant may not be present. Further, when the curable composition is applied to a wafer with a large size (e.g., 12 inch), it is difficult to form a film with a small thickness difference between a central portion and a peripheral portion of the wafer.

(B) Dispersant

As for a dispersant used in the curable resin composition for forming a high refractive index layer, a polymer dispersant represented by Formula (1) below is preferred.

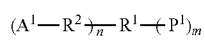

Formula (1)

In Formula (1) above, $R^1$ represents a (m+n)-valent linking group, and $R^2$ represents a single bond or a divalent linking group. $A^1$ represents a monovalent substituent having at least one kind of group selected from the group consisting of an acid group, an urea group, an urethane group, a group having a coordinating oxygen atom, a group having a basic nitrogen atom, a heterocyclic group, an alkyloxycarbonyl group, an alkylaminocarbonyl group, a carboxylate group, a sulfonamide group, an alkoxysilyl group, an epoxy group, an isocyanate group and a hydroxyl group. n $A^1$'s and $R^2$'s, respectively, may be the same or different.

m represents an integer of 8 or less, n represents a number of 1 to 9, and m+n satisfies a range of 3 to 10.

$P^1$ represents a polymer chain. m $P^1$'s may be the same or different.

The monovalent substituent $A^1$ included in the dispersant represented by Formula (1) above, which has at least one kind of group selected from the group consisting of an acid group, an urea group, an urethane group, a group having a coordinating oxygen atom, a group having a basic nitrogen atom, an alkyloxycarbonyl group, an alkylaminocarbonyl group, a carboxylate group, a sulfonamide group, a heterocyclic group, an alkoxysilyl group, an epoxy group, an isocyanate group and a hydroxyl group, may interact with the metal oxide particles (A). Thus, the dispersant represented by Formula (1) above may strongly interact with the metal oxide particles (A) by including n (1 to 9) substituents $A^1$'s. Also, m polymer chains $P^1$'s included in the dispersant represented by Formula (1) above may serve as steric repulsion groups. Thus, a satisfactory steric repulsive force is exhibited by including m polymer chains $P^1$'s so as to uniformly disperse the metal oxide particles (A). Further, it is assumed that the dispersant represented by Formula (1) above does not cause a problem such as aggregation of particles caused by cross-linking of the particles due to its molecular structure, unlike a dispersant of a conventional graft random structure.

Hereinafter, respective components of Formula (1) will be described in detail. Also, the same dispersant as the dispersant represented by Formula (1) is also disclosed in Patent Application Laid-Open No. 2007-277514 (Patent Application 2006-269707), and the descriptions and proper structures described in the disclosure may also be applied to the descriptions below, and repetitive descriptions will be properly omitted.

$A^1$ represents a monovalent substituent having at least one kind of a functional group having an adsorbability to metal oxide particles (A), such as an acid group, a group having a basic nitrogen atom, an urea group, an urethane group, a group having a coordinating oxygen atom, a, an alkyloxycarbonyl group, an alkylaminocarbonyl group, a carboxylate group, a sulfonamide group, an alkoxysilyl group, an epoxy group, an isocyanate group and a hydroxyl group, and a structure which may have an adsorbability to metal oxide particles (A), such as a heterocyclic structure.

Hereinafter, a portion having an adsorbability to the metal oxide particles (A) (the functional group and structure) will be properly collectively referred to as an "adsorption site" in the description below.

One $A^1$ may include at least one kind of the adsorption site or two or more kinds thereof.

Also, in the present invention, "a monovalent substituent having at least one kind of adsorption site" is a monovalent substituent which includes the above described adsorption site bonded to a linking group constituted by 1 to 200 carbon atoms, 0 to 20 nitrogen atoms, 0 to 100 oxygen atoms, 1 to 400 hydrogen atoms, and 0 to 40 sulfur atoms. Also, when the adsorption site itself constitutes the monovalent substituent, the adsorption site itself may be a monovalent substituent represented by $A^1$.

First, an adsorption site constituting $A^1$ will be described below.

Preferred examples of the "acid group" may include a carboxylic acid group, a sulfonic acid group, a monosulfate group, a phosphate group, a monophosphate group, and a boric acid group. A carboxylic acid group, a sulfonic acid group, a monosulfate group, a phosphate group, and a monophosphate group are more preferred, a carboxylic acid group, a sulfonic acid group, and a phosphate group are further preferred, and a carboxylic acid group is particularly preferred.

A preferable example of the "urea group" may be —NR$^{15}$CONR$^{16}$R$^{17}$ (here, each of R$^{15}$, R$^{16}$, and R$^{17}$ independently represents a hydrogen atom, an alkyl group having 1 to 20 carbon atoms, an aryl group having 6 or more carbon atoms, or an aralkyl group having 7 or more carbon atoms). —NR$^{15}$CONHR$^{17}$ (here, each of R$^{15}$ and R$^{17}$ independently represents a hydrogen atom, an alkyl group having 1 to 10 carbon atoms, an aryl group having 6 or more carbon atoms, or an aralkyl group having 7 or more carbon atoms) is more preferred, and —NHCONHR$^{17}$ (here, R$^{17}$ represents a hydrogen atom, an alkyl group having 1 to 10 carbon atoms, an aryl group having 6 or more carbon atoms, or an aralkyl group having 7 or more carbon atoms) is particularly preferred.

Preferred examples of the "urethane group" may include —NHCOOR$^{18}$, —NR$^{19}$COOR$^{20}$, —OCONHR$^{21}$, and —OCONR$^{22}$R$^{23}$ (here, each of R$^{18}$, R$^{19}$, R$^{20}$, R$^{21}$, R$^{22}$ and R$^{23}$ independently represents an alkyl group having 1 to 20 carbon atoms, an aryl group 6 or more carbon atoms, or an aralkyl group having 7 or more carbon atoms.). —NHCOOR$^{18}$, and —OCONHR$^{21}$ (here, each of R$^{18}$ and R$^{21}$ independently represents an alkyl group having 1 to 20 carbon atoms, an aryl group having 6 or more carbon atoms, or an aralkyl group having 7 or more carbon atoms) are more preferred, and —NHCOOR$^{18}$, and —OCONHR$^{21}$ (here, each of R$^{18}$ and R$^{21}$ independently represents an alkyl group having 1 to 10 carbon atoms, an aryl group having 6 or more carbon atoms, or an aralkyl group having 7 or more carbon atoms) are particularly preferred.

Examples of the "group having a coordinating oxygen atom" may include an acetylacetonato group, and a crown ether.

Also, preferred examples of the "group having a basic nitrogen atom" may include an amino group (—NH$_2$), a substituted imino group (—NHR$^8$, —NR$^9$R$^{10}$, herein, each of R$^8$, R$^9$, and R$^{10}$ independently represents an alkyl group having 1 to 20 carbon atoms, an aryl group having 6 or more carbon atoms, or an aralkyl group having 7 or more carbon atoms), a guanidyl group represented by Formula (a1) below, or an amidinyl group represented by Formula (a2) below.

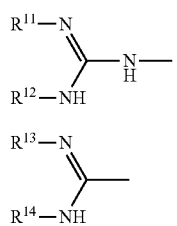

In Formula (a1), each of R$^{11}$ and R$^{12}$ independently represents an alkyl group having 1 to 20 carbon atoms, an aryl group having 6 or more carbon atoms, or an aralkyl group having 7 or more carbon atoms.

In Formula (a2), each of R$^{13}$ and R$^{14}$ independently represents an alkyl group having 1 to 20 carbon atoms, an aryl group having 6 or more carbon atoms, or an aralkyl group having 7 or more carbon atoms.

Among these, for example, an amino group (—NH$_2$), a substituted imino group (—NHR$^8$, —NR$^9$R$^{10}$, herein, each of R$^8$, R$^9$, and R$^{10}$ independently represents an alkyl group having 1 to 10 carbon atoms, a phenyl group, or a benzyl group), a guanidyl group represented by Formula (a1) above (in Formula (a1), each of R$^{11}$ and R$^{12}$ independently represents an alkyl group having 1 to 10 carbon atoms, a phenyl group or a benzyl group), an amidinyl group represented by Formula (a2) above (in Formula (a2), each of R$^{13}$ and R$^{14}$ independently represents an alkyl group having 1 to 10 carbon atoms, a phenyl group or a benzyl group) are more preferred.

In particular, for example, an amino group (—NH$_2$), a substituted imino group (—NHR$^8$, —NR$^9$R$^{10}$, each of R$^8$, R$^9$, and R$^{10}$ independently represents an alkyl group having 1 to 5 carbon atoms, a phenyl group, or a benzyl group), a guanidyl group represented by Formula (a1) (in Formula (a1), each of R$^{11}$ and R$^{12}$ independently represents an alkyl group having 1 to 5 carbon atoms, a phenyl group or a benzyl group), and an amidinyl group represented by Formula (a2) above (in Formula (a2), each of R$^{13}$ and R$^{14}$ independently represents an alkyl group having 1 to 5 carbon atoms, a phenyl group or a benzyl group) are preferably used.

In the "alkyloxycarbonyl group", an alkyl group moiety is preferably an alkyl group having 1 to 20 carbon atoms, and examples thereof may include a methyl group, and an ethyl group.

In the "alkylaminocarbonyl group", an alkyl group moiety is preferably an alkyl group having 1 to 20 carbon atoms, and examples thereof may include a methyl group, an ethyl group and a propyl group.

As for the "carboxylate group", a group constituted by an ammonium salt of carboxylic acid may be exemplified.

In the "sulfonamide group", a hydrogen atom bonded to a nitrogen atom may be substituted with, for example, an alkyl group (e.g., a methyl group), or an acyl group (e.g., an acetyl group, or a trifluoroacetyl group).

Preferred examples of the "heterocyclic structure" may include thiophene, furan, xanthene, pyrrole, pyrroline, pyrrolidine, dioxolane, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, piperazine, triazine, trithiane, isoindoline, isoindolinone, benzimidazolone, benzothiazole, imide groups such as succinimide, phthalimide, or naphthalimide, hydantoin, indole, quinoline, carbazole, acridine, acridone, and anthraquinone.

The "heterocyclic structure" may further include a substituent. Examples of the substituent may include an alkyl group having 1 to 20 carbon atoms, such as, a methyl group or an ethyl group, an aryl group having 6 to 16 carbon atoms, such as, a phenyl group or a naphthyl group, a hydroxyl group, an amino group, a carboxyl group, a sulfonamide group, an N-sulfonyl amide group, an acyloxy group having 1 to 6 carbon atoms such as an acetoxy group, an alkoxy group having 1 to 20 carbon atoms such as a methoxy group, or an ethoxy group, a halogen atom such as chlorine or bromine, an alkoxycarbonyl group having 2 to 7 carbon atoms such as a methoxycarbonyl group, an ethoxycarbonyl group, or a cyclohexyloxycarbonyl group, a cyano group, and a carbonate ester group such as t-butylcarbonate.

As for the "alkoxysilyl group", any one of a monoalkoxysilyl group, a dialkoxysilyl group, and a trialkoxysilyl group may be employed, but a trialkoxysilyl group is preferred, and examples thereof may include a trimethoxysilyl group and a triethoxysilyl group.

As for the "epoxy group", a substituted or unsubstituted oxirane group (ethylene oxide group) may be exemplified.

As for the linking group bonded to the adsorption site, a single bond or a linking group constituted by 1 to 100 carbon atoms, 0 to 10 nitrogen atoms, 0 to 50 oxygen atoms, 1 to 200 hydrogen atoms, and 0 to 20 sulfur atoms is preferred, and the organic linking group may be unsubstituted or further include a substituent.

Among the descriptions as above, $A^1$ is preferably a monovalent substituent having at least one kind of group selected from the group consisting of an acid group, an urea group, an urethane group, a sulfonamide group, an imide group and a group having a coordinating oxygen atom.

Particularly, in view of improving interaction with metal oxide particles (A) to improve a refractive index, and to reduce the viscosity of the composition, $A^1$ is more preferably a monovalent substituent having at least one kind of functional group with a pKa ranging from 5 to 14.

The "pKa" mentioned herein is the same as that defined in the description of Chemical Handbook (II)(revised $4^{th}$ edition, 1993, edited by Chemical Society of Japan, Maruzen Co., Ltd.).

As for the functional group with a pKa ranging from 5 to 14, an urea group, an urethane group, a sulfonamide group, an imide group or a group having a coordinating oxygen atom may be exemplified.

Specific examples may include an urea group (pKa ranging from about 12 to 14), an urethane group (pKa ranging from about 11 to 13), —COCH$_2$CO— as a coordinating oxygen atom (pKa ranging from about 8 to 10), and a sulfonamide group (pKa ranging from about 9 to 11).

$A^1$ is preferably represented as a monovalent substituent represented by Formula (4) below.

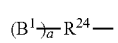

Formula (4)

In Formula (4) above, $B^1$ represents the adsorption site described above (that is, an acid group, an urea group, an urethane group, a group having a coordinating oxygen atom, a group having a basic nitrogen atom, an alkyloxycarbonyl group, an alkylaminocarbonyl group, a carboxylate group, a sulfonamide group, a heterocyclic group, an alkoxysilyl group, an epoxy group, an isocyanate group and a hydroxyl group), and $R^{24}$ represents a single bond or an (a+1)-valent linking group. a represents an integer of 1 to 10, and $B^1$'s present in Formula (4) may be the same or different.

As for the adsorption site represented by $B^1$, the same as those as adsorption sites which constitute $A^1$ in Formula (1) may be exemplified, and preferred examples are also the same.

Among them, an acid group, an urea group, an urethane group, a sulfonamide group, an imide group or a group having a coordinating oxygen atom is preferred, and a functional group having a pKa ranging from 5 to 14 is more preferred. In a more preferred view, an urea group, an urethane group, a sulfonamide group, an imide group and a group having a coordinating oxygen atom are more preferred.

$R^{24}$ represents a single bond or an (a+1)-valent linking group, and a represents a number of 1 to 10. Preferably, a ranges from 1 to 7, more preferably, a ranges from 1 to 5, and particularly preferably, a ranges from 1 to 3.

The (a+1)-valent linking group may include a group constituted by 1 to 100 carbon atoms, 0 to 10 nitrogen atoms, 0 to 50 oxygen atoms, 1 to 200 hydrogen atoms, and 0 to 20 sulfur atoms, and may be unsubstituted or further include a substituent.

As for $R^{24}$, a single bond or an (a+1)-valent linking group constituted by 1 to 50 carbon atoms, 0 to 8 nitrogen atoms, 0 to 25 oxygen atoms, 1 to 100 hydrogen atoms, and 0 to 10 sulfur atoms is preferred, a single bond or an (a+1)-valent linking group constituted by 1 to 30 carbon atoms, 0 to 6 nitrogen atoms, 0 to 15 oxygen atoms, 1 to 50 hydrogen atoms, and 0 to 7 sulfur atoms is more preferred, and a single bond or an (a+1)-valent linking group constituted by 1 to 10 carbon atoms, 0 to 5 nitrogen atoms, 0 to 10 oxygen atoms, 1 to 30 hydrogen atoms, and 0 to 5 sulfur atoms is particularly preferred.

In the descriptions above, when the (a+1)-valent linking group has a substituent, and examples of the substituent may include an alkyl group having 1 to 20 carbon atoms such as a methyl group or an ethyl group, an aryl group having 6 to 16 carbon atoms such as a phenyl group, or a naphthyl group, a hydroxyl group, an amino group, a carboxyl group, a sulfonamide group, an N-sulfonyl amide group, an acyloxy group having 1 to 6 carbon atoms such as an acetoxy group, an alkoxy group having 1 to 6 carbon atoms such as a methoxy group, or an ethoxy group, a halogen atom such as chlorine or bromine, an alkoxycarbonyl group having 2 to 7 carbon atoms such as a methoxycarbonyl group, an ethoxycarbonyl group, or a cyclohexyloxycarbonyl group, a cyano group, and a carbonate ester group such as t-butylcarbonate.

In Formula (1) above, $R^2$ represents a single bond or a divalent linking group. n $R^2$'s may be the same or different.

The divalent linking group may include a group constituted by 1 to 100 carbon atoms, 0 to 10 nitrogen atoms, 0 to 50 oxygen atoms, 1 to 200 hydrogen atoms, and 0 to 20 sulfur atoms, and may be unsubstituted or further include a substituent.

As for $R^2$, a single bond or a divalent linking group constituted by 1 to 50 carbon atoms, 0 to 8 nitrogen atoms, 0 to 25 oxygen atoms, 1 to 100 hydrogen atoms, and 0 to 10 sulfur atoms is preferred, a single bond or a divalent linking group constituted by 1 to 30 carbon atoms, 0 to 6 nitrogen atoms, 0 to 15 oxygen atoms, 1 to 50 hydrogen atoms, and 0 to 7 sulfur atoms is more preferred, and a single bond or a divalent linking group constituted by 1 to 10 carbon atoms, 0 to 5 nitrogen atoms, 0 to 10 oxygen atoms, 1 to 30 hydrogen atoms, and 0 to 5 sulfur atoms is particularly preferred.

Among them, when the divalent linking group has a substituent, examples of the substituent may include an alkyl group having 1 to 20 carbon atoms, such as, a methyl group or an ethyl group, an aryl group having 6 to 16 carbon atoms, such as, a phenyl group or a naphthyl group, a hydroxyl group, an amino group, a carboxyl group, a sulfonamide group, an N-sulfonyl amide group, an acyloxy group having 1 to 6 carbon atoms such as an acetoxy group, an alkoxy group having 1 to 6 carbon atoms such as a methoxy group, or an ethoxy group, a halogen atom such as chlorine or bromine, an alkoxycarbonyl group having 2 to 7 carbon atoms such as a methoxycarbonyl group, an ethoxycarbonyl group, or a cyclohexyloxycarbonyl group, a cyano group, and a carbonate ester group such as t-butylcarbonate.

In Formula (1) above, $R^1$ represents a (m+n)-valent linking group. m+n satisfies a range of 3 to 10.

The (m+n)-valent linking group represented by $R^1$ may include a group constituted by 1 to 100 carbon atoms, 0 to 10 nitrogen atoms, 0 to 50 oxygen atoms, 1 to 200 hydrogen atoms, and 0 to 20 sulfur atoms, and may be unsubstituted or further include a substituent.

Specific examples of the (m+n)-valent linking group represented by $R^1$ may include specific examples (1) to (17) disclosed in paragraphs 0082 and 008 of Patent Application Laid-Open No. 2007-277514.

In Formula (1) above, m represents an integer of 8 or less. m ranges preferably from 0.5 to 5, more preferably from 1 to 4, and particularly preferably from 1 to 3.

In Formula (1) above, n represents a number of 1 to 9. n ranges from 2 to 8, more preferably from 2 to 7, and particularly preferably from 3 to 6.

In Formula (1) above, $P^1$ represents a polymer chain, and may be selected from conventionally known polymers according to, for example, purposes. m $P^1$'s may be the same or different. In order to constitute a polymer chain, among polymers, at least one kind selected from the group consisting of a polymer or a copolymer of vinyl monomers, an ester polymer, an ether-based polymer, an urethane-based polymer, an amide polymer, an epoxy polymer, a silicon polymer, and their modified products or copolymers [such as, for example, a polyether/polyurethane copolymer, a copolymer of polymers of polyether/vinyl monomers (any one of a random copolymer, a block copolymer, or a graft copolymer)] is preferred, at least one kind selected from the group consisting of a polymer or a copolymer of vinyl monomers, an ester polymer, an ether-based polymer, an urethane-based polymer, and their modified products or copolymers is more preferred, and a polymer or a copolymer of vinyl monomers is particularly preferred.

The polymer chain $P^1$ preferably contains at least one kind of repeating unit.

In the polymer chain $P^1$, the number k of repetitions of the at least one kind repeating unit is preferably 3 or more and more preferably 5 or more, in view of exhibiting a steric repulsive force to improve dispersibility.

In view of suppressing expansion of the dispersant represented by Formula (1) above, and making titanium dioxide particles (D) densely present in a white cured film, the number k of repetitions of the at least one kind of repeating unit is preferably 50 or less, more preferably 40 or less, and further preferably 30 or less.

The polymer chain is preferably soluble in an organic solvent. When the affinity with the organic solvent is low, the affinity with the dispersion medium becomes weak, so that an adsorption layer sufficient for dispersion stabilization may not be secured.

The dispersant represented by Formula (1) above may be preferably the dispersant represented by Formula (2) below.

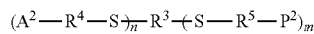

Formula (2)

In Formula (2) above, $A^2$ represents a monovalent substituent having at least one kind of group selected from the group consisting of an acid group, an urea group, an urethane group, a group having a coordinating oxygen atom, a group having a basic nitrogen atom, an alkyloxycarbonyl group, an alkylaminocarbonyl group, a carboxylate group, a sulfonamide group, a heterocyclic group, an alkoxysilyl group, an epoxy group, an isocyanate group and a hydroxyl group. n $A^2$'s may be the same or different.

$A^2$ is the same as $A^1$ in Formula (1) above, and preferred examples are the same.

In Formula (2) above, each of $R^4$ and $R^5$ independently represents a single bond or a divalent linking group. n $R^4$'s may be the same or different. m $R^5$'s may be the same or different.

As for the divalent linking group represented by $R^4$ or $R^5$, the same as those exemplified as the divalent linking group represented by $R^2$ of Formula (1) above are used, and preferred examples are also the same.

In Formula (2) above, $R^3$ represents a (m+n)-valent linking group. m+n satisfies a range of 3 to 10.

The (m+n)-valent linking group represented by $R^3$ may include a group constituted by 1 to 60 carbon atoms, 0 to 10 nitrogen atoms 0 to 50 oxygen atoms, 1 to 100 hydrogen atoms, and 0 to 20 sulfur atoms, and may be unsubstituted or further include a substituent.

As for the (m+n)-valent linking group represented by $R^3$, specifically, the same as those exemplified as the (m+n)-valent linking group represented by $R^1$ of Formula (1) above are used, and preferred examples are also the same.

In Formula (2) above, m represents an integer of 8 or less. m ranges preferably from 0.5 to 5, more preferably from 1 to 4, and particularly preferably from 1 to 3.

In Formula (2) above, n represents a number of 1 to 9. n ranges preferably from 2 to 8, more preferably from 2 to 7, and particularly preferably from 3 to 6.

$P^2$ in Formula (2) represents a polymer chain, and may be selected from conventional known polymers according to, for example, purposes. m $P^2$'s may be the same or different. Preferred examples of the polymer are the same as those for $P^1$ in Formula (1) above.

In the dispersant represented by Formula (2) above, it is most preferred to satisfy all of $R^3$, $R^4$, $R^5$, $P^2$, m, and n to be described below.

$R^3$: the above described specific example (1), (2), (10), (11), (16), or (17)

$R^4$: a single bond, or a divalent linking group constituted by the following structural unit or a combination of the structural units, which includes "1 to 10 carbon atoms, 0 to 5 nitrogen atoms, 0 to 10 oxygen atoms, 1 to 30 hydrogen atoms, and 0 to 5 sulfur atoms" (it may include a substituent, and examples of the substituent may include an alkyl group having 1 to 20 carbon atoms such as a methyl group or an ethyl group, an aryl group having 6 to 16 carbon atoms such as a phenyl group, or a naphthyl group, a hydroxyl group, an amino group, a carboxyl group, a sulfonamide group, an N-sulfonyl amide group, an acyloxy group having 1 to 6 carbon atoms such as an acetoxy group, an alkoxy group having 1 to 6 carbon atoms such as a methoxy group or an ethoxy group, a halogen atom such as chlorine or bromine, an alkoxycarbonyl group having 2 to 7 carbon atoms such as a methoxycarbonyl group, an ethoxycarbonyl group, or a cyclohexyloxycarbonyl group, a cyano group, and a carbonate ester group such as t-butylcarbonate).

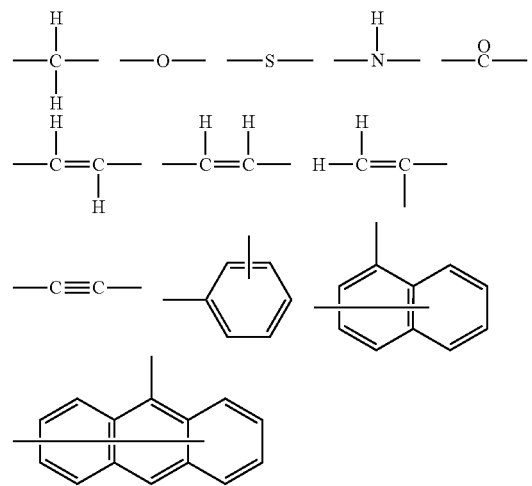

$R^5$: a single bond, an ethylene group, a propylene group, a group (a) below, or a group (b) below In the following groups, $R^{12}$ represents a hydrogen atom or a methyl group, and I represents 1 or 2.

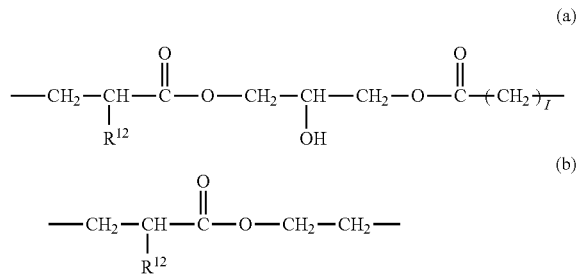

$P^2$: polymers or copolymers of vinyl monomers, ester polymers, ether-based polymers, urethane polymers and modified products thereof.

m: 1 to 3 n: 3 to 6

An acid value of the dispersant represented by Formula (1) or (2) above is not particularly limited, but in view of the dispersibility, the acid value is preferably 400 mg KOH/g or less, more preferably 300 mg KOH/g or less, and particularly preferably 250 mg KOH/g or less.

Also, the lower limit of the acid value is not particularly limited, but is preferably 5 mg KOH/g or more, and more preferably 10 mg KOH/g or more in view of the dispersion stability of titanium dioxide particles.

Here, the acid value of the dispersant represented by Formula (1) or (2) above is a solid acid value.

In the present invention, the acid value of the dispersant represented by Formula (1) or (2) may be calculated from the average content of the acid groups in, for example, the dispersant represented by Formula (1) or (2).

As for the molecular weight of the dispersant represented by Formula (1) or (2), a weight average molecular weight ranges preferably from 1000 to 50000, more preferably from 3000 to 30000, and particularly preferably from 3000 to 20000. When the weight average molecular weight is within the above described range, the effect of the plurality of adsorption sites introduced at the end of the polymer is sufficiently exhibited so that a performance excellent in adsorptivity to a titanium dioxide particle surface may be exhibited.

Specific examples of the dispersant represented by Formula (1) or (2) above may include polymer compounds C-1 to C-57 disclosed in paragraph 0316 or later of Japanese Patent Application Laid-Open No. 2007-277514.

(Synthesis Method of Dispersant Represented by Formula (1) or (2))

The dispersant represented by Formula (1) or (2) may be synthesized based on the synthesis method described in paragraphs 0114 to 0140 and 0266 to 0348 of Japanese Patent Application Laid-Open No. 2007-277514, but not particularly limited thereto.

As for a dispersant used for the curable resin composition for forming a high refractive index layer, a graft copolymer (hereinafter, also referred to as a "certain resin 2") is preferred. The graft copolymer has a graft chain in which the number of atoms excluding hydrogen atoms ranges from 40 to 10000. In this case, the graft chain indicates a chain from the base of a main chain of the copolymer (an atom bonded to the main chain in a group branching off from the main chain) to an end of a group branching off from the main chain. In the dispersion composition, the certain resin is a dispersion resin for providing a dispersibility to metal oxide particles, and has an affinity with a solvent due to the graft chain, and thus is excellent in dispersibility of the metal oxide particles, and dispersion stability after the elapse of time. In the dispersion composition, the graft chain and the solvent exhibit a satisfactory interaction, and thus it is thought that a degradation of the uniformity of a film thickness in a coated film is suppressed.

As for the graft copolymer, in one graft chain, the number of atoms excluding hydrogen atoms ranges preferably from 40 to 10000, more preferably from 100 to 500, and most preferably from 150 to 260. When the number is too small, the graft chain becomes short, and thus the steric repulsion effect may be reduced, thereby reducing the dispersibility or dispersion stability. Meanwhile, when the number is too large, the graft chain becomes extremely long, the adsorptive force to the metal oxide particles may be reduced, thereby reducing the dispersibility or dispersion stability. The number of atoms excluding hydrogen atoms in one graft chain indicates the number of atoms excluding hydrogen atoms included in a chain from an atom of a base bonded to the polymer chain constituting the main chain to an end of a branched polymer branching off from the main chain. When the graft copolymer includes two or more kinds of graft chains, the number of atoms excluding hydrogen atoms in at least one kind graft chain may preferably satisfy the requirements above.

Examples of the polymer structure of the graft chain may include a poly(meth)acrylic structure, a polyester structure, a polyurethane structure, a polyurea structure, a polyamide structure and a polyether structure. In order to improve interaction between the graft chain and the solvent, and thus to improve the dispersibility or dispersion stability, a graft chain having a poly(meth)acrylic structure, a polyester structure, or a polyether structure is preferred, and a graft chain having a polyester structure, or a polyether structure is more preferred.

It is preferred that the graft copolymer has a structural unit (repeating unit) having the graft chain. For example, a macromonomer having the polymer structure as a graft chain may be obtained by polymerization based on a conventional method, and the structure of such a macromonomer is not particularly limited as long as it has a substituent reactable with a polymer main chain section, and also has a graft chain satisfying the requirements. Preferably, a macromonomer having a reactive double bond group may be suitably used.

Examples of the commercially available macromonomer properly used in the synthesis of the certain resin 2 may include AA-6 (manufactured by Toagosei Co., Ltd.), AA-10 (manufactured by Toagosei Co., Ltd.), AB-6 (manufactured by Toagosei Co., Ltd.), AS-6 (manufactured by Toagosei Co., Ltd.), AN-6 (manufactured by Toagosei Co., Ltd.), AW-6 (manufactured by Toagosei Co., Ltd.), AA-714 (manufactured by Toagosei Co., Ltd.), AY-707 (manufactured by Toagosei Co., Ltd.), AY-714 (manufactured by Toagosei Co., Ltd.), AK-5 (manufactured by Toagosei Co., Ltd.), AK-30 (manufactured by Toagosei Co., Ltd.), AK-32 (manufactured by Toagosei Co., Ltd.), Blemmer PP-100 (manufactured by NOF Corporation), Blemmer PP-500 (manufactured by NOF Corporation), Blemmer PP-800 (manufactured by NOF Corporation), Blemmer PP-1000 (manufactured by NOF Corporation), Blemmer 55-PET-800 (manufactured by NOF Corporation), Blemmer PME-4000 (manufactured by NOF Corporation), Blemmer PSE-400

(manufactured by NOF Corporation), Blemmer PSE-1300 (manufactured by NOF Corporation), and Blemmer 43PAPE-600 B (manufactured by NOF Corporation). Among these, AA-6 (manufactured by Toagosei Co., Ltd.), AA-10 (manufactured by Toagosei Co., Ltd.), AB-6 (manufactured by Toagosei Co., Ltd.), AS-6 (manufactured by Toagosei Co., Ltd.), AN-6 (manufactured by Toagosei Co., Ltd.), and Blemmer PME-4000 (manufactured by NOF Corporation) are preferred.

The certain resin 2 preferably includes a structural unit represented by at least one of Formulas (1) to (4) below, as the structural unit having the graft chain.

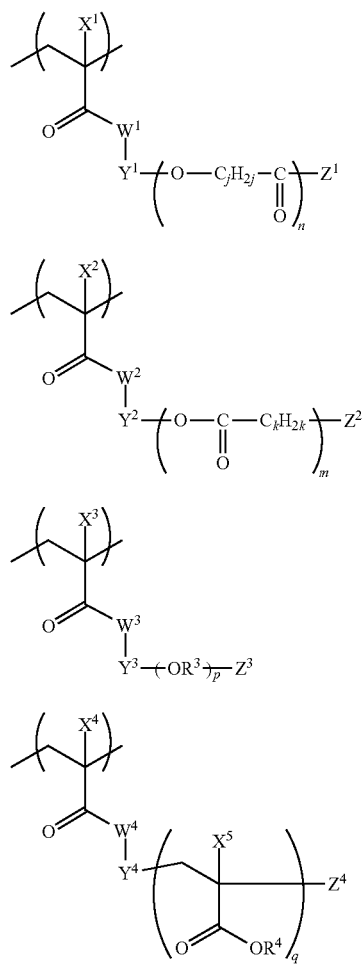

Each of $X^1$, $X^2$, $X^3$, $X^4$, and, $X^5$ independently represents a hydrogen atom or a monovalent organic group. In view of synthetic constraints, a hydrogen atom or an alkyl group having 1 to 12 carbon atoms is preferred, a hydrogen atom or a methyl group is more preferred, and a methyl group is particularly preferred.

Each of $W^1$, $W^2$, $W^3$, and, $W^4$ independently represents an oxygen atom or NH, and an oxygen atom is particularly preferred.

$R^3$ represents a branched or straight alkylene group (having preferably 1 to 10 carbon atoms, and more preferably 2 or 3 carbon atoms), and in view of the dispersion stability, is preferably a group represented by —$CH_2$—$CH(CH_3)$—, or a group represented by —$CH(CH_3)$—$CH_2$—. In the certain resin, two or more kinds of $R^3$'s having different structures may be used in combination.

Each of $Y^1$, $Y^2$, $Y^3$, and $Y^4$ is independently a divalent linking group, and, in particular, is not structurally constrained. Specifically, the following linking groups (Y-1) to (Y-21) may be exemplified. In the following structure, each of A and B indicates a bond to the left terminal group or the right terminal group in Formulas (1) to (4). In the structure illustrated below, for the convenience of synthesis, (Y-2) or (Y-13) is more preferred.

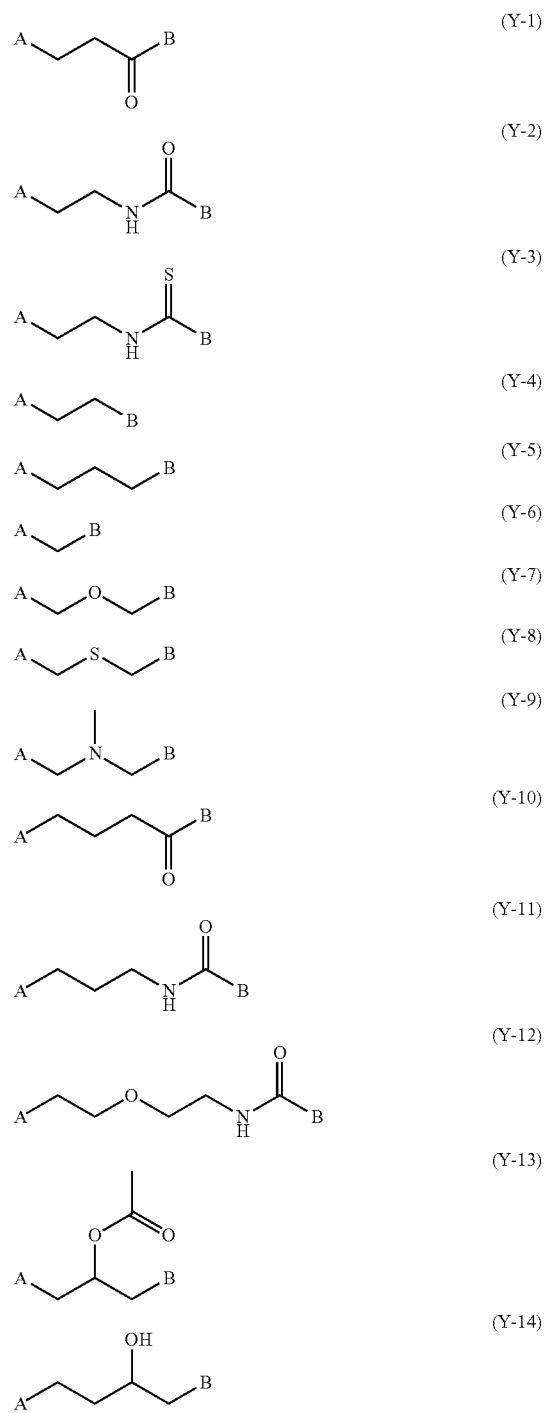

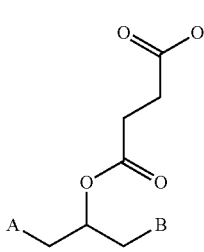
(Y-15)

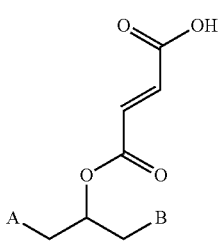
(Y-16)

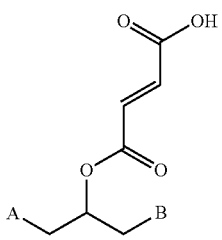
(Y-17)

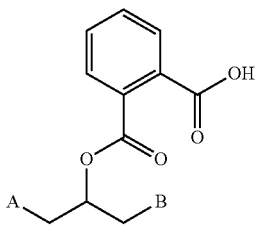
(Y-18)

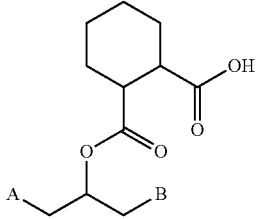
(Y-19)

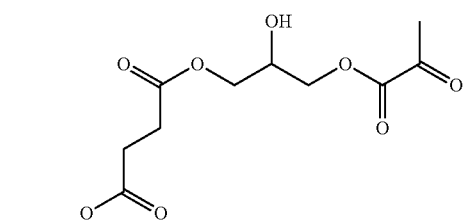
(Y-20)

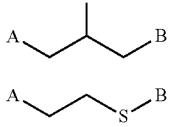
(Y-21)

Each of $Z^1$, $Z^2$, $Z^3$, and, $Z^4$ is independently a hydrogen atom or a monovalent substituent, and the structure of the substituent is not particularly limited, but, specifically, an alkyl group, a hydroxyl group, an alkoxy group, an aryloxy group, or a heteroaryloxy group, an alkylthioether group, an arylthio ether group, or a heteroarylthioether group, or an amino group may be exemplified. Among them, particularly, in view of improving the dispersibility, it is preferred to have a steric repulsion effect. Each of monovalent substituents represented by $Z^1$ to $Z^3$ is independently preferably an alkyl group having 5 to 24 carbon atoms or an alkoxy group having 5 to 24 carbon atoms, and among them, particularly independently an alkoxy group having a branched alkyl group having 5 to 24 carbon atoms, or an alkoxy group having a cyclic alkyl group having 5 to 24 carbon atoms is preferred. As for the monovalent substituent represented by $Z^4$, an alkyl group having 5 to 24 carbon atoms is preferred, and among them, as for each, independently, a branched alkyl group having 5 to 24 carbon atoms or a cyclic alkyl group having 5 to 24 carbon atoms is preferred.

Each of n, m, p, and, q is an integer of 1 to 500.

Each of j and k independently represents an integer of 2 to 8.

j and k, in view of the dispersion stability, is preferably an integer of 4 to 6, and most preferably 5.

$R^4$ represents a hydrogen atom or a monovalent organic group, and is not particularly structurally limited. A hydrogen atom, an alkyl group, an aryl group, or a heteroaryl group is preferred, and a hydrogen atom, or an alkyl group is more preferred. When $R^4$ is an alkyl group, as for the alkyl group, a straight alkyl group having 1 to 20 carbon atoms, a branched alkyl group having 3 to 20 carbon atoms, or a cyclic alkyl group having 5 to 20 carbon atoms is preferred, a straight alkyl group having 1 to 20 carbon atoms is more preferred, and a straight alkyl group having 1 to 6 carbon atoms is particularly preferred. In the certain resin, two or more kinds of $R^4$'s having different structures may be used in combination.

As for the structural unit represented by Formula (1) above, in view of the dispersion stability, a structural unit represented by Formula (1A) or (2A) below is more preferred.

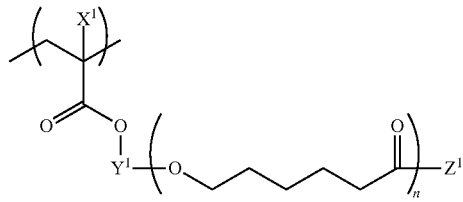
(1A)

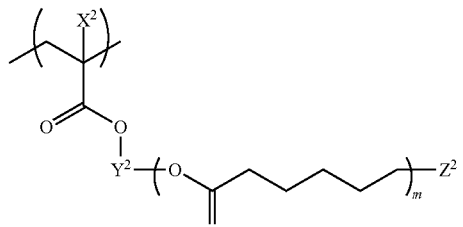
(2A)

In Formula (1A), $X^1$, $Y^1$, $Z^1$ and n are the same as $X^1$, $Y^1$, $Z^1$ and n in Formula (1), and preferred ranges thereof are also the same.

In Formula (2A), $X^2$, $Y^2$, $Z^2$ and m are the same as $X^2$, $Y^2$, $Z^2$ and m in Formula (2), and preferred ranges thereof are also the same.

It is more preferable that the certain resin 2 has a structural unit represented by Formula (1A) above.

The certain resin 2 includes the structural unit (repeating unit) having the graft chain, in a range of preferably 10% to 75%, more preferably 12% to 50% and particularly preferably 15% to 40% in mass conversion, based on the total mass of the certain resin 2. Within this range, the dispersibility or dispersion stability of the metal oxide particles is high, and the uniformity of the film thickness in the coated film formed using the dispersion composition becomes better. In the certain resin, two or more kinds of graft copolymers having different structures may be used in combination.

The certain resin 2 preferably a polymer which has the structural unit (repeating unit) having an acid group in a range of 25% by mass to 90% by mass, based on the total mass of the certain resin 2. The content of the structural unit having an acid group ranges more preferably from 50% by mass to 80% by mass, and most preferably from 60% by mass to 75% by mass, based on the total mass of the certain resin 2.

When the content of the structural unit having an acid group is within the above described range, the acid value of the certain resin may be properly adjusted within a preferred range as described below.

The acid group may also serve as a functional group capable of forming an interaction with metal oxide particles as well as the graft chain.

Examples of the acid group may include a carboxylic acid group, a sulfonic acid group, a phosphoric acid group, and a phenolic hydroxyl group, and in view of the adsorptive force to the metal oxide particles and the dispersibility•dispersion stability, at least one kind selected from a carboxylic acid group, a sulfonic acid group, and a phosphoric acid is preferred, and a carboxylic acid group is particularly preferred.

The acid group structure is preferably a structure distant from the main chain of a resin structure by 5 or more atoms. As for the acid group, a carboxylic acid bonded to an aromatic ring is most preferred.

The acid group may be used either alone or in combination of two or more kinds thereof.

The acid value of the certain resin 2 ranges preferably from 70 mgKOH/g to 350 mgKOH/g, more preferably from 80 mgKOH/g to 300 mgKOH/g, and further preferably from 100 mgKOH/g to 250 mgKOH/g. When the acid value is within the above described range, even in a case where the dispersion composition is applied to a wafer with a large size (e.g., 12 inch), it is possible to more reliably obtain a film with a small film thickness difference between a central portion and a peripheral portion of the wafer.

The acid value of the certain resin 2 may be calculated from, for example, the average content of the acid group in the certain resin. A resin having a desired acid value may be obtained by only changing the content of a monomer unit containing the acid group which constitutes the certain resin.

The certain resin 2 may further include, besides the graft chain and the acid group, a structural unit (repeating unit) having a functional group capable of forming an interaction with metal oxide particles. Such a structural unit having a functional group capable of forming an interaction other than metal oxide particles is not particularly structurally limited, but examples thereof may include a structural unit having a basic group, a structural unit having a coordinating group, and a structural unit having a group having a reactivity.

Examples of the basic group may include a primary amino group, a secondary amino group, a tertiary amino group, a hetero ring containing an N atom, and an amide group. A tertiary amino group which is good in an adsorptive force to metal oxide particles, and is high in the dispersibility dispersion stability is particularly preferred. As for the basic group, these may be used either alone or in combination of two or more kinds thereof.

The certain resin 2 may or may not contain a structural unit (repeating unit) having a basic group. When it contains such a structural unit, the content of the structural unit having a basic group preferably ranges from 0.1% by mass to 50% by mass, and particularly preferably from 0.1% by mass to 30% by mass based on the total mass of the certain resin.

Examples of the coordinating group or the group having a reactivity may include an acetyl acetoxy group, a trialkoxysilyl group, an isocyanate group, an acid anhydride residue, and an acid chloride residue. An acetyl acetoxy group which is good in an adsorptive force to metal oxide particles, and high in the dispersibility dispersion stability is particularly preferred. The coordinating group or the group having a reactivity may be used either alone or in combination of two or more kinds thereof.

The certain resin may or may not contain a structural unit (repeating unit) having a coordinating group or a group having a reactivity. When it contains the structural unit, the content of the structural unit having a coordinating group or a group having a reactivity ranges from 0.1% by mass to 50% by mass, and particularly preferably from 0.1% by mass to 30% by mass, based on the total mass of the certain resin.

The certain resin 2 may be synthesized by a conventionally known method. Examples of a solvent used for the synthesis may include, ethylene dichloride, cyclohexanone, methyl ethyl ketone, acetone, methanol, ethanol, propanol, butanol, ethylene glycol monomethyl ether, ethylene glycol monoethyl ether, 2-methoxyethyl acetate, 1-methoxy-2-propanol, 1-methoxy-2-propyl acetate, N,N-dimethylformamide, N,N-dimethylacetamide, dimethyl sulfoxide, toluene, ethyl acetate, methyl lactate, and ethyl lactate. These solvents may be may be used either alone or in combination of two or more kinds thereof.

Specific examples of the certain resin 2 may include compounds 1 to 32 to be exemplified below, but the present invention is not limited thereto. In the exemplary compounds below, the numerical value given to each structural unit (a numerical value given to a main chain repeating unit) represents the content of the corresponding structural unit (% by mass: referred to as (wt %)). The numerical value given to a repetition site of a side chain indicates the number of repetitions of the corresponding repetitive site.

(Exemplary Compound 1)
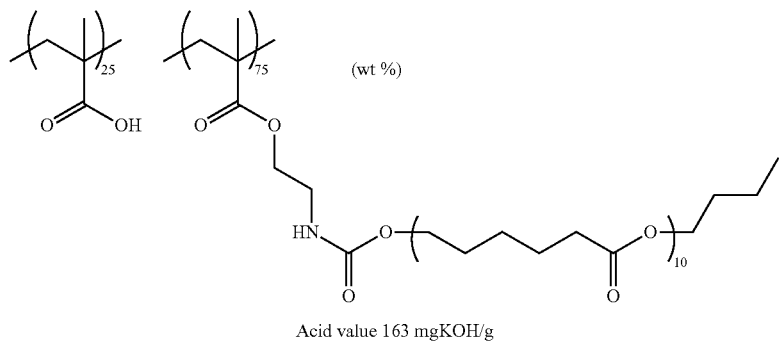
Acid value 163 mgKOH/g
(Exemplary Compound 2)
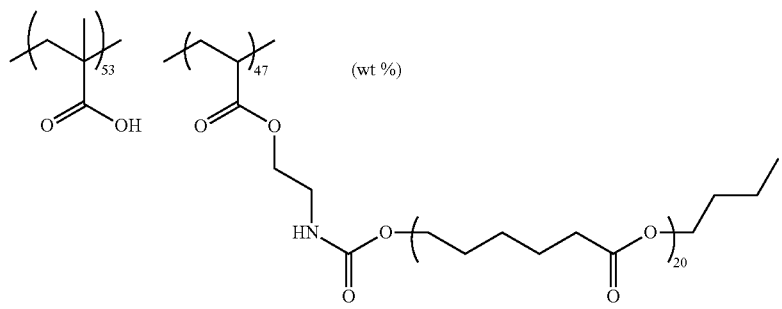
Acid value 345 mgKOH/g
(Exemplary Compound 3)
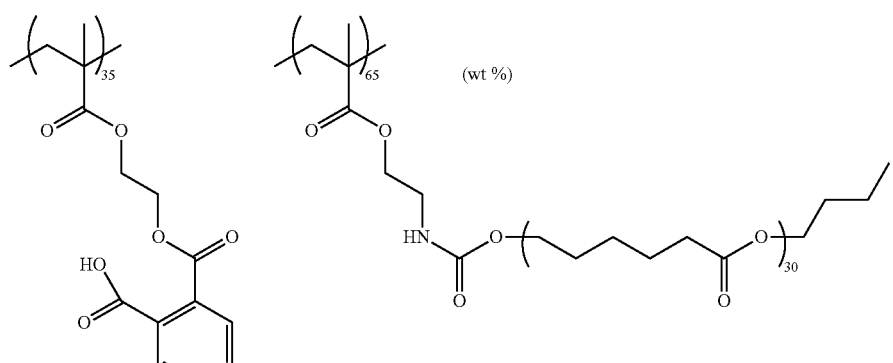
Acid value 71 mgKOH/g
(Exemplary Compound 4)
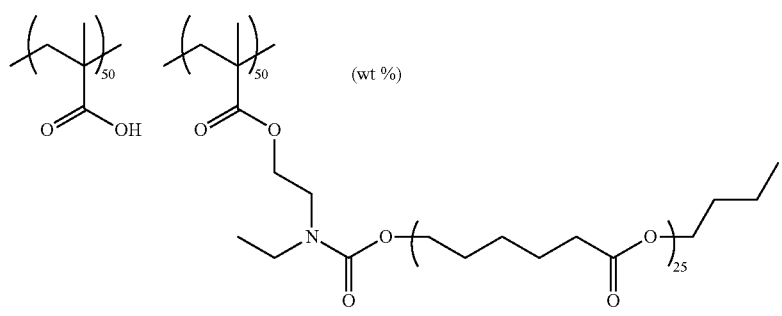
Acid value 326 mgKOH/g (Exemplary Compound 5)
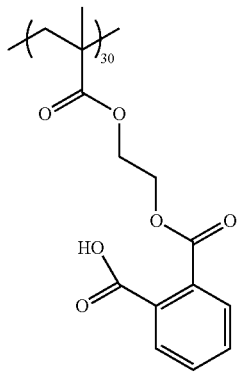 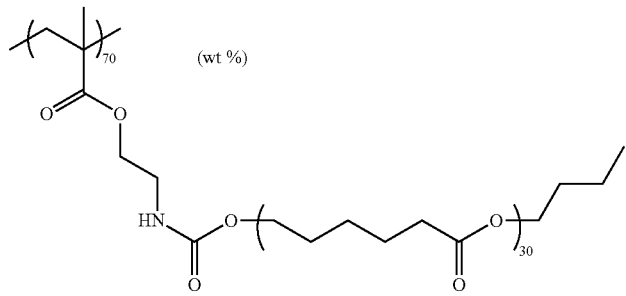
Acid value 60 mgKOH/g
(Exemplary Compound 6)
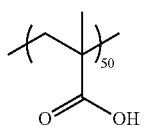 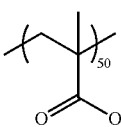
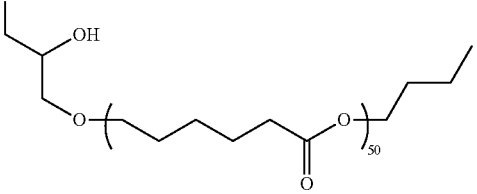
Acid value 326 mgKOH/g
(Exemplary Compound 7)
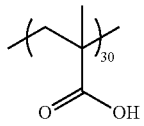 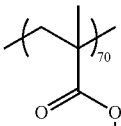
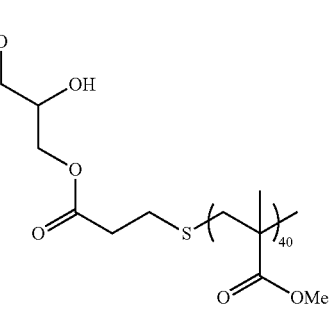
Acid value 196 mgKOH/g
(Exemplary Compound 8)
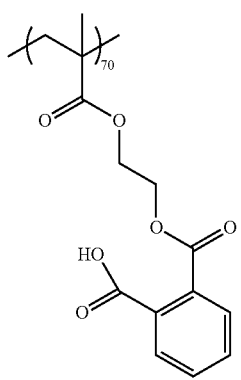 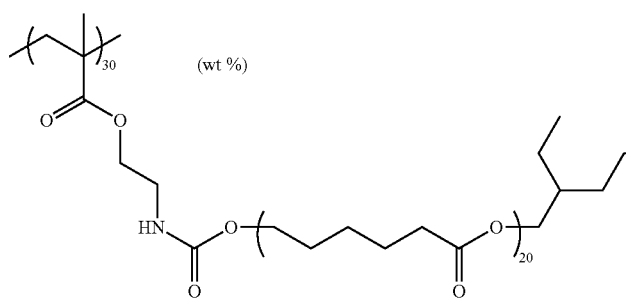
Acid value 141 mgKOH/g (Exemplary Compound 9)
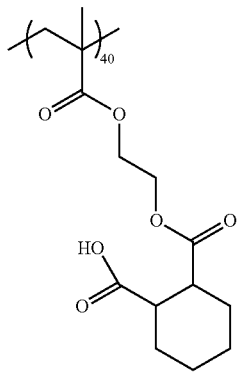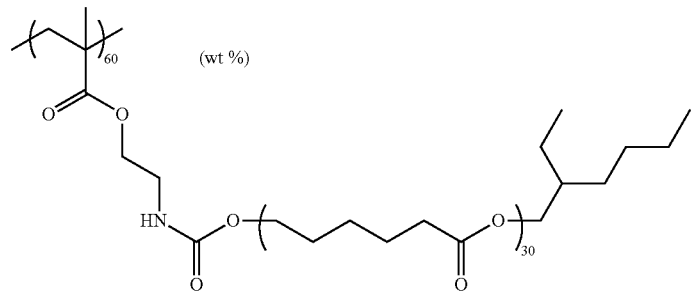
Acid value 79 mgKOH/g
(Exemplary Compound 10)
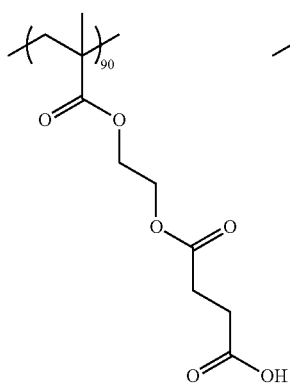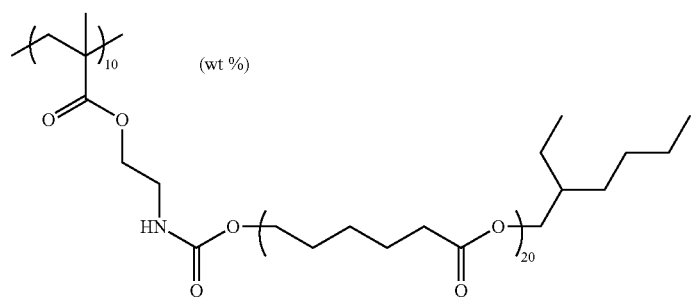
Acid value 219 mgKOH/g
(Exemplary Compound 11)
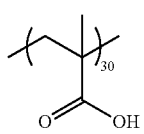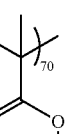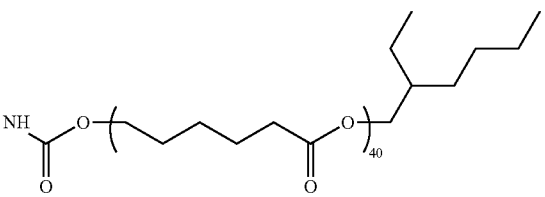
Acid value 196 mgKOH/g
(Exemplary Compound 12)
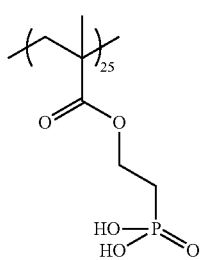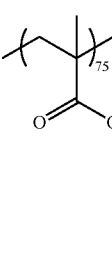
Acid value 144 mgKOH/g (Exemplary Compound 13)
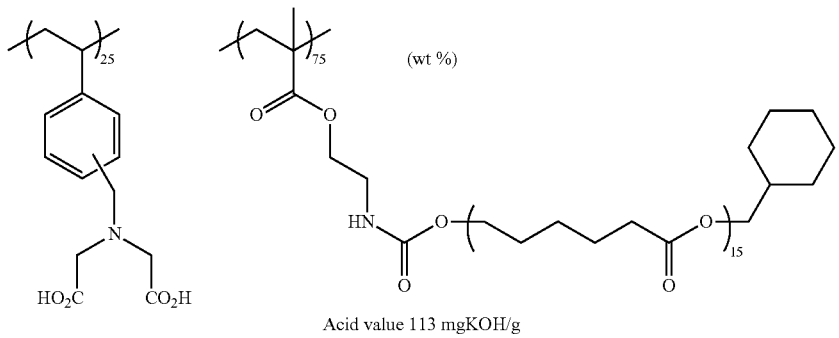
Acid value 113 mgKOH/g
(Exemplary Compound 14)
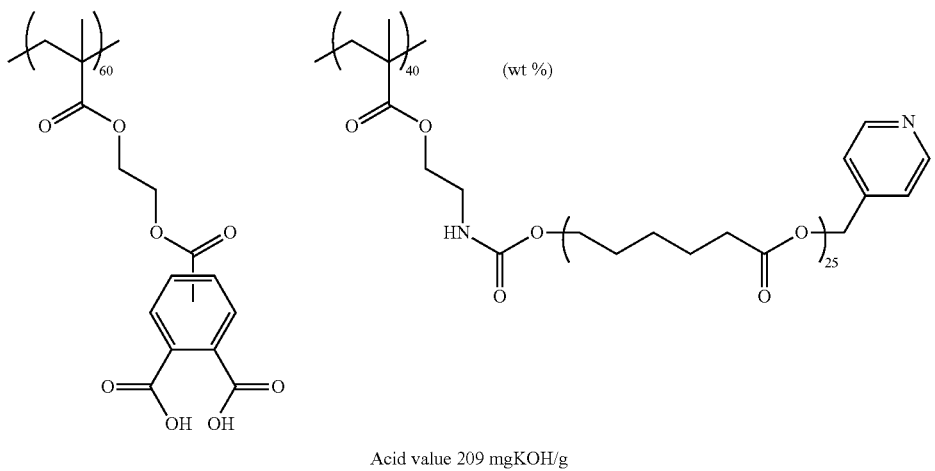
Acid value 209 mgKOH/g
(Exemplary Compound 15)
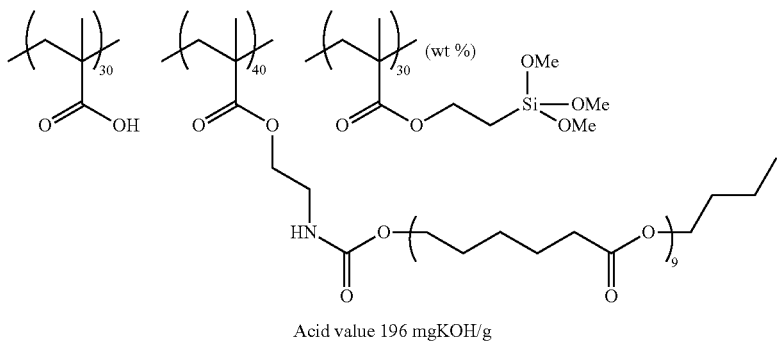
Acid value 196 mgKOH/g
(Exemplary Compound 16)
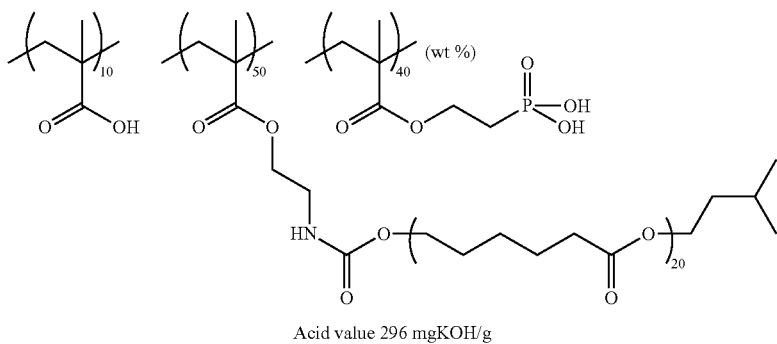
Acid value 296 mgKOH/g (Exemplary Compound 17)
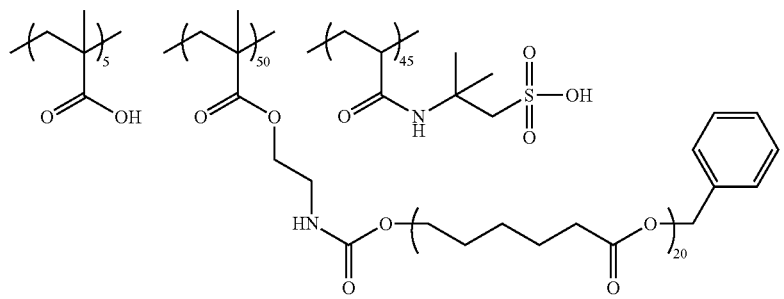
Acid value 154 mgKOH/g
(Exemplary Compound 18)
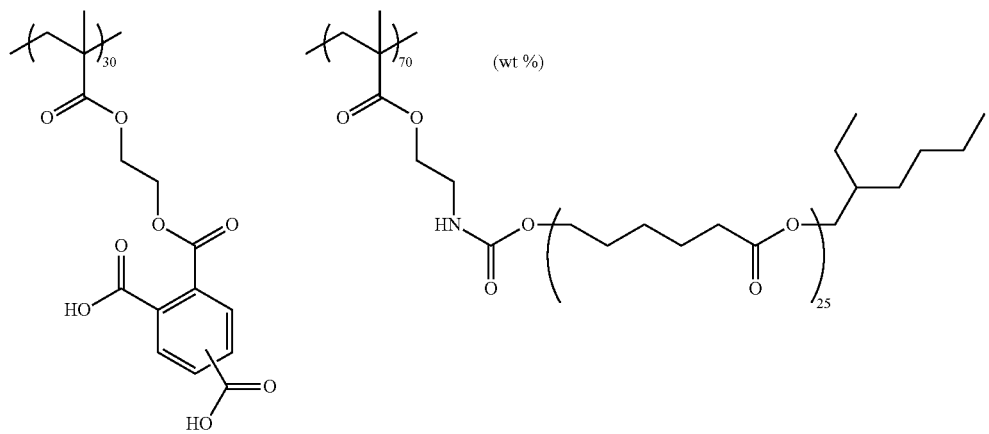
Acid value 104 mgKOH/g
(Exemplary Compound 19)
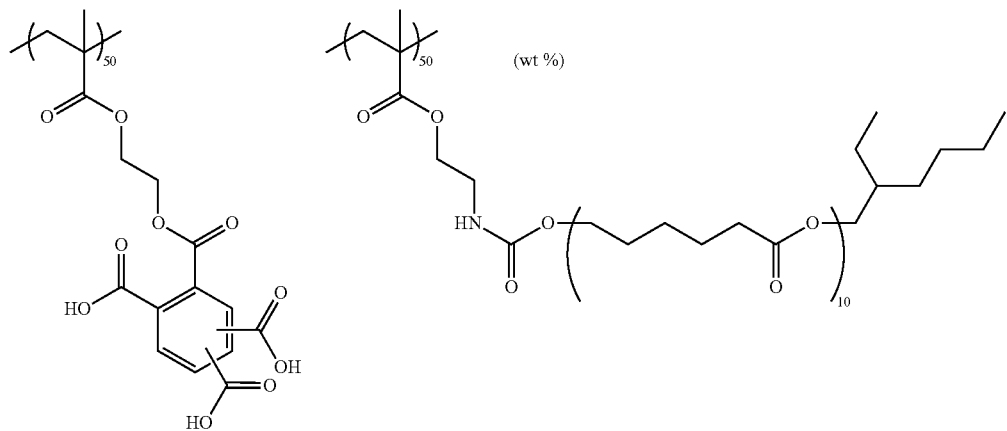
Acid value 230 mgKOH/g (Exemplary Compound 20)
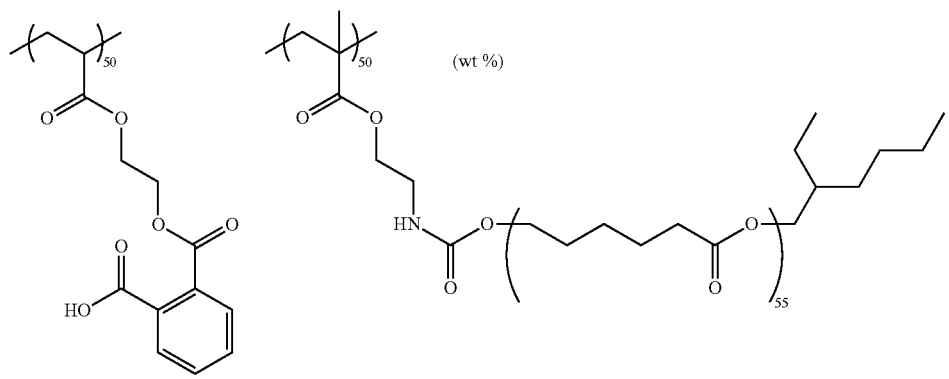
Acid value 101 mgKOH/g
(Exemplary Compound 21)
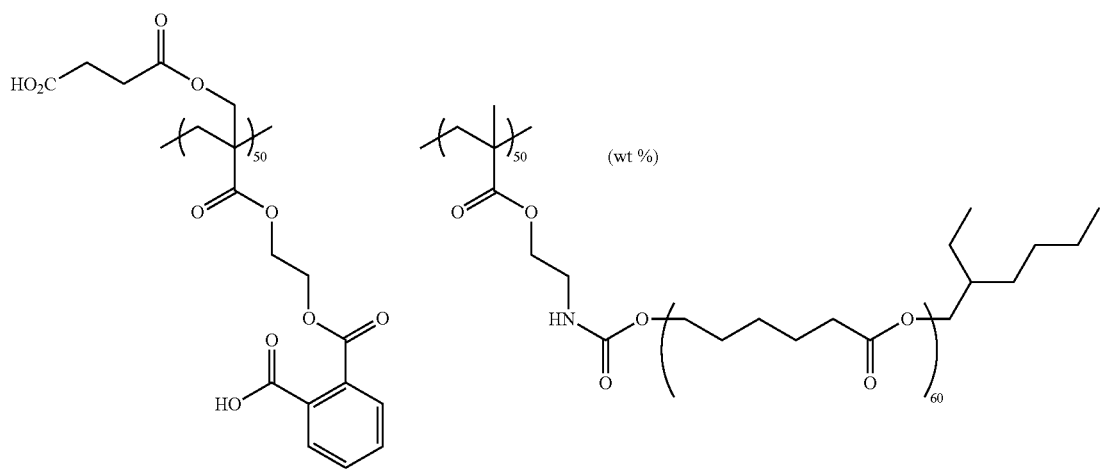
Acid value 142 mgKOH/g
(Exemplary Compound 22)
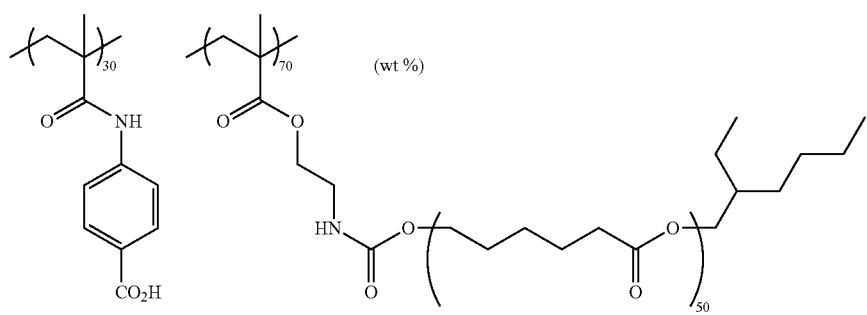
Acid value 82 mgKOH/g (Exemplary Compound 23)
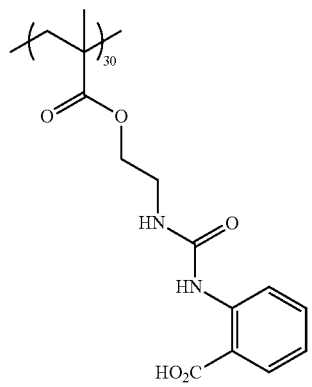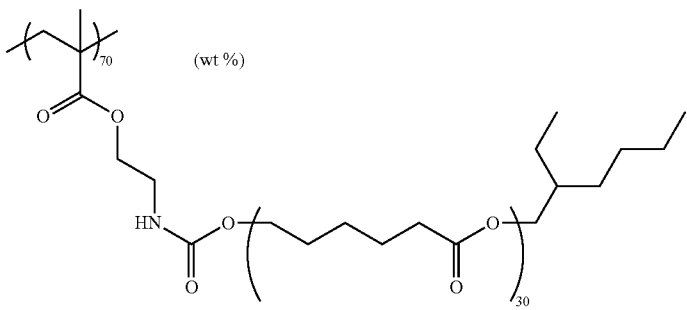
Acid value 58 mgKOH/g
(Exemplary Compound 24)
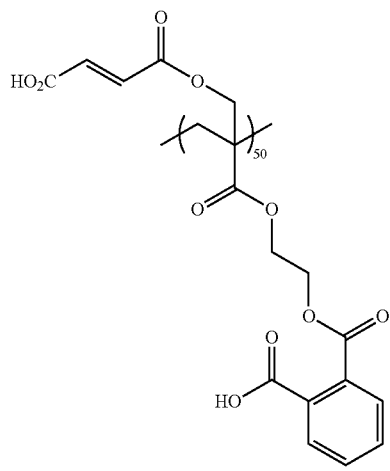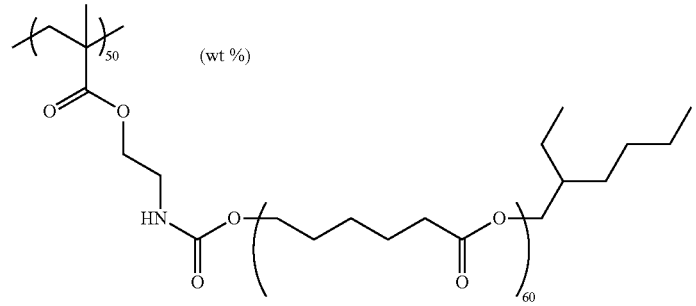
Acid value 143 mgKOH/g
(Exemplary Compound 25)
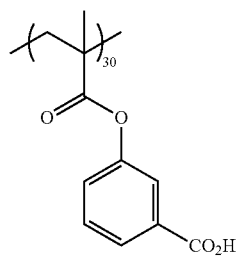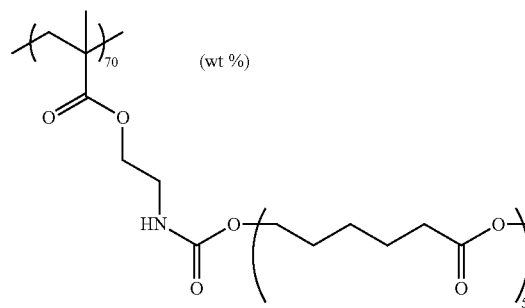
Acid value 82mgKOH/g (Exemplary Compound 26)
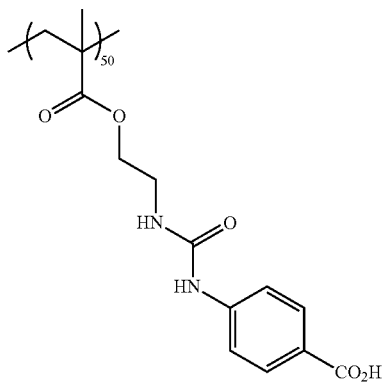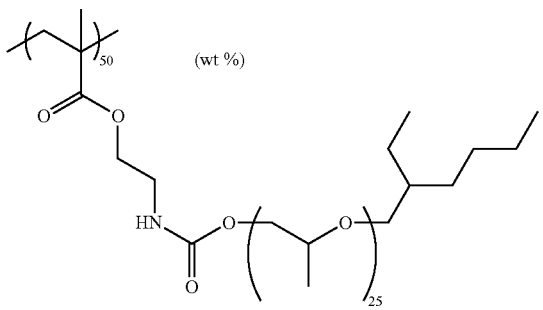
Acid value 96 mgKOH/g
(Exemplary Compound 27)
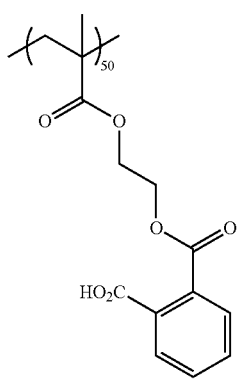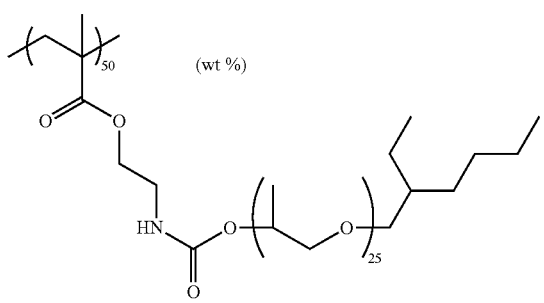
Acid value 101 mgKOH/g
(Exemplary Compound 28)
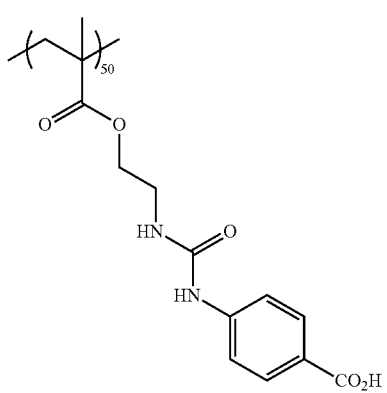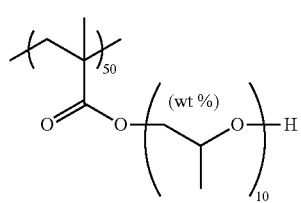
Acid value 96 mgKOH/g (Exemplary Compound 29)
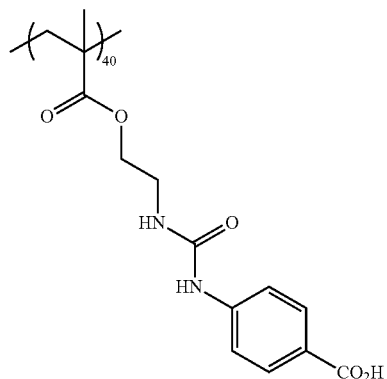 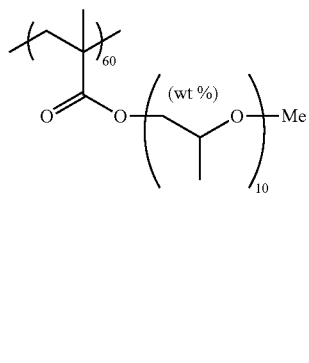
Acid value 77 mgKOH/g
(Exemplary Compound 30)
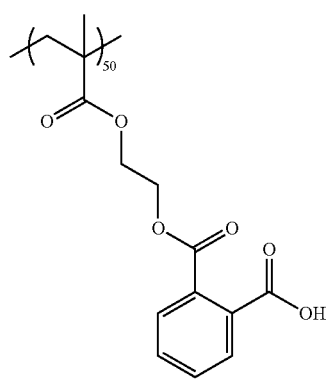 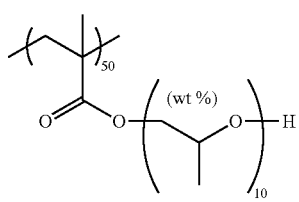
Acid value 101 mgKOH/g
(Exemplary Compound 31)
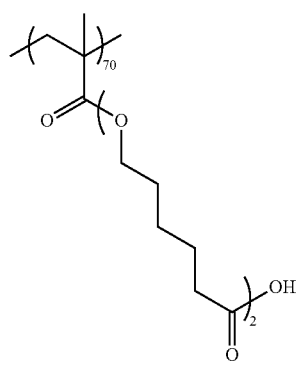 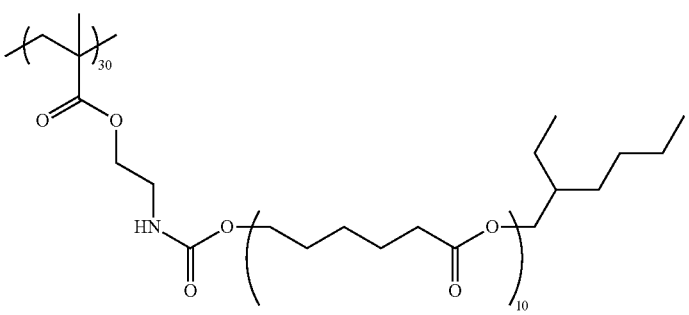
Acid value 125 mgKOH/g
(Exemplary Compound 32)
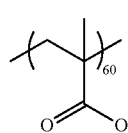 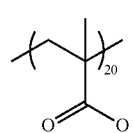 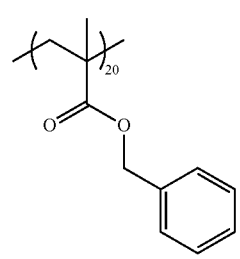
Acid value 391 mgKOH/g The weight average molecular weight (in terms of polystyrene measured by GPC) of the certain resin 2 ranges preferably from 5,000 to 300,000, more preferably from 7,000 to 100,000, and particularly preferably from 10,000 to 50,000.

As for the dispersant, an oligoimine-based dispersant including a nitrogen atom at least one of a main chain and a side chain thereof may be preferably used. As for the oligoimine-based dispersant, a dispersion resin (hereinafter, suitably referred to as "specific dispersion resin 3"), which includes a repeating unit including a partial structure X having a functional group with a $pK_a$ of 14 or less, and a side chain including a side chain Y having an atomic number of 40 to 10,000, and has a basic nitrogen atom at least one of a main chain and a side chain thereof, is preferred. Here, the basic nitrogen atom is not particularly limited as long as it is a nitrogen atom showing basicity.

The certain resin 3 may have a partial structure W to be paired with, for example, the partial structure X. The partial structure W is preferably a structure having a nitrogen atom with a $pK_b$ of 14 or less, and more preferably contains a structure having a nitrogen atom with a $pK_b$ of 10 or less. The base strength $pK_b$ refers to $pK_b$ at water temperature of 25° C., which is one of indicators for quantitatively indicating a base strength, and is synonymous with a basicity constant. The base strength $pK_b$ and the acid strength $pK_a$ to be described below have a relationship of $pK_b=14-pK_a$. When the partial structure X and the partial structure W are paired to form a salt structure, on the assumption of each dissociated structure thereof, in a compound ionically bonded to protons ($H^+$) or hydroxide ions ($OH^-$), $pK_a$ and $pK_b$ are evaluated. The partial structure X will be described below in more detail.

Details of the preferred range of the partial structure X are the same as those in the partial structure X to be described below. Also, the details of the preferred range of the side chain Y are the same as those in the side chain Y to be described below. W as described above is preferably a structure in which a junction of the side chain Y is dissociated to be an ionic bonding side.

An example of the specific dispersion resin 3 may be a resin represented by formula [B] below.

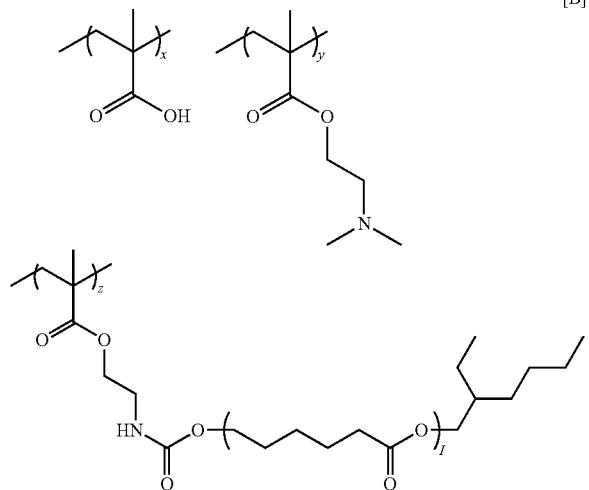

[B]

In the formulas above, each of x, y and z represents a polymerization molar ratio of repeating units, and it is preferred that x ranges from 5 to 50, y ranges from 5 to 60, and z ranges from 10 to 90. l represents the number of linked polyester chains, and is an integer capable of forming a side chain with an atomic number of 40 to 10,000. l ranges preferably from 5 to 100,000, more preferably from 20 to 20,000, and further preferably from 40 to 2,000. The repeating unit whose copolymerization ratio is defined by x in formula is a partial structure X, and the repeating unit whose copolymerization ratio is defined by z in formula is a partial structure Y.

As for the specific dispersion resin 3, a dispersion resin (hereinafter, properly referred to as a "specific dispersion resin (B1)") which has a repeating unit (i) having a basic nitrogen atom and a side chain (ii) including a side chain Y with an atomic number of 40 to 10,000 is particularly preferred, in which the repeating unit (i) is at least one kind selected from a poly(lower alkylene imine) based repeating unit, a polyallylamine-based repeating unit, a polydiallylamine-based repeating unit, a metaxylenediamine-epichlorohydrin polycondensate-based repeating unit, and a polyvinylamine-based repeating unit, and also has a partial structure X which is bonded to the basic nitrogen atom and has a functional group with a $pK_a$ of 14 or less.

The specific dispersion resin (B1) has the repeating unit (i). Accordingly, the adsorptive force of the dispersion resin to the particle surface may be improved, and also an interaction between particles may be reduced. Poly(lower alkylene imine) may have a chain form or a mesh form. Here, lower alkylene imine refers to alkylene imine including an alkylene chain having 1 to 5 carbon atoms. It is preferred that the repeating unit (i) forms a main chain portion in the specific dispersion resin. The number average molecular weight of the corresponding main chain portion, that is, the number average molecular weight of a portion of the specific dispersion resin (B1) excluding the side chain (which includes the side chain Y) preferably ranges from 100 to 10,000, more preferably from 200 to 5,000, and most preferably from 300 to 2,000. The number average molecular weight of the main chain portion may be measured in terms of polystyrene by a GPC method.

As for the specific dispersion resin (B1), a dispersion resin which includes a repeating unit represented by Formula (I-1) below and a repeating unit represented by Formula (I-2), or a repeating unit represented by Formula (I-1) and a repeating unit represented by Formula (I-2a) is preferred.

(I-1)

(I-2)

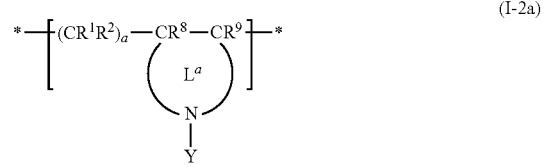

(I-2a)

Each of $R^1$ and $R^2$ independently represents a hydrogen atom, a halogen atom or an alkyl group (preferably having 1 to 6 carbon atoms). a represents independently an integer of 1 to 5. * represents a linking portion between repeating units.

Each of $R^8$ and $R^9$ is the same group as $R^1$.

L is a single bond, an alkylene group (preferably having 1 to 6 carbon atoms), an alkenylene group (preferably having 2 to 6 carbon atoms), an arylene group (preferably having 6 to 24 carbon atoms), a heteroarylene group (preferably having 1 to 6 carbon atoms), an imino group (preferably having 0 to 6 carbon atoms), an ether group, a thioether group, a carbonyl group, or a linking group according to a combination thereof. Among them, a single bond or —$CR^5R^6$—$NR^7$— (an imino group is toward X or Y) is preferred. Here, $R^5R^6$ independently represents a hydrogen atom, a halogen atom, or an alkyl group (preferably having 1 to 6 carbon atoms). $R^7$ is a hydrogen atom or an alkyl group having 1 to 6 carbon atoms.

$L^a$ is a structural portion which forms a ring structure, together with $CR^8CR^9$ and N, and is preferably a structural portion which forms a non-aromatic heterocyclic ring having 3 to 7 carbon atoms, together with carbon atoms of $CR^8CR^9$. A structural portion which forms a 5 to 7 membered non-aromatic heterocyclic ring together with carbon atoms of $CR^8CR^9$ and N (nitrogen atom) is more preferred, a structural portion forming a 5-membered non-aromatic heterocyclic ring is further preferred, and a structural portion forming pyrrolidine is particularly preferred. However, the corresponding structural portion may further have a substituent such as an alkyl group.

X represents a group having a functional group with a $pK_a$ of 14 or less.

Y represents a side chain having an atomic number of 40 to 10,000.

The specific dispersion resin (B1) preferably includes the repeating unit represented by Formula (I-3), Formula (I-4), or Formula (I-5), as a copolymerization component. When the specific dispersion resin (B1) includes such a repeating unit, the dispersibility may be further improved.

(I-3)

(I-4)

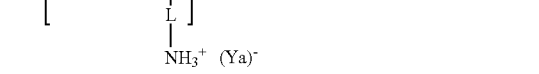
(I-5)

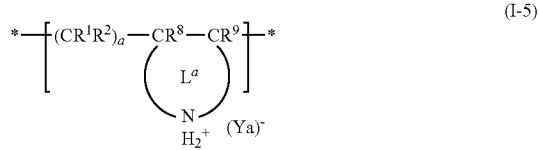

$R^1$, $R^2$, $R^8$, $R^9$, L, La, a and * are the same as those defined in Formulas (I-1), (I-2), and (I-2a).

Ya represents a side chain with an atomic number of 40 to 10,000 which has an anionic group. The repeating unit represented by Formula (I-3) may be formed by adding an oligomer or a polymer to a resin having a primary or secondary amino group in a main chain portion thereof, and causing a reaction, in which the oligomer or polymer has a group for forming a salt by a reaction with amine. Ya is preferably Formula (III-2) below.

In Formula (I-1) to Formula (I-5), each of $R^1$ and $R^2$ is particularly preferably a hydrogen atom. a is preferably 2 in view of availability of a raw material.

The specific dispersion resin (B1) may include lower alkylene imine containing a primary or tertiary amino group, as a repeating unit. In such a lower alkylene imine repeating unit, a nitrogen atom may be further bonded to a group represented by X, Y or Ya as described above. a resin which includes both a repeating unit bonded to a group represented by X and a repeating unit bonded to Y in such a main chain structure is also included in the specific dispersion resin (B1).

The repeating unit represented by Formula (I-1) is, in view of the storage stability and the developability, preferably included in a range of 1 mol % to 80 mol %, and most preferably in a range of 3 mol % to 50 mol % based on the total repeating units included in the specific dispersion resin (B1). The repeating unit represented by Formula (I-2), in view of the storage stability, is preferably included in a range of 10 mol % to 90 mol % and most preferably in a range of 30 mol % to 70 mol % based on the total repeating units included in the specific dispersion resin (B1). In view of the dispersion stability and the balance between hydrophilicity and hydrophobicity, the content ratio ((I-1):(I-2)) of the repeating unit (I–1) and the repeating unit (I-2) ranges preferably from 10:1 to 1:100 in a molar ratio, and more preferably from 1:1 to 1:10. The repeating unit represented by Formula (I-3), which is used in combination as required, in view of the effect, is preferably included in a range of 0.5 mol % to 20 mol % and most preferably in a range of 1 mol % to 10 mol % based on the total repeating units included in the specific dispersion resin (B1). The ionic bond of the polymer chain Ya may be confirmed by infrared spectroscopy or base titration.

The description on the copolymerization ratio of Formula (I-2) above is the same for the repeating unit represented by Formula (I-2a), Formula (I-4), and Formula (I-5), and when both are included, it refers the total amount.

Partial Structure X

The partial structure X in each formula above has a functional group having a pKa of 14 or less at water temperature of 25° C. The "pKa" mentioned herein is the same as that defined in the description of Chemical Handbook (II) (revised $4^{th}$ edition, 1993, edited by Chemical Society of Japan, Maruzen Co., Ltd.). The structure of a "functional group with a pKa of 14 or less" is not particularly limited as long as its physical property satisfies the condition, and a conventionally known functional group having a pKa satisfying the above described range may be exemplified. A functional group with a pKa of 12 or less is particularly preferred, and a functional group with a pKa of 11 or less is particularly preferred. There is no particular lower limit, but the lower limit is −5 or more in actuality. Specific examples of the partial structure X may include a carboxylic acid group (pKa: about 3 to 5), a sulfonic acid (pKa: about −3 to −2), —$COCH_2CO$— (pKa: about 8 to 10), —$COCH_2CN$ (pKa: about 8 to 11), —CONHCO—, a phenolic hydroxyl group, —$RFCH_2OH$ or —$(R_F)_2$ CHOH ($R_F$ represents a perfluoroalkylene group or a perfluoro alkyl group. pKa: about 9 to 11), and a sulfonamide group (pKa: about 9 to 11), and a carboxylic acid group (pKa: about 3 to 5), a sulfonic acid group (pKa: about −3 to −2), and —$COCH_2CO$— (pKa: about 8 to 10) are particularly preferred.

Since the functional group included in the partial structure X has a pKa of 14 or less, an interaction with high refractive particles may be achieved. The partial structure X is preferably directly bonded to a basic nitrogen atom in a repeating unit having the basic nitrogen atom. The partial structure X may be not only covalently bonded but also ionically bonded to form a salt. As for the partial structure X, particularly, a structure represented by Formula (V-1), (V-2) or (V-3) below may be preferably included.

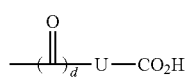  (V-1)

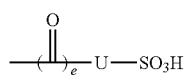  (V-2)

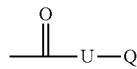  (V-3)

U represents a single bond or a divalent linking group.
Each of d and e independently represents 0 or 1.
Q represents an acyl group or an alkoxycarbonyl group.
Examples of a divalent linking group represented by U may include alkylene (more specifically, e.g., $—CH_2—$, $—CH_2CH_2—$, $—CH_2CHMe—$ (Me is a methyl group), $—(CH_2)_5—$, $—CH_2CH(n-C_{10}H_{21})—$), oxygen-containing alkylene (more specifically, e.g., $—CH_2OCH_2—$, $—CH_2CH_2O\ CH_2CH_2—$), an arylene group (e.g., phenylene, tolylene, biphenylene, naphthylene, furanylene, pyrrolylene), and alkyleneoxy (e.g., ethyleneoxy, propyleneoxy, phenyleneoxy). An alkylene group having 1 to 30 carbon atoms or an arylene group having 6 to 20 carbon atoms is particularly preferred, and an alkylene having 1 to 20 carbon atoms or an arylene group having 6 to 15 carbon atoms is most preferred.

In view of productivity, d is preferably 1, and e is preferably 0.

Q represents an acyl group or an alkoxycarbonyl group. As for an acyl group in Q, an acyl group having 1 to 30 carbon atoms (e.g., formyl, acetyl, n-propanoyl, benzoyl) is preferred, and acetyl is particularly preferred. As for an alkoxycarbonyl group in Q, Q is particularly an acyl group, and an acetyl group is preferred in view of the manufacturing easiness and the availability of a raw material (precursor $X^a$ of X).

The partial structure X is preferably bonded to a basic nitrogen atom in a repeating unit having the basic nitrogen atom. Accordingly, the dispersibility and the dispersion stability of titanium dioxide particles are dramatically improved. The partial structure X also imparts a solvent solubility, and thus suppresses the precipitation of the resin with elapse of time. This is assumed to contribute to the dispersion stability. Further, the partial structure X includes a functional group having a pKa of 14 or less, and thus also serves as an alkali-soluble group. Accordingly, the developability is improved, and it is thought that the dispersibility, the dispersion stability, and the developability may be compatibly achieved.

The content of the functional group with a pKa of 14 or less in the partial structure X is not particularly limited, but ranges preferably from 0.01 mmol to 5 mmol, and particularly preferably from 0.05 mmol to 1 mmol based on 1 g of the specific dispersion resin (B1). In a case of the acid value, the specific dispersion resin (B1) having an acid value ranging from about 5 mgKOH/g to 50 mgKOH/g is preferably included, in view of the developability.

Side Chain Y

As for Y, conventionally known polymer chains capable of being linked to the main chain portion of the specific dispersion resin (B1), such as polyester, polyamide, polyimide, poly(meth)acrylate, may be exemplified. In Y, a binding site with a specific dispersion resin (B1) is preferably a terminal of the side chain Y.

Y is preferably bonded to a nitrogen atom included in the repeating unit having the nitrogen atom, in which the repeating unit is at least one kind selected from a poly(lower alkylene imine) based repeating unit, a polyallylamine amine-based repeating unit, a polydiallylamine-based repeating unit, a metaxylenediamine-epichlorohydrin polycondensate-based repeating unit, and a polyvinylamine-based repeating unit. Y is bonded to the main chain portion of the repeating unit having a basic nitrogen atom through a covalent bond, an ionic bond, or a combination of the covalent bond and the ionic bond in which the repeating unit is at least one kind selected from a poly(lower alkylene imine) based repeating unit, a polyallylamine amine-based repeating unit, a polydiallylamine-based repeating unit, a metaxylenediamine-epichlorohydrin polycondensate-based repeating unit, and a polyvinylamine-based repeating unit. The ratio of the bonding modes between Y and the main chain portion (a covalent bond:an ionic bond) ranges from 100:0 to 0:100, preferably from 95:5 to 5:95, and particularly preferably from 90:10 to 10:90.

Y is preferably bonded to the nitrogen atom of the repeating unit having the basic nitrogen atom through an amide bond, or is, as a carboxylate, ionically bonded to the nitrogen atom.

The number of atoms in the side chain Y ranges preferably from 50 to 5,000 and more preferably from 60 to 3,000 in view of the dispersibility•dispersion stability•developability.

The number average molecular weight of Y may be measured in terms of polystyrene through a GPC method. Here, the molecular weight of Y is practically measured before Y is incorporated into the resin. The number average molecular weight of Y ranges particularly preferably from 1,000 to 50,000, and most preferably from 1,000 to 30,000 in view of the dispersibility•dispersion stability•developability. The molecular weight of Y may be specified from a polymer compound which is a raw material of Y, and is measured according to the measurement conditions according to GPC below.

It is preferred that two or more side chain structures represented by Y are linked to a backbone chain in one resin molecule, and it is particularly preferred that five or more side chain structures are linked.

Particularly, Y preferably has a structure represented by Formula (III-1).

  (III-1)

In Formula (III-1), Z is a polymer or an oligomer having a polyester chain as a partial structure, and represents a residue obtained by removing a carboxyl group from a polyester having a free carboxylic acid represented by HO—CO—Z. When the specific dispersion resin (B1) contains a repeating unit represented by Formulas (I-3) to (I-5), Ya is preferably Formula (III-2).

  (III-2)

In Formula (III-2), Z is the same as Z in Formula (III-1). In the partial structure Y, a polyester having a carboxyl group at one end may be obtained by polycondensation of carboxylic acid and lactone, polycondensation of a hydroxy group-containing carboxylic acid, or polycondensation of divalent alcohol and divalent carboxylic acid (or cyclic acid anhydride).

Z is preferably $-(L^B)_{nB}-Z^B$.

$Z^B$ represents a hydrogen atom or a monovalent organic group. When $Z^B$ is an organic group, an alkyl group (preferably having 1 to 30 carbon atoms), an aryl group, or a heterocyclic group is preferred. $Z^B$ may further include a substituent, and as for the substituent, an aryl group having 6 to 24 carbon atoms, and a heterocyclic group having 3 to 24 carbon atoms may be exemplified.

$L^B$ is an alkylene group (preferably having 1 to 6 carbon atoms), an alkenylene group (preferably having 2 to 6 carbon atoms), an arylene group (preferably having 6 to 24 carbon atoms), a heteroarylene group (preferably having 1 to 6 carbon atoms), an imino group (preferably having 0 to 6 carbon atoms), an ether group, a thioether group, a carbonyl group, or a linking group according to the combination thereof. Among them, an alkylene group (having 1 to 6 carbon atoms), an ether group, a carbonyl group, or a linking group according to the combination thereof is preferred. The alkylene group may be branched or straight. The alkylene group may have a substituent, and a preferred substituent is an alkyl group (preferably having 1 to 6 carbon atoms), an acyl group (preferably having 2 to 6 carbon atoms), an alkoxy group (preferably having 1 to 6 carbon atoms), or an alkoxycarbonyl group (preferably having 2 to 8 carbon atoms). nB is an integer of 5 to 100,000. nB $L^B$ may have different structures, respectively.

Specific examples of the dispersion resin 3 are exemplified below according to specific structures of a repeating unit included in a resin, and combinations thereof, but the present invention is not limited thereto. In formulas below, each of k, l, m, and n represents a polymerization molar ratio of repeating units, k ranges from 1 to 80, l ranges from 10 to 90, m ranges from 0 to 80, n ranges from 0 to 70, and k+l+m+n=100. In definition of k, l, and m, and definition of k, and l, k+l+m=100, and k+l=100, respectively. Each of p and q independently represents the number of linked polyester chains, and ranges from 5 to 100,000. $R^a$ represents a hydrogen atom or an alkylcarbonyl group.

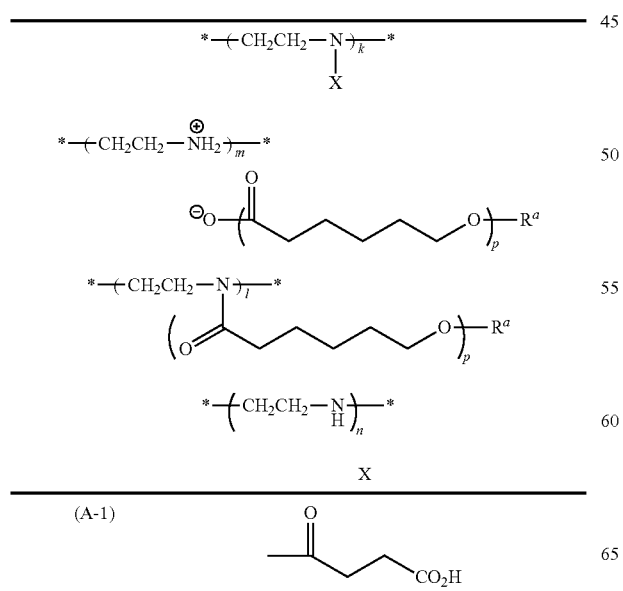

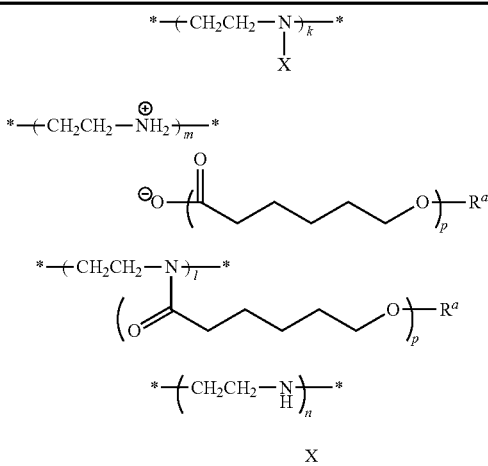

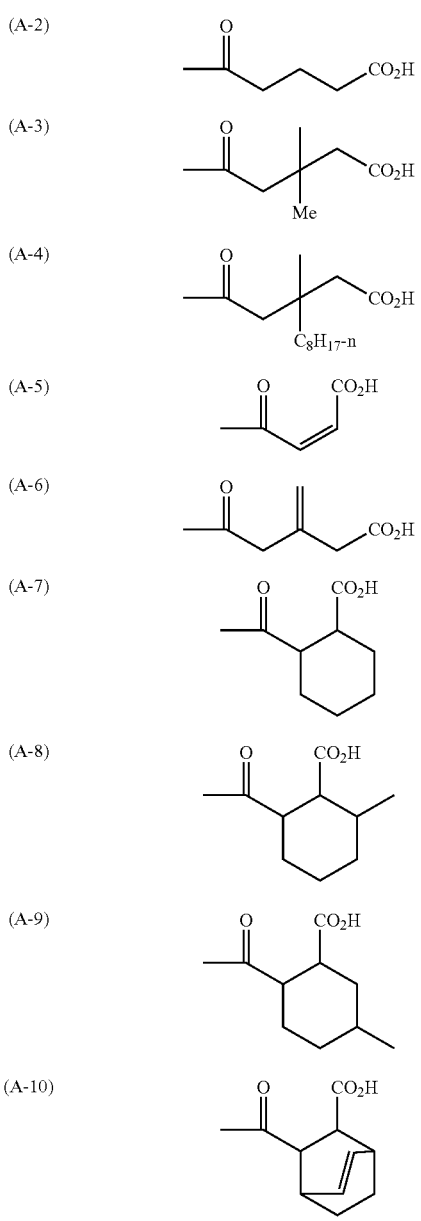

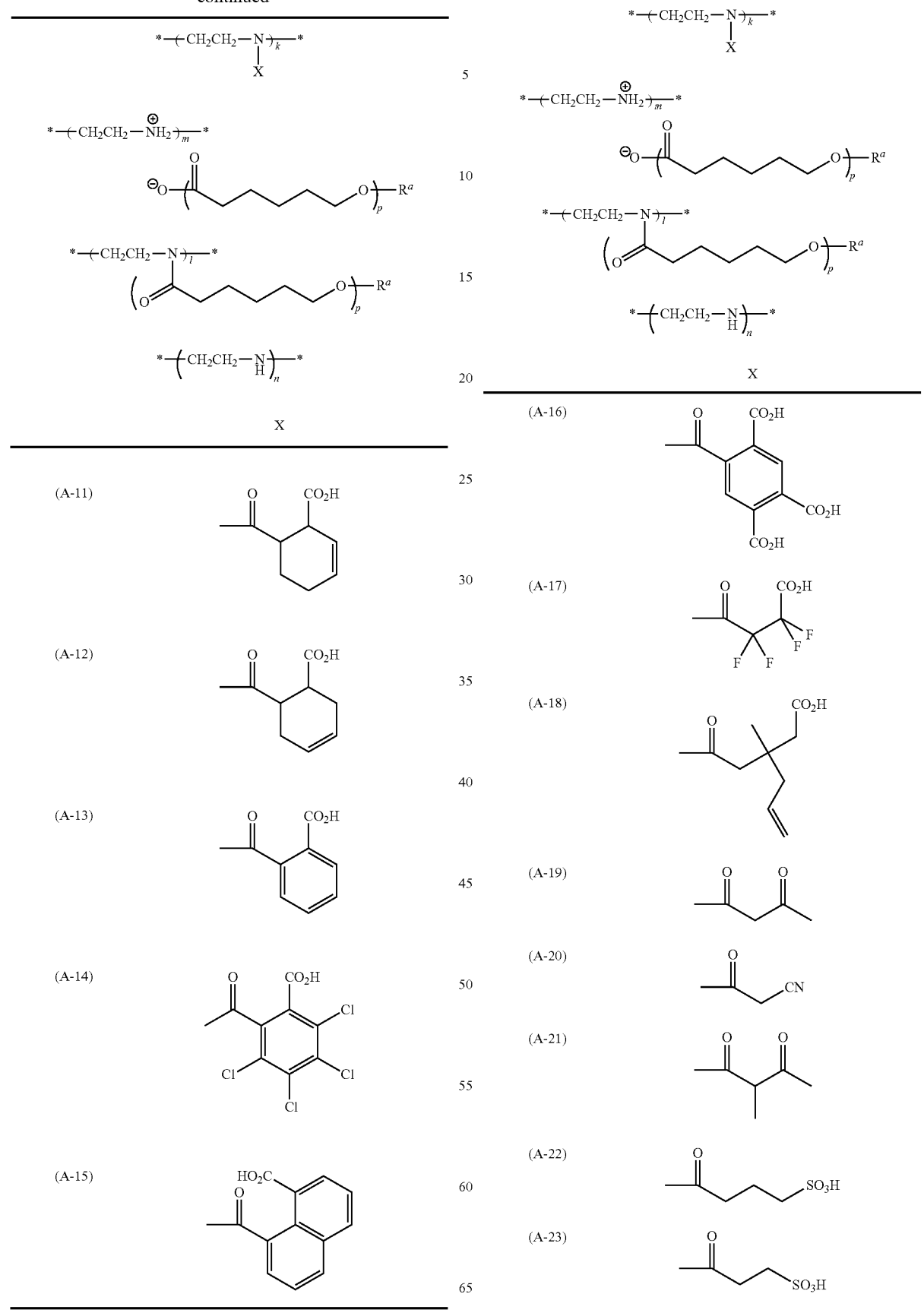

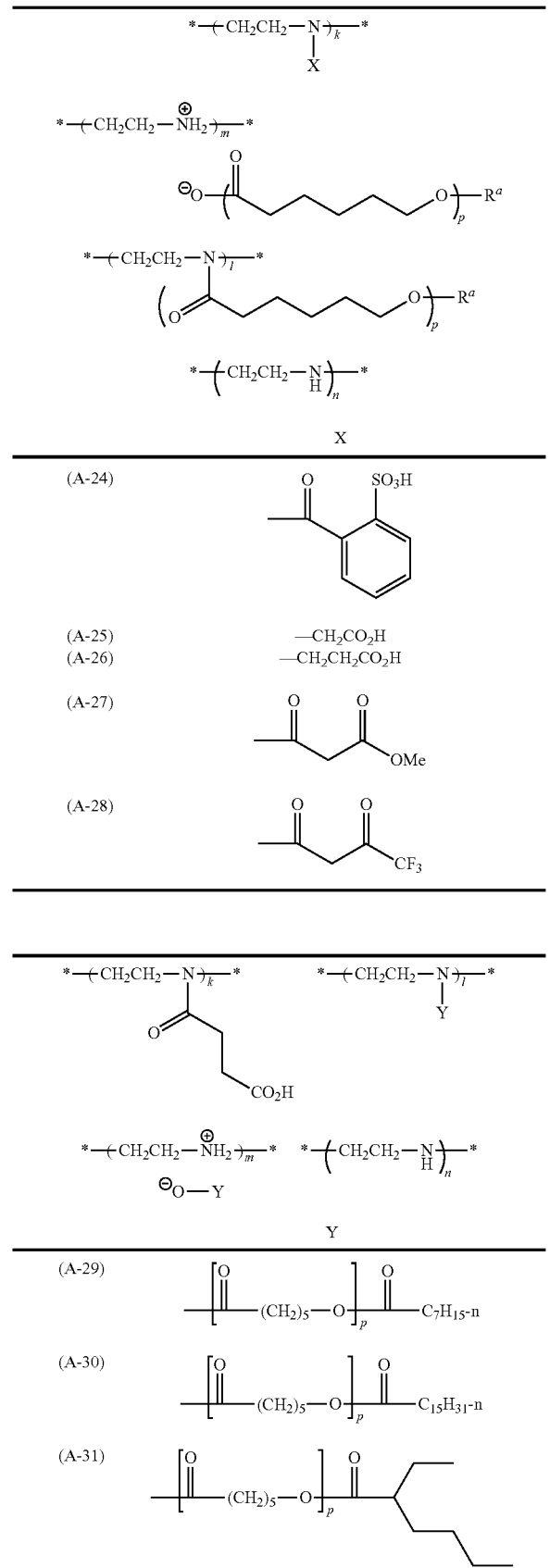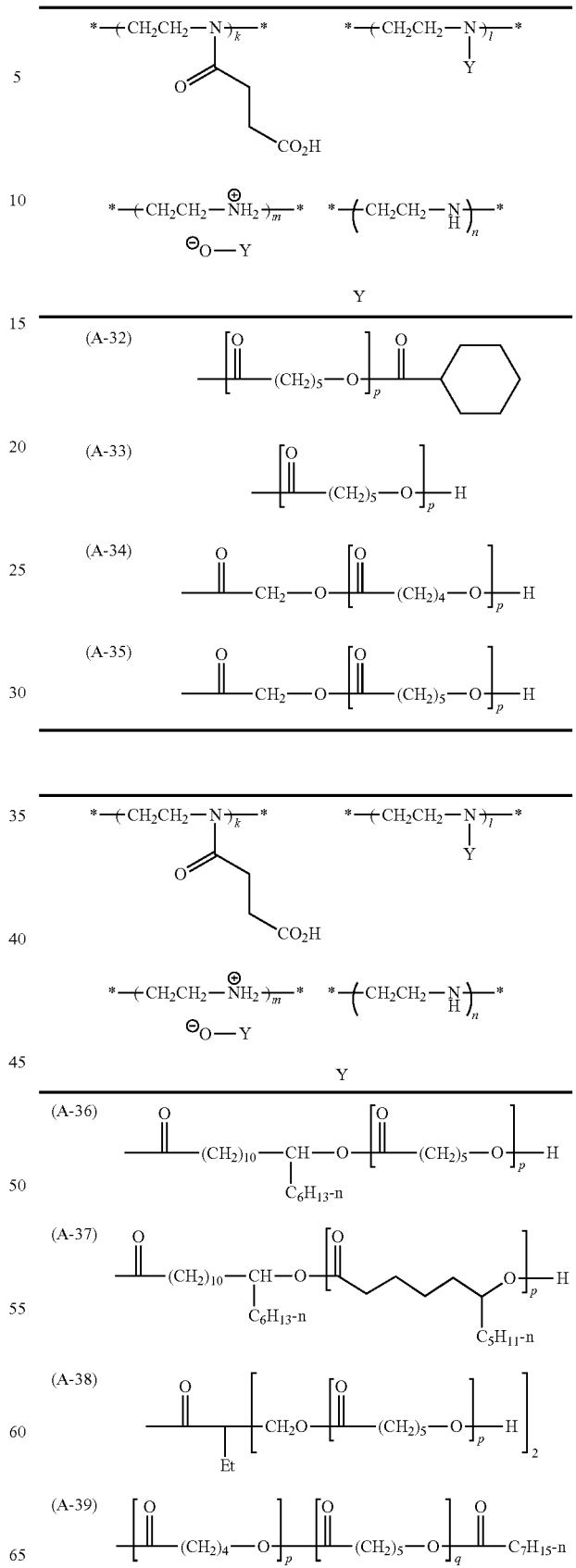

-continued
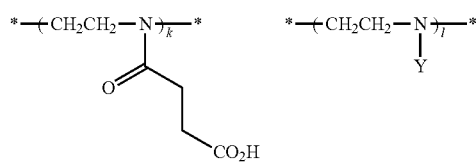
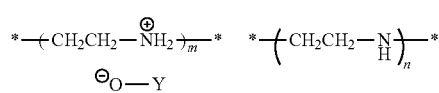
Y
(A-40)
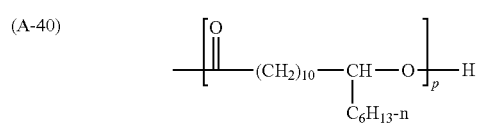
-continued
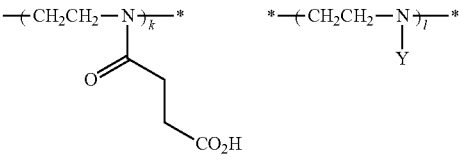
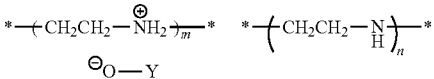
Y
(A-41) 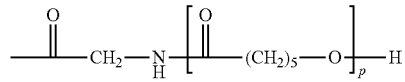
(A-42) 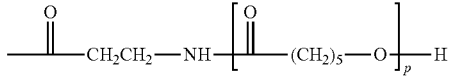
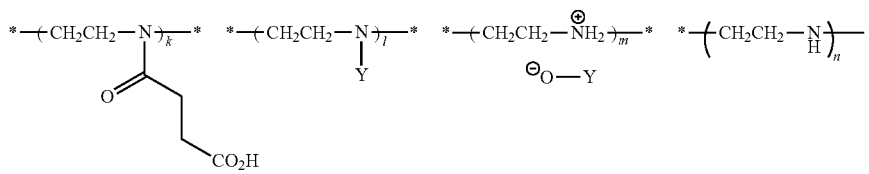
Y
(A-43) 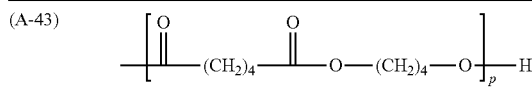
(A-44) 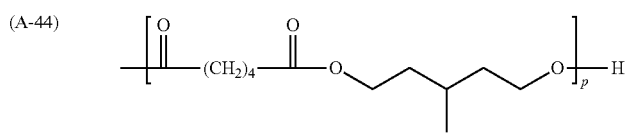
(A-45) 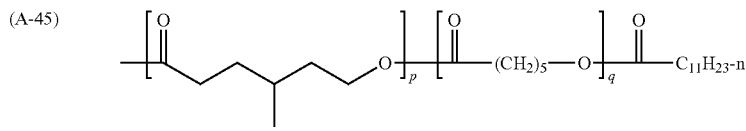
(A-46) 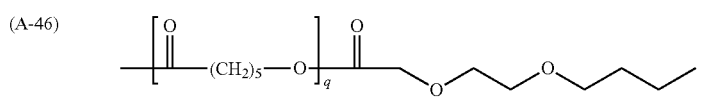
(A-47) 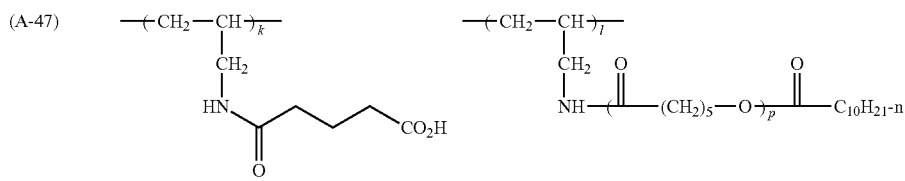
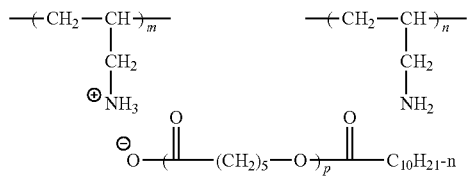

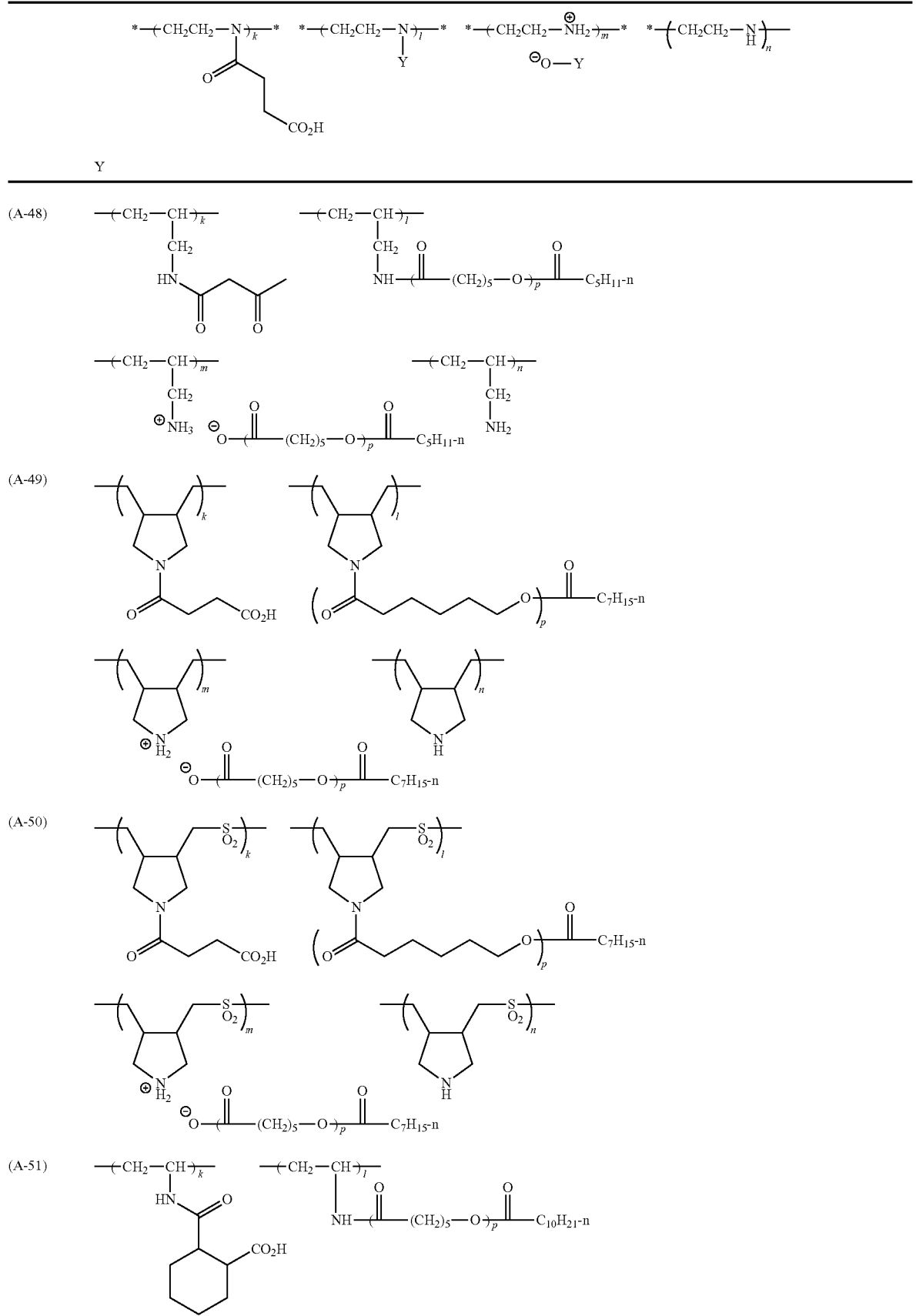

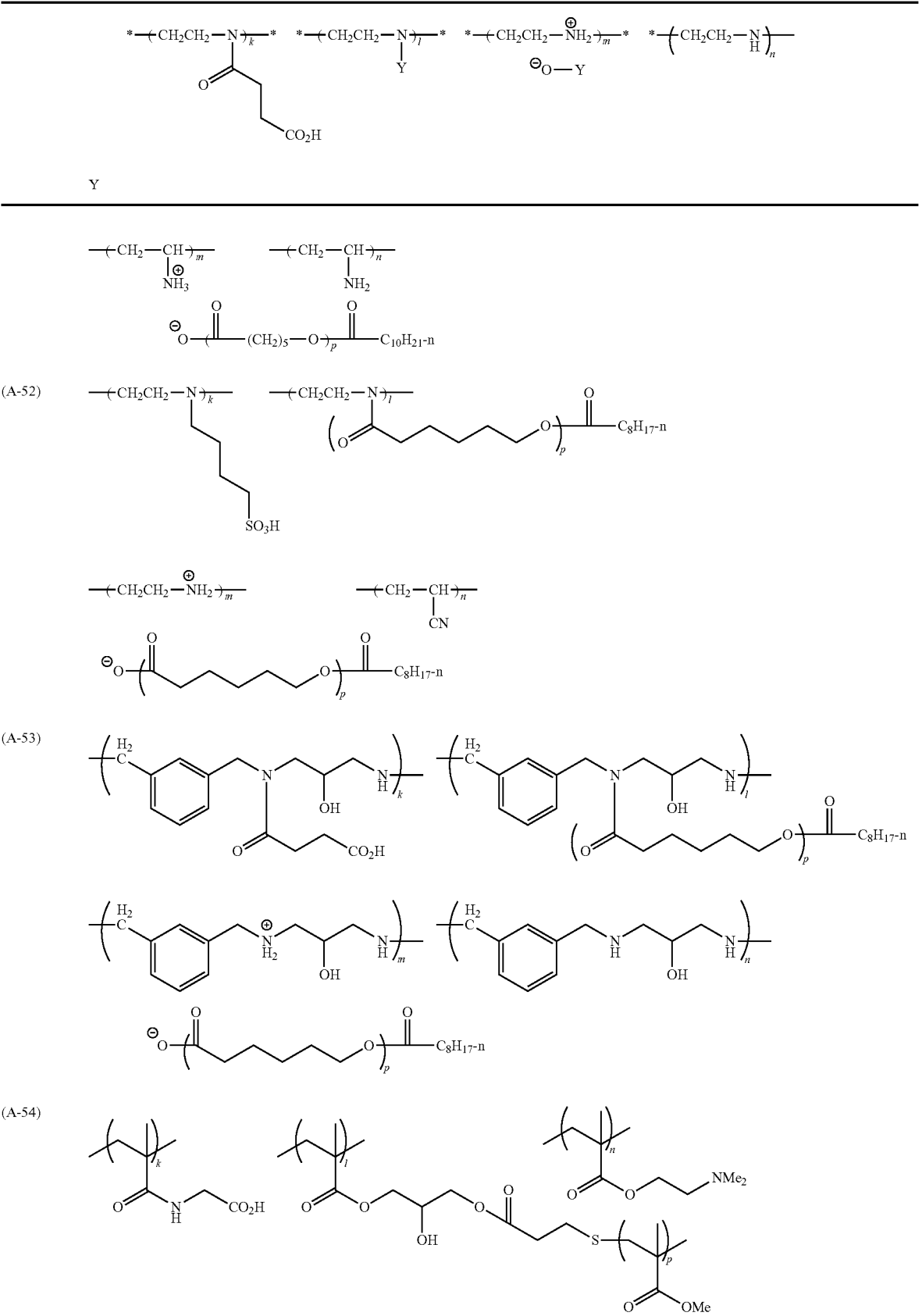

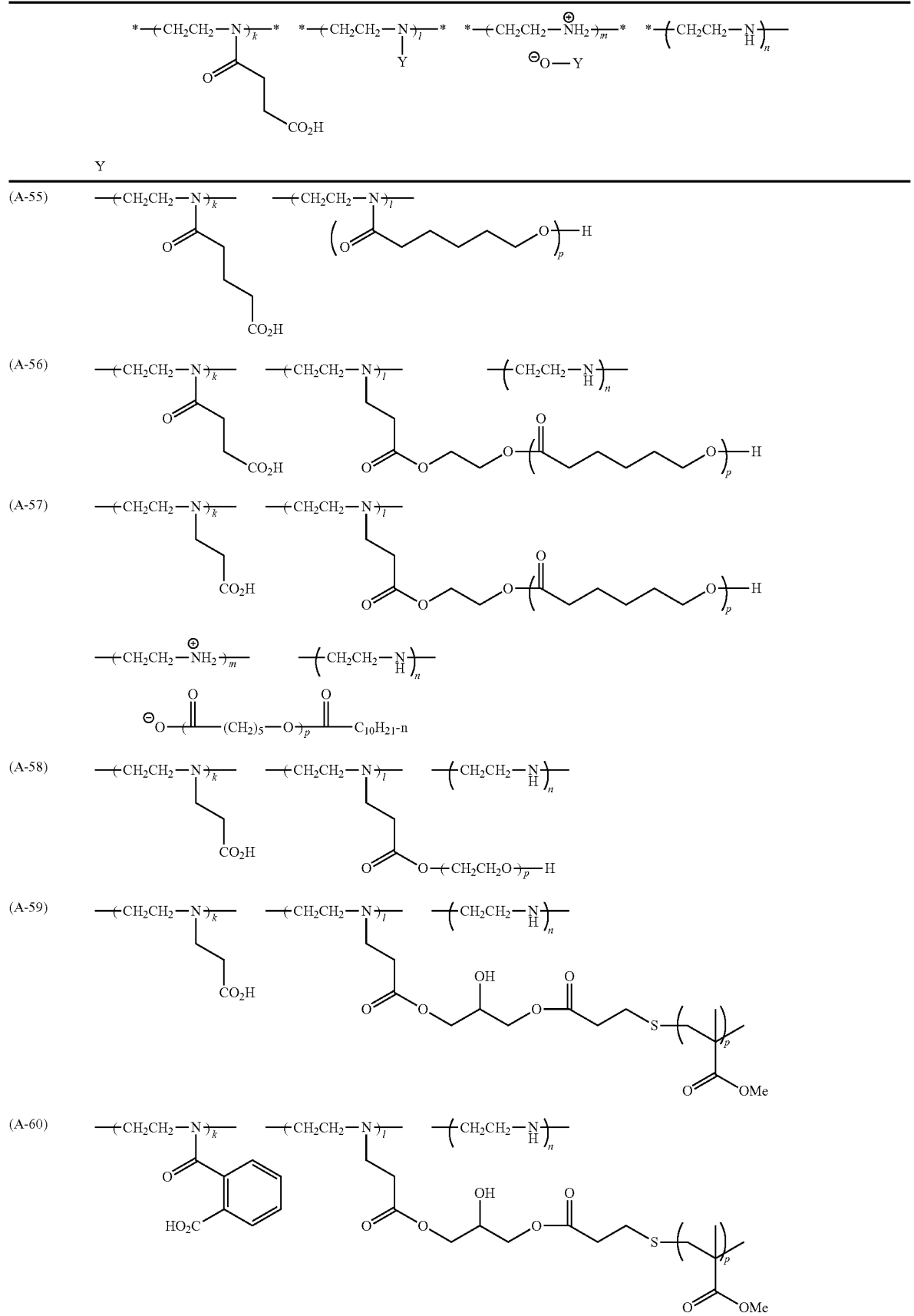

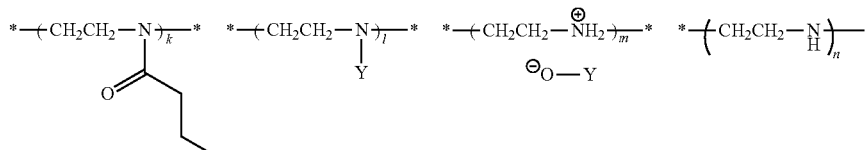

Y

The specific dispersion resin 3 may be synthesized by the synthesis method disclosed in Patent Application Laid-Open No. 2011-190180.

As for the molecular weight of the specific dispersion resin 3, the weight average molecular weight ranges preferably from 3,000 to 100,000 or from 5,000 to 55,000. When the weight average molecular weight is within the above described range, the effect of the plurality of adsorption sites introduced at the end of the polymer is sufficiently exhibited, thereby achieving a performance excellent in the adsorptivity to a titanium dioxide particle surface. In the present specification, the GPC measurement was performed, unless otherwise stated, by using HLC-8020 GPC (manufactured by Tosoh Corporation) (column: TSKgelSuperHZM-H, TSKgelSuperHZ4000, TSKgelSuperHZ200 (manufactured by Tosoh Corporation)). A carrier may be properly selected, and as for the carrier, tetrahydrofuran may be used as long as it is soluble.

In the curable resin composition for forming a high refractive index layer, the dispersant may be used either alone or in combination of two or more kinds thereof.

The content of the dispersant based on the total solid content of the curable resin composition for forming a high refractive index layer, in view of the dispersibility and dispersion stability, ranges preferably from 10% by mass to 50% by mass, more preferably from 11% by mass to 40% by mass, and further preferably 12% by mass to 30% by mass.

—Additional Dispersion Resin—

The curable resin composition for forming a high refractive index layer may contain a dispersion resin other than the certain resin (hereinafter, also referred to as an "additional dispersion resin") so as to adjust the dispersibility of metal oxide particles.

Examples of the additional dispersion resin which may be used in the present invention may include polymer dispersants (e.g., polyamideamine and salts thereof, polycarboxylic acid and salts thereof, high molecular weight unsaturated acid ester, modified polyurethane, modified polyester, modified poly(meth)acrylate, (meth)acrylic copolymer, naphthalenesulfonic acid-formalin condensate), polyoxyethylene alkyl phosphoric acid ester, polyoxyethylenealkylamine, alkanolamine, and a pigment derivative.

The additional dispersion resins may be further classified into a straight polymer, a terminal-modified polymer, a graft polymer, and a block polymer in consideration of their structures.

Specific examples of the additional dispersion resin may include "Disperbyk-101 (polyamideamine phosphate), 107 (carboxylic acid ester), 110 (a copolymer containing an acid group), 130 (polyamide), 161, 162, 163, 164, 165, 166, 170 (a high molecular copolymer)", and "BYK-P104, P105 (high molecular weight unsaturated polycarboxylic acid), manufactured by BYK Chemie Co., Ltd., "EFKA4047, 4050, 4010, 4165 (polyurethane-based), EFKA4330, 4340 (a block copolymer), 4400, 4402 (modified polyacrylate), 5010 (polyester amide), 5765 (high molecular weight polycarboxylate), 6220 (fatty acid polyester), 6745 (phthalocyanine derivative), 6750 (azo pigment derivative)", manufactured by EFKA Co., Ltd., "AJISPER-PB821, PB822", manufactured by AJINOMOTO Fine-Techno Co., Inc., FLOWLEN TG-710 (urethane oligomer)", "POLYFLOW No. 50E, No. 300 (acrylic copolymer)", manufactured by Kyoeisha Chemical Co., Ltd., "DISPARLON KS-860, 873SN, 874, #2150 (aliphatic polyvalent carboxylic acid), #7004 (polyetherester), DA-703-50, DA-705, DA-725", manufactured by Kusumoto Chemical Industry Co., Ltd., "DEMOL RN, N(naphthalenesulfonic acid formalin polycondensate), MS, C, SN—B (aromatic sulfonic acid formalin polycondensate)", "HOMOGENOL L-18 (polymer polycarboxylic acid)", "EMULGEN 920, 930, 935, 985 (polyoxyethylene nonylphenyl ether)", "Acetamin 86 (stearylamine acetate)", manufactured by Kao Company Ltd., "Solsperse 5000 (phthalocyanine derivative), 22000 (azo pigment derivative), 13240 (polyesteramine), 3000, 17000, 27000 (polymer having a functional part at the end), 24000, 28000, 32000, 38500 (graft polymer)", manufactured by Lubrizol Corp., and "Nikkol T106 (polyoxyethylene sorbitan monooleate), MYS-IEX (polyoxyethylene monostearate)" manufactured by Nikko Chemical Co., Ltd.

These additional resins may be used either alone or in combination of two or more kinds thereof.

The curable resin composition for forming a high refractive index layer may or may not contain the additional dispersion resin. When the curable resin composition contains the additional dispersion resin, the content of the additional dispersion resin ranges preferably from 1% by mass to 20% by mass, and more preferably from 1% by mass to 10% by mass based on the total solid content of the curable resin composition for forming a high refractive index layer.

(C) Binder

The curable resin composition for the high refractive index layer preferably further contains a binder (C), in view of improving a film property.

As for the binder (hereinafter, also referred to as a binder polymer), a resin in which monomers having a carboxyl group are polymerized or copolymerized, a resin in which monomers having an acid anhydride are polymerized or copolymerized and acid anhydride units are hydrolyzed, half-esterified or half-amidated, and epoxy acrylate in which an epoxy resin is modified by unsaturated monocarboxylic acid and acid anhydride may be exemplified. Examples of a monomer having a carboxyl group may include acrylic acid, methacrylic acid, itaconic acid, crotonic acid, maleic acid, fumaric acid, and 4-carboxyl styrene, and as for a monomer having acid anhydride, for example, maleic anhydride may be exemplified.

Also, similarly, there is an acidic cellulose derivative having a carboxylic acid group in aside chain. Further, a polymer having a hydroxyl group, added with cyclic acid anhydride, is also useful.

When a copolymer is used as for a binder, other monomers besides the above mentioned monomers may be used as for a compound to be copolymerized. Examples of other monomers may include compounds in (1) to (12) below.

(1) acrylic acid esters having an aliphatic hydroxyl group, and methacrylic acid esters such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate.

(2) alkyl acrylates such as methyl acrylate, ethyl acrylate, propyl acrylate, butyl acrylate, isobutyl acrylate, amyl acrylate, hexyl acrylate, 2-ethylhexyl acrylate, octyl acrylate, benzyl acrylate, 2-acrylic acid chloroethyl, glycidyl acrylate, 3,4-epoxycyclohexylmethyl acrylate, vinyl acrylate, 2-phenyl vinyl acrylate, 1-propenyl acrylate, allyl acrylate, 2-allyloxyethyl acrylate, propargyl acrylate, (3) alkyl methacrylates such as methyl methacrylate, ethyl methacrylate, propyl methacrylate, butyl methacrylate, isobutyl methacrylate, amyl methacrylate, hexyl methacrylate, 2-ethylhexyl methacrylate, cyclohexyl methacrylate, benzyl methacrylate, 2-methacrylate chloroethyl, glycidyl methacrylate, 3,4-epoxycyclohexylmethyl methacrylate, vinyl methacrylate, 2-phenyl vinyl methacrylate, 1-propenyl methacrylate, allyl methacrylate, 2-allyloxyethyl methacrylate, propargyl methacrylate.

(4) acrylamides or methacrylamides such as acrylamide, methacrylamide, N-methylol acrylamide, N-ethyl acrylamide, N-hexyl methacrylamide, N-cyclohexyl acrylamide, N-hydroxyethyl acrylamide, N-phenyl acrylamide, N-nitrophenyl acrylamide, N-ethyl-N-phenyl acrylamide, vinyl acrylamide, vinyl methacrylamide, N, N-diallylacrylamide, N, N-diallyl methacrylamide, allyl acrylamide, allyl methacrylamide.

(5) vinyl ethers such as ethyl vinyl ether, 2-chloroethyl vinyl ether, hydroxyethyl vinyl ether, propyl vinyl ether, butyl vinyl ether, octyl vinyl ether, phenyl vinyl ether.

(6) vinyl esters such as vinyl acetate, vinyl chloroacetate, vinyl butyrate, vinyl benzoate, (7) styrenes such as styrene α-methyl styrene, methyl styrene, chloromethyl styrene, p-acetoxy styrene.

(8) vinyl ketones such as methyl vinyl ketone, ethyl vinyl ketone, propyl vinyl ketone, phenyl vinyl ketone, (9) olefins such as ethylene, propylene, isobutylene, butadiene, isoprene.

(10) N-vinylpyrrolidone, acrylonitrile, methacrylonitrile or the like.

(11) unsaturated imides such as maleimide, N-acryloyl acrylamide, N-acetyl methacrylamide, N-propionyl methacrylamide, N-(p-chlorobenzoyl) methacrylamide.

(12) methacrylate monomer having a heteroatom bonded at a position, e.g., compounds disclosed in Patent Application Laid-Open No. 2002-309057, and Patent Application Laid-Open No. 2002-311569, respectively.

Examples of commercially available binders may include a benzyl methacrylate/methacrylic acid copolymer manufactured by Fuji Film Fine Chemicals Co., Ltd. (FFFC) (copolymerization ratio: 80/20% by mass, weight average molecular weight: 12,000), and an acrylic-based binder (graft copolymer of benzyl methacrylate/i-butyl methacrylate/2-hydroxyethyl methacrylate/methacrylic acid copolymer and methoxy polyethylene glycol, manufactured by Fujikura Kasei Co., Ltd.).

The binder preferably includes a repeating unit formed by polymerizing a monomer component essentially containing a compound represented by Formula (ED) below (hereinafter, also referred to as "ether dimer").

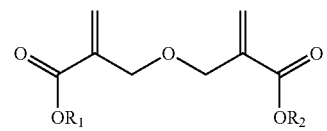

Formula (ED)

(In Formula (ED), each of $R_1$ and $R_2$ independently represents a hydrogen atom or a hydrocarbon group having 1 to 25 carbon atoms which may have a substituent)

When the polymer formed by polymerizing a monomer component containing a compound represented by Formula (ED) contains other copolymerizable monomers, the content ratio is not particularly limited, but is preferably 95% by mass or less, and more preferably 85% by mass or less.

The weight average molecular weight of the polymer formed by polymerizing a monomer component containing a compound represented by Formula (ED) is not particularly limited, but in view of the viscosity of a composition, and the heat resistance of a coated film formed by the composition, ranges preferably from 2000 to 200000, more preferably from 5000 to 100000, and further preferably from 5000 to 20000.

When the polymer formed by polymerizing a monomer component containing a compound represented by Formula (ED) has an acid group, the acid value ranges preferably from 30 mgKOH/g to 500 mgKOH/g, and more preferably from 50 mgKOH/g to 400 mgKOH/g.

The polymer formed by polymerizing a monomer component containing a compound represented by Formula (ED) may be easily obtained by polymerizing the above described monomer essentially containing, at least, an ether dimer. Here, the polymerization and the cyclization reaction of the ether dimer are carried out at once to form a tetrahydropyran ring structure.

A polymerization method for synthesizing the polymer formed by polymerizing a monomer component containing a compound represented by Formula (ED) is not particularly limited, but conventionally known various polymerization methods may be employed. In particular, a solution polymerization method is preferred. Specifically, for example, based on a synthesis method of a polymer (a) disclosed in Patent Application Laid-Open No. 2004-300204, the polymer formed by polymerizing a monomer component containing a compound represented by Formula (ED) may be synthesized.

Hereinafter, exemplary compounds of the polymer formed by polymerizing a monomer component containing a compound represented by Formula (ED) will be described, but the present invention is not limited thereto. The composition ratio of exemplary compounds described below is mol %.

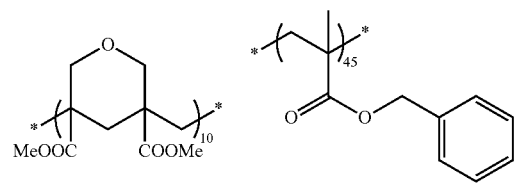

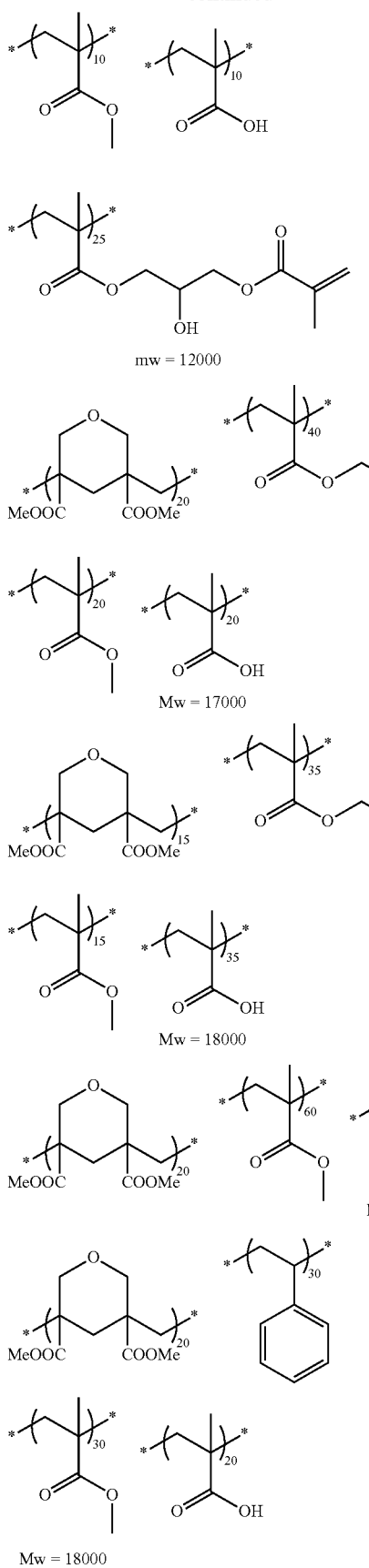

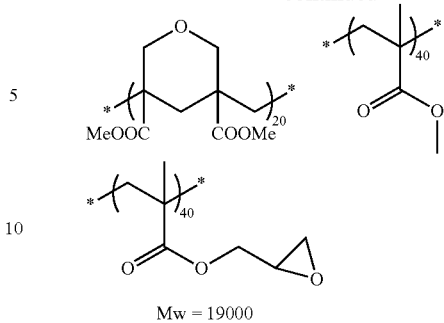

Mw = 19000

In the present invention, in particular, a polymer obtained by copolymerizing dimethyl-2,2-[oxybis(methylene)]bis-2-propenoate (hereinafter, referred to as "DM"), benzyl methacrylate (hereinafter, referred to as "BzMA"), methyl methacrylate (hereinafter, referred to as "MMA"), methacrylic acid (hereinafter, referred to as "MAA"), and glycidyl methacrylate (hereinafter, referred to as "GMA") is preferred. Particularly, the molar ratio of DM:BzMA:MMA:MAA:GMA is preferably 5 to 15:40 to 50:5 to 15:5 to 15:20 to 30. These components may be preferably included in 95% by mass or more of the constituent components of the copolymer used in the present invention. The weight average molecular weight of the polymer preferably ranges from 9000 to 20000.

The weight average molecular weight (in terms of polystyrene measured by GPC method) of the polymer used in the present invention preferably ranges from 1000 to $2 \times 10^5$, more preferably from 2000 to $1 \times 10^5$, and further preferably from 5000 to $5 \times 10^4$.

Among these, a (meth) acrylic resin which has an allyl group or a vinyl ester group in the side chain and a carboxyl group, an alkali-soluble resin which has a double bond in the side chain as described in Patent Application Laid-Open No. 2000-187322, and Patent Application Laid-Open No. 2002-62698, and an alkali-soluble resin which has an amide group in the side chain as described in Patent Application Laid-Open No. 2001-242612 have an excellent balance between the film strength, sensitivity, and developability. Examples of the above described polymer may include Daiyanal NR series (manufactured by Mitsubishi Rayon Co., Ltd.), Photomer6173 (COOH-containing polyurethane acrylic oligomer. manufactured by Diamond Shamrock Co., Ltd.), Viscoat R-264, KS resist 106 (both manufactured by Osaka Organic Chemical Industry Co., Ltd.), Cyclomer Pseries such as Cyclomer PACA230AA, PLACCEL CF200 series (both manufactured by Daicel Chemical Industries, Ltd.), and Ebecryl3800 (manufactured by Daicel UCB Co., Ltd.).

An urethane binder polymer which contains an acid group as described in Patent Publication No. H7-12004, Patent Publication No. H7-120041, Patent Publication No. H7-120042, Patent Publication No. H8-12424, Patent Application Laid-Open No. S63-287944, Patent Application Laid-Open No. S63-287947, and Patent Application Laid-Open No. H1-271741, or a urethane binder polymer which has an acid group and a double bond in the side chain as described in Patent Application Laid-Open No. 2002-107918 is very excellent in strength, and thus is advantageous in view of a film strength.

An acetal modified polyvinyl alcohol binder polymer which has an acid group as described in EP No. 993966, EP No. 1204000, or Patent Application Laid-Open No. 2001-318463 is excellent in film strength and thus is preferred.

Further, as for a water-soluble linear organic-based polymer, for example, polyvinyl pyrrolidone or polyethylene oxide is useful. In order to improve the strength of a cured film, alcohol-soluble nylon or polyether of 2,2-bis-(4-hydroxyphenyl)-propane and epichlorohydrin is also useful.

The weight average molecular weight (in terms of polystyrene measured by GPC method) of the binder polymer which may be used as the curable composition of the present exemplary embodiment is preferably 5,000 or more, and more preferably ranges from 10000 to 300000, and the number average molecular weight is preferably 1,000 or more, and more preferably ranges from 2,000 to 250000. The polydispersity (weight average molecular weight/number average molecular weight) is preferably 1 or more, and more preferably ranges from 1.1 to 10.

This binder polymer may be any one of a random polymer, a block polymer, and a graft polymer.

The binder polymer may be synthesized by a conventionally known method. Examples of the solvent used for the synthesis may include tetrahydrofuran, ethylene dichloride, cyclohexanone, methyl ethyl ketone, acetone, methanol, ethanol, ethylene glycol monomethyl ether, ethylene glycol monoethyl ether, 2-methoxyethyl acetate, diethyleneglycol dimethylether, 1-methoxy-2-propanol, 1-methoxy-2-propyl acetate, N,N-dimethyl formamide, N,N-dimethylacetamide, toluene, ethyl acetate, methyl lactate, ethyl lactate, dimethyl sulfoxide, and water. This solvent may be used either alone or in combination of two or more kinds thereof.

As for a radical polymerization initiator used for synthesizing a binder polymer, which may be used in a curable composition for forming a high refractive index layer according to the present exemplary embodiment, conventionally known compounds such as an azo initiator, a peroxide initiator may be exemplified.

In the curable resin composition for forming a high refractive index layer, the binder may be may be used either alone or in combination of two or more kinds thereof.

In the curable resin composition for forming a high refractive index layer, the content of the binder ranges preferably from 1% by mass to 40% by mass, more preferably from 3% by mass to 30% by mass, and further preferably from 4% by mass to 20% by mass.

A method of manufacturing a curable resin composition for forming a high refractive index layer may employ a conventionally used manufacturing method for a dispersion composition but not particularly limited thereto. For example, preferably in view of improving the dispersibility, metal oxide particles, a dispersant, and then a solvent are mixed, and then dispersed by using a circulation dispersing device (bead mill) so as to prepare, first, a dispersion composition, and then a polymerizable compound composition is mixed with the dispersion composition.

The curable resin composition for forming a high refractive index layer contains a polymerizable compound (D) and a polymerization initiator, and preferably contains other components as necessary.

The curable resin composition for forming a high refractive index layer is preferably a transparent composition, and more specifically, a composition in which when a high refractive index layer as a cured film with a film thickness of 1.0 µm is formed by the composition, a light transmittance of the cured film in the thickness direction may be 90% or more over the entire wavelength range of 400 nm to 700 nm.

The property of such a light transmittance may be achieved by any means as long as the curable resin composition for forming a high refractive index layer contains a polymerizable compound (D) and a polymerization initiator (E), but the property of the light transmittance is properly achieved by adjusting, for example, the kinds or contents of the polymerizable compound (D) or a binder (C) which may be further added. Also, the property of the light transmittance may be properly achieved by adjusting the particle size of metal oxide particles (A), or the kinds and addition amounts of a dispersant (B).

In the curable resin composition for forming a high refractive index layer, and the high refractive index layer, in order to exhibit the properties required for the high refractive index layer, the light transmittance is preferably 90% or more over the entire wavelength range of 400 nm to 700 nm.

The light transmittance is more preferably 95% or more over the entire wavelength range of 400 nm to 700 nm, further preferably 99% or more, and most preferably 100%.

(D) Polymerizable Compound

A polymerizable compound (D) is an addition-polymerizable compound having a polymerizable group such as at least one ethylenically unsaturated double bond, an epoxy group, or an oxetanyl group, and is selected from compounds having at least one of the polymerizable groups described above, and preferably two or more of the polymerizable groups. Such compounds are widely known in the art, and may be used without any particular limitation in the present invention.

These have chemical forms of, for example, a monomer, or a prepolymer, that is, a multimer such as a dimer or a trimer, and an oligomer, or a mixture or a copolymer thereof. Examples of the monomer and the copolymer thereof may include unsaturated carboxylic acid (e.g., acrylic acid, methacrylic acid, itaconic acid, crotonic acid, isocrotonic acid, and maleic acid), esters thereof, and amides thereof, and preferably, esters of unsaturated carboxylic acid and aliphatic polyhydric alcohol compound, and amides of unsaturated carboxylic acid and aliphatic polyhydric amine compound are used. For example, an addition reaction product between unsaturated carboxylic acid esters or unsaturated carboxylic acid amides having a nucleophilic substituent such as a hydroxyl group, an amino group, or a mercapto group, and monofunctional or polyfunctional isocyanates or epoxys; or a dehydration condensation reaction product between the esters or amides, and monofunctional or polyfunctional carboxylic acid is properly used. Also, an addition reaction product between unsaturated carboxylic acid esters or unsaturated carboxylic acid amides having an electrophilic substituent such as an isocyanate group or an epoxy group, and monofunctional or polyfunctional alcohols, amines, or thiols; and a substitution reaction product between unsaturated carboxylic acid esters or unsaturated carboxylic acid amides having a leaving substituent such as a halogen group or a tosyloxy group, and monofunctional or polyfunctional alcohols, amines, or thiols are also appropriate. Also, as an additional example, a group of compounds in which the unsaturated carboxylic acid is substituted with unsaturated phosphonic acid, styrene, or vinyl ether may be used. Specifically, as for the compounds, compounds disclosed in paragraphs 0095 to 0108 of Patent Application Laid-Open No. 2009-288705 may also be properly used in the present invention.

A first preferred aspect of the polymerizable compound includes a monomer having at least one ethylenically unsaturated double bond (polymerizable monomer) and an oligomer having a polymerizable group (polymerizable oligomer) (hereinafter, both the polymerizable monomer and the polymerizable oligomer may also be referred to as "polymerizable monomer or the like").

The polymerizable monomer or the like has at least one addition-polymerizable ethylene group, and a compound having an ethylenically unsaturated group which has a boiling point of 100° C. or more under atmospheric pressure is also preferred. Examples thereof may include monofunctional acrylates and methacrylates such as polyethyleneglycolmono(meth)acrylate, polypropyleneglycolmono(meth)acrylate, phenoxyethyl(meth)acrylate; and those which are (meth)acrylated after adding ethylene oxide or propylene oxide to multifunctional alcohols such as polyethyleneglycol di(meth)acrylate, trimethylol ethane tri(meth)acrylate, neopentyl glycol di(meth)acrylate, pentaerythritol tri(meth)acrylate, pentaerythritol tetra(meth)acrylate, dipentaerythritol penta(meth)acrylate, dipentaerythritol hexa(meth)acrylate, hexanediol(meth)acrylate, trimethylolpropane tri(acryloyloxypropyl)ether, tri(acryloyloxyethyl)isocyanurate, glycerin or trimethylol ethane; urethane(meth)acrylates as described in Patent Publication No. S48-41708, Patent Publication No. S50-6034, and Patent Application Laid-Open No. S51-37193, polyesteracrylates as described in Patent Application Laid-Open No. S48-64183, Patent Publication No. S49-43191, and Patent Publication No. S52-30490; and multifunctional acrylates and methacrylates such as epoxy acrylates which are reaction products of epoxypolymers and (meth)acrylic acids, and mixtures thereof.

As for polyfunctionalacrylate-based compounds having a (meth)acryloyl group, commercially available products may be used, and examples thereof may include NK ester A-TMMT, NK ester A-TMPT (Shin-Nakamura Chemical Co., Ltd.).

Multifunctional(meth)acrylate which is obtained by reacting a compound which has a cyclic ether group and an ethylenically unsaturated group such as glycidyl(meth)acrylate with multifunctional carboxylic acid is also exemplified.

As for other preferred polymerizable monomer or the like, it is possible to use a cardopolymer which is a compound which has a fluorene ring and two or more ethylenically polymerizable groups as described in Patent Application Laid-Open Nos. 2010-160418, and 2010-129825, and U.S. Pat. No. 4,364,216.

As for the compound having at least one addition-polymerizable ethylenically unsaturated group which has a boiling point of 100° C. or more under atmospheric pressure, compounds disclosed in paragraphs [0254] to [0257] of Patent Application Laid-Open No. 2008-292970 are also appropriate.

A compound obtained through (meth)acrylation after ethylene oxide or propyleneoxide is added to polyfunctional alcohol, which is represented by Formulas (1) and (2) disclosed in Patent Application Laid-Open No. H10-62986, along with specific examples thereof, may also be used as the polymerizable monomer.

The polymerizable monomer used in the present invention is preferably a polymerizable monomer represented by Formulas (MO-1) to (MO-6) disclosed in paragraphs 0297 to 0300 of Patent Application Laid-Open No. 2012-215806.

As for specific examples of the radical polymerizable monomer represented by Formulas (MO-1) to (MO-6), the compounds disclosed in paragraphs 0248 to 0251 of Patent Application Laid-Open No. 2007-269779 may also be properly used in the present invention.

Among them, as for the polymerizable monomer or the like, dipentaerythritol triacrylate (as a commercially available product, KAYARAD D-330; manufactured by Nippon Kayaku Co., Ltd.), dipentaerythritoltetraacrylate (as a commercially available product KAYARAD D-320; manufactured by Nippon Kayaku Co., Ltd.), dipentaerythritolpenta (meth)acrylate (as a commercially available product KAYARAD D-310; manufactured by Nippon Kayaku Co., Ltd.), dipentaerythritolhexa (meth)acrylate (as a commercially available product KAYARAD DPHA; manufactured by Nippon Kayaku Co., Ltd.), and their structures in which a (meth)acryloyl group is bonded through an ethyleneglycol or propyleneglycol residue, and diglycerin EO (ethylene oxide) modified (meth)acrylate (as a commercially available product M-460; manufactured by Toagosei Co., Ltd.) are preferred. Oligomer types thereof may also be used.

For example, RP-1040 (manufactured by Nippon Kayaku Co., Ltd.) may be exemplified.

The polymerizable monomer or the like may include an acid group, such as a carboxyl group, a sulfonic acid group or a phosphoric acid, as a polyfunctional monomer. Accordingly, when the ethylenic compound has an unreacted carboxyl group as in the mixture described above, the compound as it is may be used. However, as necessary, a hydroxyl group of the above described ethylenic compound may be reacted with a non-aromatic carboxylic acid anhydride to introduce an acid group. In this case, specific examples of non-aromatic carboxylic acid anhydrides to be used may include tetrahydrophthalic anhydride, alkylated tetrahydrophthalic anhydride, hexahydrophthalic anhydride, alkylated hexahydrophthalic anhydride, succinic anhydride, and maleic anhydride.

In the present invention, a monomer having an acid group is an ester between an aliphatic polyhydroxy compound and an unsaturated carboxylic acid, and is preferably a polyfunctional monomer in which an unreacted hydroxyl group of an aliphatic polyhydroxy compound is reacted with a non-aromatic carboxylic acid anhydride to have an acid group. Particularly preferably, in the ester, the aliphatic polyhydroxy compound is pentaerythritol and/or dipentaerythritol. Examples of a commercially available product may include ARONIX series M-305, M-510, and M-520 which are polybasic acid modified acrylic oligomers manufactured by Toagosei Co., Ltd.

An acid value of a polyfunctional monomer having an acid group preferably ranges from 0.1 mg-KOH/g to 40 mg-KOH/g, and particularly preferably from 5 mg-KOH/g to 30 mg-KOH/g.

As for the polymerizable monomer or the like, a polyfunctional monomer having a caprolactone modified structure, which is disclosed in paragraphs 0306 to 0313 of Patent Application Laid-Open No. 2012-215806, may also be used.

The polyfunctional monomer having a caprolactone modified structure is not particularly limited as long as it has a caprolactone modified structure in its molecule, but examples thereof may include polyhydric alcohols such as trimethylol ethane, ditrimethylol ethane, trimethylol propane, ditrimethylolpropane, pentaerythritol, dipentaerythritol, tripentaerythritol, glycerin, diglycerol, and trimethylol melamine, and ε-caprolactone modified polyfunctional (meth)acrylate which is obtained by esterifying (meth)acrylic acid and ε-caprolactone. Among them, a polyfunctional monomer having a caprolactone modified structure, which is represented by Formula (1) below, particularly preferred.

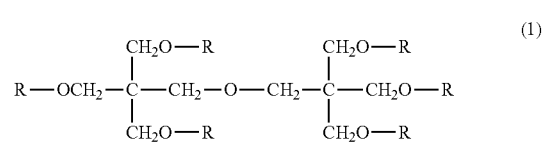
(1)

(In the formula, all of 6 R's may be groups represented by Formula (2) below, or one to five of 6 R's may be groups represented by Formula (2) below, and the remainder may be groups represented by Formula (3) below.)

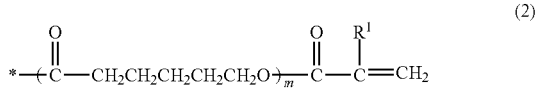

(2)

(In the formula, $R^1$ represents a hydrogen atom or a methyl group, m represents a number of 1 or 2, and "*" represents a bonding hand)

(3)

(In the formula, $R^1$ represents a hydrogen atom or a methyl group, and "*" represents a bonding hand)

Such a polyfunctional monomer having a caprolactone modified structure is commercially available as KAYARAD DPCA series manufactured by Nippon Kayaku Co., Ltd., and examples thereof may include DPCA-20 (a compound in Formulas (1) to (3) above, in which m=1, the number of groups represented by Formula (2)=2, all $R^1$ are hydrogen atoms), DPCA-30 (a compound in Formulas (1) to (3), in which m=1, the number of groups represented by Formula (2)=3, all $R^1$ are hydrogen atoms), DPCA-60 (a compound in Formulas (1) to (3), in which m=1, the number of groups represented by Formula (2)=6, all $R^1$ are hydrogen atoms), and DPCA-120 (a compound in Formulas (1) to (3), in which m=2, the number of groups represented by Formula (2)=6, all $R^1$ are hydrogen atoms).

In the present invention, the polyfunctional monomer having a caprolactone modified structure may be used either alone or in combination of two or more thereof.

In the present invention, as for the polymerizable monomer or the like, a compound represented by Formula (Z-4) or (Z-5), which is disclosed in paragraphs 0314 to 0324 of Patent Application Laid-Open No. 2012-215806, may also be used.

Examples of a commercially available product of the polymerizable monomer or the like represented by Formulas (Z-4) and (Z-5) may include SR-494 (tetrafunctional acrylate having four ethyleneoxy chains) manufactured by Sartomer Co., Ltd., and DPCA-60 (6-functional acrylate having 6 pentyleneoxy chains) and TPA-330 (trifunctional acrylate having 3 isobutyleneoxy chains) which are manufactured by Nippon Kayaku Co., Ltd.

As for the polymerizable monomer or the like, urethane acrylates as described in, Patent Publication No. S48-41708, Patent Application Laid-Open No. S51-37193, Patent Publication No. H2-32293, and Patent Publication No. H2-16765, or urethane compounds having an ethylene oxide-based skeleton disclosed in Patent Publication No. S58-49860, Patent Publication No. S56-17654, Patent Publication No. S62-39417, and Patent Publication No. S62-39418 are also appropriate. When as for the polymerizable monomer or the like, an addition-polymerizable monomer having an amino structure or a sulfide structure in a molecule, which is disclosed in Patent Application Laid-Open No. S63-277653, Patent Application Laid-Open No. S63-260909, and Patent Application Laid-Open No. H1-105238, is used, a curable composition highly excellent in photosensitive speed may be obtained.

Examples of a commercially available product of the polymerizable monomer or the like may include urethaneoligomer UAS-10, UAB-140 (Sanyo Kokusaku Pulp Co., Ltd.), UA-7200 (manufactured by Shin-Nakamura Chemical Co., Ltd.), DPHA-40 H (manufactured by Nippon Kayaku Co., Ltd.), UA-306H, UA-306T, UA-306I, AH-600, T-600, AI-600 (manufactured by Kyoeisha Chemical Co., Ltd).

As for the polymerizable monomer or the like, a polyfunctional thiol compound having two or more mercapto (SH) groups in the same molecule, which is disclosed in paragraphs 0216 to 0220 of Patent Application Laid-Open No. 2012-150468, may also be used.

In the present invention, as for the polymerizable monomer or the like, a polymerizable monomer or an oligomer having two or more epoxy groups or oxetanyl groups in a molecule may also be preferably used.

As for the polymerizable compound, a compound having an epoxy group or an oxetanyl group may also be used. As for the compound having an epoxy group or an oxetanyl group, specifically, a polymer having an epoxy group in a side chain, and a polymerizable monomer or oligomer having two or more epoxy groups in a molecule may be exemplified, and examples thereof may include a bisphenol A-type epoxy resin, a bisphenol F-type epoxy resin, a phenol novolak type epoxy resin, a cresol novolak type epoxy resin, and an aliphatic epoxy resin.

As for these compounds, commercially available products may be used, and they are obtained by introducing an epoxy group to a side chain of a polymer.

As commercially available products, examples of a bisphenol A type epoxy resin may include JER827, JER828, JER834, JER1001, JER1002, JER1003, JER1055, JER1007, JER1009, JER1010 (manufactured by Japan Epoxy Resin Co., Ltd.), and EPICLON860, EPICLON1050, EPICLON1051, EPICLON1055 (manufactured by DIC Co., Ltd.), examples of a bisphenol F type epoxy resin may include JER806, JER807, JER4004, JER4005, JER4007, JER4010 (manufactured by Japan Epoxy Resin Co., Ltd.), EPICLON830, EPICLON835 (manufactured by DIC Co., Ltd.), LCE-21, RE-602S (manufactured by Nippon Kayaku Co., Ltd.), examples of a phenol novolak type epoxy resin may include JER152, JER154, JER157S70, JER157S65 (manufactured by Japan Epoxy Resin Co., Ltd.), EPICLONN-740, EPICLONN-740, EPICLONN-770, EPICLONN-775 (manufactured by DIC Co., Ltd.), examples of a cresol novolak type epoxy resin may include EPICLONN-660, EPICLONN-665, EPICLONN-670, EPICLONN-673, EPICLONN-680, EPICLONN-690, EPICLONN-695 (manufactured by DIC Co., Ltd.), EOCN-1020 (manufactured by Nippon Kayaku Co., Ltd.), and examples of an aliphatic epoxy resin may include ADEKA RESIN EP-4080S, EP-4085S, EP-4088S (manufactured by ADEKA Co., Ltd.), CELLOXIDE 2021P, CELLOXIDE 2081, CELLOXIDE 2083, CELLOXIDE 2085, EHPE3150, EPOLEAD PB3600, EPOLEAD PB 4700 (manufactured by Daicel Chemical Industries, Ltd.), Denacol EX-211L, EX-212L, EX-214L, EX-216L, EX-321L, EX-850L (manufactured by Nagase Chemtex Co., Ltd.). Further, ADEKA RESIN EP-4000S, EP-4003S, EP-4010S, EP-4011S (manufactured by ADEKA Co., Ltd.), NC-2000, NC-3000, NC-7300, XD-1000, EPPN-501, EPPN-502 (manufactured by ADEKA Co., Ltd.), and JER1031S (manufactured by Japan Epoxy Resin Co., Ltd.) may be exemplified.

Specific examples of a polymer having an oxetanyl group in a side chain, and a polymerizable monomer or oligomer having two or more oxetanyl groups in a molecule, ARON OXETANE OXT-121, OXT-221, OX-SQ, PNOX (manufactured by Toagosei Co., Ltd.) may be used.

(D) The polymerizable compound may be used either alone or in combination of two or more thereof.

The content of the (D) polymerizable compound based on the total solid content of the curable resin composition for forming a high refractive index layer preferably ranges from 1% by mass to 50% by mass, more preferably from 3% by mass to 40% by mass, and further preferably from 5% by mass to 30% by mass.

Within this range, curability is good and satisfactory without reducing a refractive index.

(E) Polymerization Initiator

The curable resin composition for forming a high refractive index layer may or may not contain a polymerization initiator (E).

The (E) polymerization initiator is a compound which initiates and facilitates polymerization of a (D) polymerizable compound, and it is preferred that the (E) polymerization initiator is stable up to 45° C., and has a good polymerization initiating ability at high temperature heating.

The polymerization initiator preferably contains at least one kind of compound which has a molecular extinction coefficient of at least about 50 within a range of about 300 nm to 800 nm (more preferably 330 nm to 500 nm).

The polymerization initiator may be used either alone or in combination of two or more kinds thereof.

Examples of the (E) polymerization initiator may include an organic halogenated compound, an oxydiazole compound, a carbonyl compound, a ketal compound, a benzoin compound, an acridine compound, an organic peroxide compound, an azo compound, a coumarin compound, an azide compound, a metallocene compound, a hexaarylbiimidazole compound, an organic borate compound, a disulfonic acid compound, an oxime ester compound, an onium salt compound, and an acyl phosphine (oxide) compound.

Specific examples of the organic halogenated compound may include compounds described in "Bull. Chem. Soc. Japan" 42, 2924 (1969, Wakabayashi et al.), U.S. Pat. No. 3,905,815 specification, Patent Publication No. S46-4605, Patent Application Laid-Open No. S48-36281, Patent Application Laid-Open No. S55-32070, Patent Application Laid-Open No. S60-239736, Patent Application Laid-Open No. S61-169835, Patent Application Laid-Open No. S61-169837, Patent Application Laid-Open No. S62-58241, Patent Application Laid-Open No. S62-212401, Patent Application Laid-Open No. S63-70243, Patent Application Laid-Open No. S63-298339, and "Journal of Heterocyclic Chemistry" 1 (No3), (1970, M. P. Hutt)", and particularly, an oxazole compound, and an s-triazine compound in which a trihalomethyl group is substituted may be exemplified.

The s-triazine compound may be more preferably a s-triazine derivative in which at least one mono-, di-, or trihalogen substituted methyl group is bonded to a s-triazine ring, and specific examples thereof may include 2,4,6-tris(monochloromethyl)-s-triazine, 2,4,6-tris(dichloromethyl)-s-triazine, 2,4,6-tris(trichloromethyl)-s-triazine, 2-methyl-4,6-bis(trichloromethyl)-s-triazine, 2-n-propyl-4,6-bis(trichloromethyl)-s-triazine, 2-(α,α,β-trichloroethyl)-4,6-bis(trichloromethyl)-s-triazine, 2-phenyl-4,6-bis(trichloromethyl)-s-triazine, 2-(p-methoxyphenyl)-4,6-bis(trichloromethyl)-s-triazine, 2-(3,4-epoxyphenyl)-4,6-bis(trichloromethyl)-s-triazine, 2-(p-chlorophenyl)-4,6-bis(trichloromethyl)-s-triazine, 2-[1-(p-methoxyphenyl)-2,4-butadienyl]-4,6-bis(trichloromethyl)-s-triazine, 2-styryl-4,6-bis(trichloromethyl)-s-triazine, 2-(p-methoxy styryl)-4,6-bis(trichloromethyl)-s-triazine, 2-(p-i-propyloxystyryl)-4,6-bis(trichloromethyl)-s-triazine, 2-(p-tolyl)-4,6-bis(trichloromethyl)-s-triazine, 2-(4-natoxynaphthyl)-4,6-bis(trichloromethyl)-s-triazine, 2-phenylthio-4,6-bis(trichloromethyl)-s-triazine, 2-benzylthio-4,6-bis(trichloromethyl)-s-triazine, 2,4,6-tris(dibromomethyl)-s-triazine, 2,4,6-tris(tribromomethyl)-s-triazine, 2-methyl-4,6-bis(tribromomethyl)-s-triazine, and 2-methoxy-4,6-bis(tribromomethyl)-s-triazine.

Examples of the oxadiazole compound may include 2-trichloromethyl-5-styryl-1,3,4-oxadiazole, 2-trichloromethyl-5-(cyanostyryl)-1,3,4-oxadiazole, 2-trichloromethyl-5-(naphtho-1-yl)-1,3,4-oxodiazole, and 2-trichloromethyl-5-(4-styryl)styryl-1,3,4-oxodiazole.

Examples of the carbonyl compound may include benzophenone derivatives such as benzophenone, Michler ketone, 2-methylbenzophenone, 3-methylbenzophenone, 4-methylbenzophenone, 2-chlorobenzophenone, 4-bromobenzophenone, 2-carboxybenzophenone, acetophenone derivatives such as 2,2-dimethoxy-2-phenyl acetophenone, 2,2-diethoxyacetophenone, 1-hydroxy cyclohexyl phenyl ketone, α-hydroxy-2-methylphenyl propanone, 1-hydroxy-1-methylethyl-(p-isopropylphenyl)ketone, 1-hydroxy-1-(p-dodecylphenyl)ketone, 2-methyl-(4'-(methylthio)phenyl)-2-morpholino-1-propanone, 2-(dimethylamino)-2-[(4-methylphenyl)methyl]-1-[4-(4-morpholinyl)phenyl]-1-butanone, 1,1,1-trichloromethyl-(p-butylphenyl)ketone, 2-benzyl-2-dimethylamino-4-morpholinobutyrophenone, thioxanthone derivatives such as thioxanthone, 2-ethylthioxanthone, 2-isopropylthioxanthone, 2-chlorothioxanthone, 2,4-dimethylthioxanthone, 2,4-diethylthioxanthone, 2,4-diisopropylthioxanthone, and benzoate ester derivatives such as ethyl p-dimethylaminobenzoate, ethyl p-diethylaminobenzoate.

Examples of the ketal compound may include benzyl methyl ketal, and benzyl-β-methoxyethyl ethyl acetal.

Examples of the benzoin compound may include m-benzoin isopropyl ether, benzoin isobutyl ether, benzoin methyl ether, and methyl o-benzoyl benzoate.

Examples of the acridine compound may include 9-phenyl acridine, and 1,7-bis(9-acridinyl)heptane.

Examples of the organic peroxide compound may include trimethylcyclohexanone peroxide, acetylacetoneperoxide, 1,1-bis(tert-butylperoxy)-3,3,5-trimethylcyclohexane, 1,1-bis(tert-butylperoxy)cyclohexane, 2,2-bis(tert-butylperoxy) butane, tert-butyl hydro peroxide, cumene hydroperoxide, diisopropylbenzenehydroperoxide, 2,5-dimethylhexane-2,5-dihydroperoxide, 1,1,3,3-tetramethylbutylhydroperoxide, tert-butyl cumyl peroxide, dicumyl peroxide, 2,5-dimethyl-2,5-di(tert-butylperoxy)hexane, 2,5-oxanoyl peroxide, succinic acid peroxide, benzoyl peroxide, 2,4-dichlorobenzoyl peroxide, diisopropylperoxydicarbonate, di-2-ethylhexyl peroxydicarbonate, di-2-ethoxyethylperoxydicarbonate, dimethoxyisopropylperoxycarbonate, di(3-methyl-3-methoxybutyl)peroxydicarbonate, tert-butylperoxyacetate, tert-butylperoxypivalate, tert-butylperoxyneodecanoate, tert-butylperoxy octanoate, tert-butylperoxy laurate, 3,3',4,4'-tetra-(t-butylperoxycarbonyl)benzophenone, 3,3',4,4'-tetra-(t-hexylperoxycarbonyl)benzophenone, 3,3',4,4'-tetra-(p-isopropylcumylperoxycarbonyl)benzophenone, carbonyldi(t-butylperoxy dihydrogen diphthalate), and carbonyldi(t-hexylperoxy dihydrogen diphthalate).

Examples of the azo compound may include azo compounds disclosed in Patent Application Laid-Open No. H8-108621.

Examples of the coumarin compound may include 3-methyl-5-amino-((s-triazine-2-yl)amino)-3-phenylcoumarin, 3-chloro-5-diethylamino-((s-triazine-2-yl)amino)-3-phenylcoumarin, and 3-butyl-5-dimethylamino-((s-triazine-2-yl)amino)-3-phenylcoumarin.

Examples of the azide compound may include an organic azide compound, and 2,6-bis(4-azide benzylidene)-4-ethylcyclohexanone (BAC-E) disclosed in specifications of U.S. Pat. Nos. 2,848,328, 2,852,379, and 2,940,853.

As for the metallocene compound, various titanocene compounds disclosed in Patent Application Laid-Open No. S59-152396, Patent Application Laid-Open No. S61-151197, Patent Application Laid-Open No. S63-41484, Patent Application Laid-Open No. H2-249, Patent Application Laid-Open No. H2-4705, and Patent Application Laid-Open No. H5-83588, e.g., dicyclopentadienyl-Ti-bisphenyl, dicyclopentadienyl-Ti-bis-2,6-difluorophenyl-1-yl, dicyclopentadienyl-Ti-bis-2,4-difluorophenyl-1-yl, dicyclopentadienyl-Ti-bis-2,4,6-trifluorophenyl-1-yl, dicyclopentadienyl-Ti-bis-2,3,5,6-tetrafluorophenyl-1-yl, dicyclopentadienyl-Ti-bis-2,3,4,5,6-pentafluorophenyl-1-yl, dimethylcyclopentadienyl-Ti-bis-2,6-dofluorophenyl-1-yl, dimethylcyclopentadienyl-Ti-bis-2,4,6-trifluorophenyl-1-yl, dimethylcyclopentadienyl-Ti-bis-2,3,5,6-tetrafluorophenyl-1-yl, and dimethylcyclopentadienyl-Ti-bis-2,3,4,5,6-pentafluorophenyl-1-yl, may be exemplified, and iron-arene complexes disclosed in Patent Application Laid-Open No. H1-304453, and Patent Application Laid-Open No. H1-152109 may be exemplified.

As for the biimidazole compound, for example, a hexaarylbiimidazole compound (lophine dimer compound) is preferred.

As for the hexaarylbiimidazole compound, for example, lophine dimers disclosed in Patent Publication No. S45-37377, Patent Publication No. S44-86516, and various compounds disclosed in Patent Publication No. H6-29285 and specifications of U.S. Pat. Nos. 3,479,185, 4,311,783, and 4,622,286, and specifically, 2,2'-bis(o-chlorophenyl)-4,4',5,5'-tetraphenylbiimidazole, 2,2'-bis(o-bromophenyl))4,4',5,5'-tetraphenylbiimidazole, 2,2'-bis(o, p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o, o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, 2,2'-bis(o-trifluorophenyl)-4,4',5,5'-tetraphenylbiimidazole may be exemplified.

Specific examples of the organic borate compound may include organic borates disclosed in Patent Application Laid-Open No. S62-143044, Patent Application Laid-Open No. S62-150242, Patent Application Laid-Open No. H9-188685, Patent Application Laid-Open No. H9-188686, Patent Application Laid-Open No. H9-188710, Patent Application Laid-Open No. 2000-131837, Patent Application Laid-Open No. 2002-107916, U.S. Pat. No. 2,764,769, Patent Application Laid-Open No. 2001-16539, and Kunz, Martin "Rad Tech '98. Proceeding Apr. 19-22, 1998, Chicago", organic boron sulfonium complexes or organic boron oxosulfonium complexes disclosed in Patent Application Laid-Open No. H6-157623, Patent Application Laid-Open No. H6-175564, and Patent Application Laid-Open No. H6-175561, organic boron iodonium complexes disclosed in Patent Application Laid-Open No. H6-175554, and Patent Application Laid-Open No. H6-175553, organic boron phosphonium complexes disclosed in Patent Application Laid-Open No. H9-188710, and organic boron transition metal coordination complexes disclosed in Patent Application Laid-Open No. H6-348011, Patent Application Laid-Open No. H7-128785, Patent Application Laid-Open No. H7-140589, Patent Application Laid-Open No. H7-306527, and Patent Application Laid-Open No. H7-292014.

Examples of the disulfone compound may include compounds disclosed in Patent Application Laid-Open No. S61-166544 and Patent Application Laid-Open No. 2002-328465.

As for the polymerization initiator, a hydroxyacetophenone compound, an aminoacetophenone compound, and an acylphosphine compound may be properly used. More specifically, for example, aminoacetophenone-based initiators disclosed in Patent Application Laid-Open No. 1110-291969, and acylphosphine oxide-based initiators disclosed in U.S. Pat. No. 4,225,898 may also be used.

As for the hydroxyacetophenone initiator, IRGACURE-184, DAROCUR-1173, IRGACURE-500, IRGACURE-2959, and IRGACURE-127 (trademark, manufactured by BASF) may be used. As for the aminoacetophenone initiator, commercially available products such as IRGACURE-907, IRGACURE-369, and IRGACURE-379 (trademark: manufactured by BASF) may be used. As for the aminoacetophenone initiator, compounds having an absorption wavelength matching with a long wave light source at 365 nm or 405 nm, which are disclosed in Patent Application Laid-Open No. 2009-191179, may also be used. As for the acylphosphine-based initiator, a commercially available product, IRGACURE-819 or DAROCUR-TPO (trademark: manufactured by BASF) may be used.

As for the polymerization initiator, in view of curability, stability over time, and difficulty in coloring during post-heating, an oxime compound is preferred.

As for the oxime compound, compounds disclosed in J. C. S. Perkin II (1979) 1653-1660), J. C. S. Perkin II (1979) 156-162, Journal of Photopolymer Science and Technology (1995) 202-232, Journal of Applied Polymer Science, 2012) pp. 725-731, and Patent Application Laid-Open No. 2000-66385, and compounds disclosed in Patent Application Laid-Open No. 2000-80068, and Japanese National Publication of International Patent Application No. 2004-534797 may be exemplified.

As for an oxime ester compound besides those described above, a compound disclosed in Japanese National Publication of International Patent Application No. 2009-519904, in which oxime is linked to a carbazole N-position, a compound disclosed in U.S. Pat. No. 7,626,957, in which a hetero substituent is introduced to a benzophenone site, a compound disclosed in Patent Application Laid-Open No. 2010-15025 and U.S. Patent Application Laid-Open No. 2009-292039, in which a nitro group is introduced to a dye site, a ketooxime-based compound disclosed in WO2009-131189, a compound disclosed in U.S. Pat. No. 7,556,910, in which a triazine skeleton and an oxime skeleton are included in the same molecule, and a compound disclosed in Patent Application Laid-Open No. 2009-221114, which has an absorption maximum at 405 nm and a good sensitivity to g-line light source, may be used.

Further, cyclic oxime compounds disclosed in Patent Application Laid-Open No. 2007-231000 and Patent Application Laid-Open No. 22007-322744 may also be properly used. Among the cyclic oxime compounds, particularly, a cyclic oxime compound condensed to a carbazole dye, which is disclosed in Patent Application Laid-Open No. 2010-32985 and Patent Application Laid-Open No. 2010-185072, is preferred in view of a high light absorbance and a high sensitivity.

Also, a compound disclosed in Patent Application Laid-Open No. 2009-242469, which has an unsaturated bond at a specific site of an oxime compound, may be properly used because it achieves a high sensitivity by regenerating active radicals from polymerization-inactive radicals.

Further, a compound having a specific substituent, which is disclosed in Patent Application Laid-Open No. 2007-269779, or an oxime compound having a thioaryl group, which is disclosed in Patent Application Laid-Open No. 2009-191061 may be exemplified.

Specifically, a compound represented by Formula (OX-1) below is also preferred. A N—O bond of oxime may be either an oxime compound of (E)-body, or an oxime compound of (Z)-body, or a mixture of (E)-body and (Z)-body.

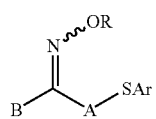

(OX-1)

(in Formula (OX-1), each of R and B independently represents a monovalent substituent, A represents a divalent organic group, and an Ar represents an aryl group.)

In Formula (OX-1) above, a monovalent substituent represented by R is preferably a monovalent non-metallic atomic group.

Examples of the monovalent non-metallic atomic group may include an alkyl group, an aryl group, an acyl group, an alkoxycarbonyl group, an aryloxycarbonyl group, a heterocyclic group, an alkylthiocarbonyl group, and an arylthio carbonyl group. Also, each of these groups may have one or more substituents. The above described substituents may be further substituted with other substituents.

As for the substituent, a halogen atom, an aryloxy group, an alkoxycarbonyl group or an aryloxycarbonyl group, an acyloxy group, an acyl group, an alkyl group, and an aryl group may be exemplified.

As an alkyl group which may have a substituent, an alkyl group having 1 to 30 carbon atoms is preferred. Specifically, descriptions in paragraph 0026 of Patent Application Laid-Open No. 2012-032556 may be taken into consideration, and the contents thereof are incorporated in this specification.

As an aryl group which may have a substituent, an aryl group having 6 to 30 carbon atoms is preferred. Specifically, descriptions in paragraph 0027 of Patent Application Laid-Open No. 2012-032556 may be taken into consideration, and the contents thereof are incorporated in this specification.

As an acyl group which may have a substituent, an acyl group having 2 to 20 carbon atoms is preferred. Specifically, descriptions in paragraph 0028 of Patent Application Laid-Open No. 2012-032556 may be taken into consideration, and the contents thereof are incorporated in this specification.

As an alkoxycarbonyl group which may have a substituent, an alkoxycarbonyl group having 2 to 20 carbon atoms is preferred. Specifically, descriptions in paragraph 0029 of Patent Application Laid-Open No. 2012-032556 may be taken into consideration, and the contents thereof are incorporated in this specification.

As an aryloxycarbonyl group which may have a substituent, specifically, descriptions in paragraph 0030 of Patent Application Laid-Open No. 2012-032556 may be taken into consideration, and the contents thereof are incorporated in this specification.

As a heterocyclic group which may have a substituent, an aromatic or aliphatic heterocyclic ring including a nitrogen atom, an oxygen atom, a sulfur atom or a phosphorous atom is preferred.

Specifically, descriptions in paragraph 0031 of Patent Application Laid-Open No. 2012-032556 may be taken into consideration, and the contents thereof are incorporated in this specification.

As an alkylthiocarbonyl group which may have a substituent, specifically, descriptions in paragraph 0032 of Patent Application Laid-Open No. 2012-032556 may be taken into consideration, and the contents thereof are incorporated in this specification.

As an arylthiocarbonyl group which may have a substituent, specifically, descriptions in paragraph 0033 of Patent Application Laid-Open No. 2012-032556 may be taken into consideration, and the contents thereof are incorporated in this specification.

In Formula (OX-1) above, as for the monovalent substituent represented by B, an aryl group, a heterocyclic group, an aryl carbonyl group, or a heterocyclic ringcarbonyl group may be exemplified. Also, each of these groups may have one or more substituents. As for the substituent, the substituents described above may be exemplified. The above described substituents may be further substituted with other substituents.

Among them, a structure described below is particularly preferred.

In the structure below, Y, X, and n are the same as Y, X, and n in Formula (OX-2) to be described later, respectively, and preferred examples thereof are also the same.

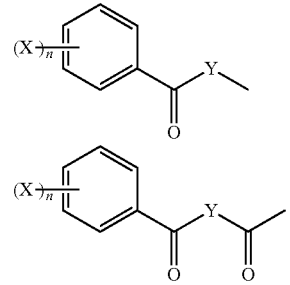

In Formula (OX-1), as for the divalent organic group represented by A, an alkylene group having 1 to 12 carbon atoms, a cycloalkylene group, and an alkynylene group may be exemplified. Also, each of these groups may have one or more substituents. As for the substituent, the substituents described above may be exemplified. The above described substituents may be further substituted with other substituents.

Among them, in Formula (OX-1), as for A, in view of increasing the sensitivity, thereby suppressing coloring with elapse of heating time, an unsubstituted alkylene group, an alkylene group substituted with an alkyl group (e.g., a methyl group, an ethyl group, a tert butyl group, a dodecyl group), an alkylene group substituted with an alkenyl group (e.g., a vinyl group, and an allyl group), and an alkylene group substituted with an aryl group (e.g., a phenyl group, a p-tolyl group, a xylyl group, a cumenyl group, a naphthyl group, an anthryl group, a phenanthryl group, a styryl group) are preferred.

In Formula (OX-1) above, as for an aryl group represented by Ar, an aryl group having 6 to 30 carbon atoms is preferred, and also a substituent may be included. As for the substituent, those similar to substituents introduced into substituted aryl groups mentioned as specific examples of an aryl group which may have a substituent may be exemplified.

Among them, in view of increasing the sensitivity, thereby suppressing coloring with elapse of heating time, a substituted or unsubstituted phenyl group is preferred.

In Formula (OX-1), a "SAr" structure formed by Ar and S adjacent to Ar in Formula (OX-1) above is preferably a structure disclosed in paragraph 0040 of Patent Application Laid-Open No. 2012-032556, and the contents thereof are incorporated in this specification.

The oxime compound represented by Formula (OX-1) above is preferably a compound represented by Formula (OX-2) below.

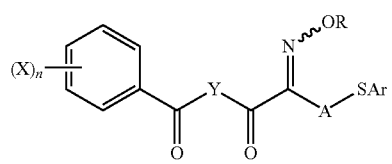

(OX-2)

(In Formula (OX-2), each of R and X independently represents a monovalent substituent, each of A and Y independently represents a divalent organic group, Ar represents an aryl group, and n is an integer of 0 to 5.)

In Formula (OX-2), R, A, and Ar are the same as R, A, and Ar in Formula (OX-1) above, respectively, and preferred examples thereof are also the same.

In Formula (OX-2) above, as for a monovalent substituent represented by X, an alkyl group, an aryl group, an alkoxy group, an aryloxy group, an acyloxy group, an acyl group, an alkoxycarbonyl group, an amino group, a heterocyclic group, and a halogen atom may be exemplified. Also, each of these groups may have one or more substituents. As for the substituent, the substituents described above may be exemplified. The above described substituents may be further substituted with other substituents.

Among these, as for X in Formula (OX-2), in view of improving the solvent solubility and the absorption efficiency at a long wavelength range, an alkyl group is preferred.

In Formula (2), n represents an integer of 0 to 5, and preferably an integer of 0 to 2.

In Formula (OX-2) above, as for the divalent organic group represented by Y, structures Sub-1 to Sub-11 to be described later may be exemplified. In the groups described below, "*" represents a bonding position to a carbon atom adjacent to Y in Formula (OX-2) above.

Among them, in view of a high sensitivity, structures Sub-1 and Sub-2 are preferred.

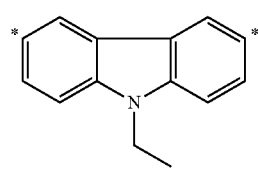

Sub-1

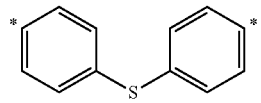

Sub-2

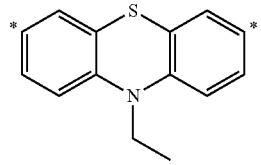

Sub-3

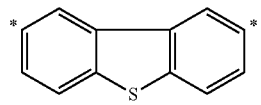

Sub-4

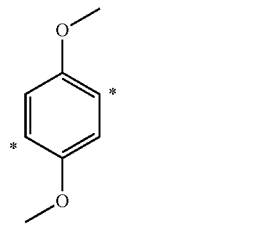

Sub-5

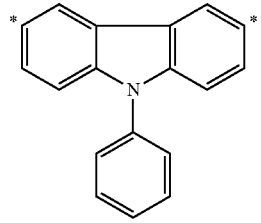

Sub-6

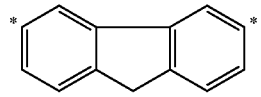

Sub-7

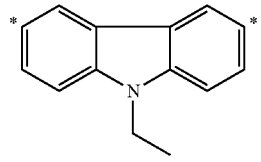

Sub-8

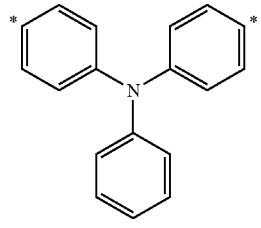

Sub-9

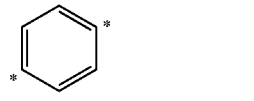

Sub-10

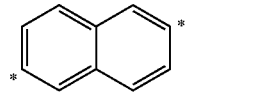

Sub-11

The oxime compound represented by Formula (OX-2) above is a compound represented by Formula (OX-3) below.

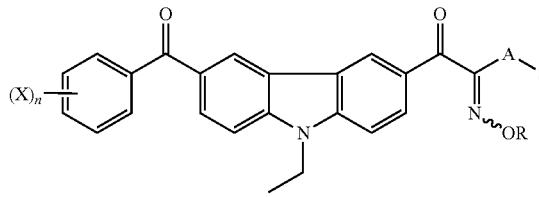

(OX-3)

In Formula (OX-3), each of R and X independently represents a monovalent substituent, A represents a divalent organic group, Ar represents an aryl group, and n is an integer of 0 to 5. In Formula (OX-3), R, X, A, Ar, and n are the same as R, X, A, Ar, and, n in Formula (OX-2) above, respectively, and preferred examples thereof are also the same.

Specific examples (PIox-1) to (PIox-13) of an oxime compound which may be properly used are described below, but the present invention is not limited thereto.

Plox-1
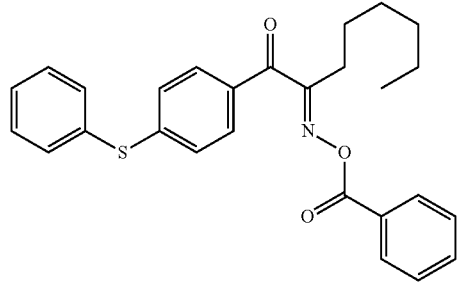

Plox-2
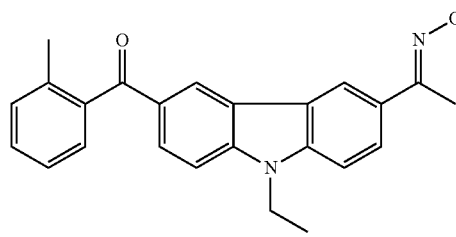

Plox-3
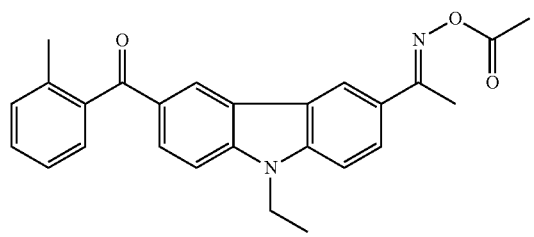

Plox-4
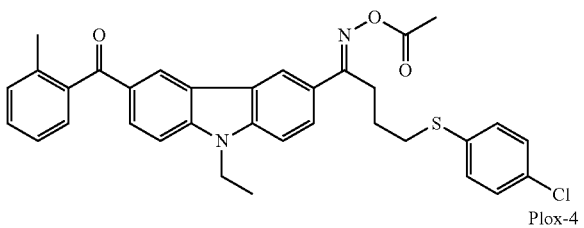

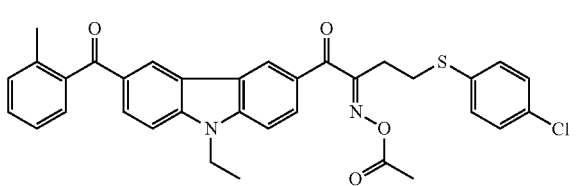

Plox-5
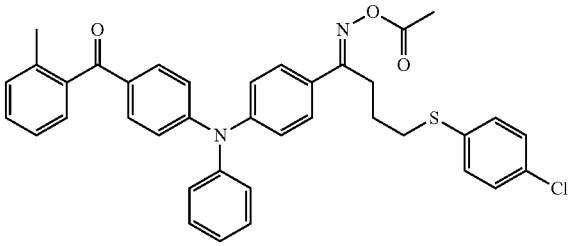

Plox-6
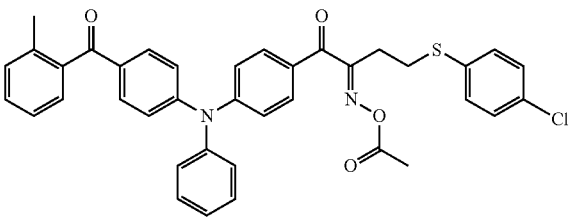

Plox-7
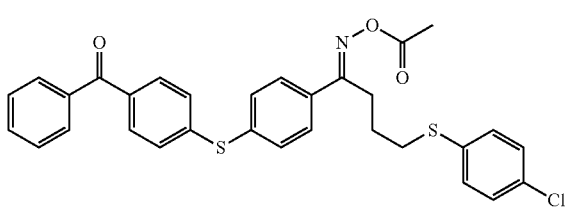

Plox-8
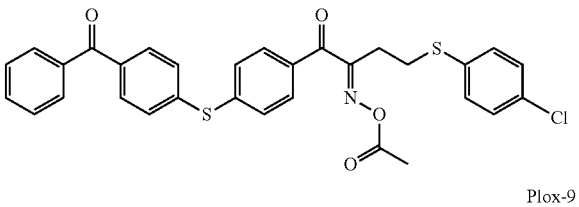

Plox-9
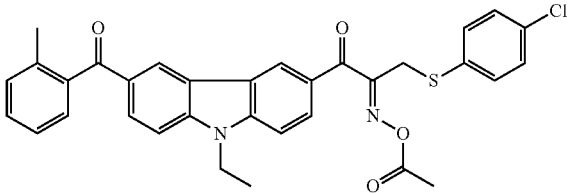

Plox-10
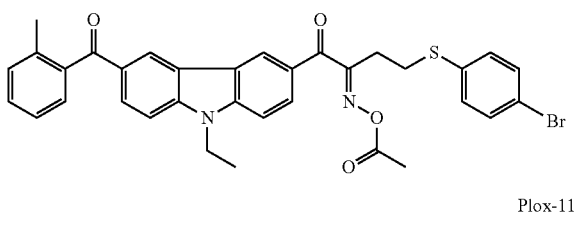

Plox-11
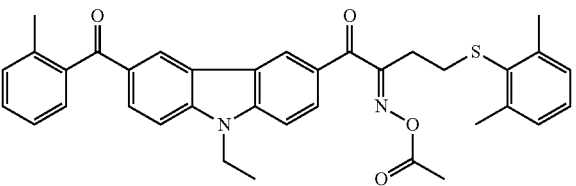

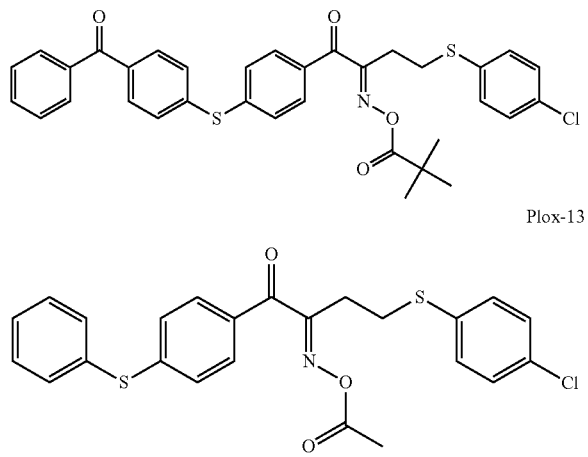

The oxime compound has a function as a thermal polymerization initiator which initiates and facilitates polymerization through thermal decomposition.

The oxime compound preferably has a maximum absorption wavelength in a wavelength range of 350 nm to 500 nm, more preferably has an absorption wavelength in a wavelength range of 360 nm to 480 nm, and particularly preferably has a high absorbance at 365 nm and 455 nm.

The molar extinction coefficient of the oxime compound at 365 nm or 405 nm, in view of sensitivity, ranges preferably from 1,000 to 300,000, more preferably from 2,000 to 300,000, and particularly preferably from 5,000 to 200,000. The molar extinction coefficient of the compound may be measured by a conventionally known method, and specifically preferably measured by using an ethyl acetate solvent at a concentration of 0.01 g/L through, for example, a ultraviolet-visible spectrophotometer (Carry-5 spectrophotometer manufactured by Varian Co., Ltd.).

As for the oxime compound, commercially available products such as TRONLY TR-PBG-304, TRONLY TR-PBG-309, and TRONLY TR-PBG-305 (manufactured by CHANGZHOU TRONLY NEW ELECTRONIC MATERIALS CO., LTD.) may be used. Descriptions on the polymerization initiator disclosed in paragraphs 0092 to 0096 of Patent Application Laid-Open No. 2012-113104 may be taken into consideration, and the contents thereof are incorporated in this specification. By using such an oxime compound, a resin composition high in curing sensitivity and good in developability may be provided. The oxime compound is a compound disclosed in paragraph 0030 and later of Patent Application Laid-Open No. 2012-113104. A Formula thereof is represented by Formula (I) disclosed in claim 1 of Patent Application Laid-Open No. 2012-113104, and more preferably represented by Formula (I-A) disclosed in claim 3, and descriptions thereof may be taken into consideration, and the contents thereof are incorporated in this specification.

Commercially available products such as IRGACURE OXE01 and IRGACURE OXE02 (manufactured by BASF Co., Ltd.) may be properly used.

Examples of the onium salt compound may include a diazo salt disclosed in S. I. Schlesinger, Photogr. Sci. Eng., 18, 387 (1974), T. S. Bal et al, Polymer, 21, 423 (1980), an ammonium salt disclosed in U.S. Pat. No. 4,069,055 specification, and Patent Application Laid-Open No. H4-365049, a phosphonium salt disclosed U.S. Pat. Nos. 4,069,055, and 4,069,056 specifications, and an iodonium salt disclosed in European Patent No. 104,143 specification, Patent Application Laid-Open No. H2-150848, and Patent Application Laid-Open No. H2-296514.

Examples of the sulfonium salt may include sulfonium salts disclosed in specifications of European Patent Nos. 370,693, 390,214, 233,567, 297,443, and 297,442, U.S. Pat. Nos. 4,933,377, 4,760,013, 4,734,444, and 2,833,827, and German Patent Nos. 2,904,626, 3,604,580, and 3,604,581, and in view of the stability and sensitivity, preferably, an electron-withdrawing group is substituted. As for the electron-withdrawing group, a group having a Hammett value greater than 0 is preferred. Preferred examples of the electron-withdrawing group may include a halogen atom and a carboxylic acid group.

As for other preferred sulfonium salts, a sulfonium salt having an absorbance at 300 nm or more, in which one substituent of a triarylsulfonium salt has a coumarin structure or an anthraquinone structure, may be exemplified. As for further preferred sulfonium salts, a sulfonium salt having an absorbance at 300 nm or more, in which a triaryl sulfonium salt has an aryloxy group, or an arylthio group as a substituent, may be exemplified.

Examples of the onium salt compound may include onium salts such as a selenonium salt disclosed in J. V. Crivello et al, Macromolecules, 10(6), 1307 (1977), J. V. Crivello et al, J. Polymer Sci., Polymer Chem. Ed., 17, 1047 (1979), and an arsonium salt disclosed in C. S. Wen et al, Teh, Proc. Conf. Rad. Curing ASIA, p 478 Tokyo, October (1988).

As for the acylphosphine(oxide) compound, Irgacure 819, DAROCUR 4265, and DAROCUR TPO manufactured by BASF Co., Ltd. may be exemplified.

As for the (E) polymerization initiator, in view of the curability, a compound selected from the group consisting of a trihalomethyltriazine compound, a benzyldimethylketal compound, an α-hydroxyketone compound, an α-aminoketone compound, an acylphosphine compound, a phosphineoxide compound, a metallocene compound, an oxime compound, a triallyl imidazole dimer, an onium compound, a benzothiazole compound, a benzophenone compound, an acetophenone compound and a derivative thereof, a cyclopentadiene-benzene-iron complex and a salt thereof, a halomethyl oxadiazole compound, and a 3-aryl-substituted coumarin compound is preferred.

More preferably, a trihalomethyl triazine compound, an α-aminoketone compound, an acylphosphine compound, a phosphineoxide compound, an oxime compound, a triallyl imidazole dimer, an onium-based compound, a benzophenone compound, and an acetophenone compound may be exemplified, and at least one kind of compound selected from the group consisting of a trihalomethyltriazine compound, an α-aminoketone compound, an oxime compound, a triallyl imidazole dimer, and a benzophenone compound is most preferred.

Due to a less coloration during post-heating, and a good curability, as for the (E) polymerization initiator, an oxime-based compound is most preferably used.

When the curable resin composition for forming a high refractive index layer contains a (E) polymerization initiator, the content of the (E) polymerization initiator included in the curable resin composition for forming a high refractive index layer (the total content of polymerization initiators in a case of two or more kinds thereof) preferably ranges from 0.1% by mass to 10% by mass, more preferably from 0.3% by mass to 8% by mass, and further preferably from 0.5% by mass to 5% by mass based on the total solid content of the curable composition. Within this ranges, a satisfactory curability may be achieved.

The curable resin composition for forming a high refractive index layer, as necessary, may further contain optional components described later. Hereinafter, optional components which may be contained in the curable composition will be described.

[Solvent]

The curable resin composition for forming a high refractive index layer preferably contains a solvent. The solvent may be constituted by various organic solvents.

As for the organic solvent which may be used herein, acetone, methyl ethyl ketone, cyclohexane, ethyl acetate, ethylene dichloride, tetrahydrofuran, toluene, ethyleneglycol monomethylether, ethyleneglycol monoethylether, ethyleneglycol dimethylether, propyleneglycol monomethylether, propyleneglycol monoethylether, acetylacetone, cyclohexanone, diacetonealcohol, ethyleneglycol monomethylether acetate, ethylene glycol ethylether acetate, ethyleneglycol monoisopropylether, ethylene glycol monobutylether acetate, 3-methoxypropanol, methoxymethoxyethanol, diethyleneglycol monomethylether, diethyleneglycol monoethylether, diethyleneglycol dimethylether, diethyleneglycol diethylether, propyleneglycol monomethylether acetate, propyleneglycol monoethylether acetate, 3-methoxypropyl acetate, N,N-dimethylformamide, dimethylsulfoxide, γ-butyrolactone, methyl lactate, and ethyl lactate may be exemplified.

These organic solvents may be used alone or in combination. In the curable resin composition for forming a high refractive index layer, the concentration of the solid preferably ranges from 2% by mass to 60% by mass.

[Polymerization Inhibitor]

In order to prevent unwanted polymerization of a compound having a polymerizable ethylenically unsaturated double bond, during preparation or storage of the curable composition, a polymerization inhibitor is preferably added.

As for the polymerization inhibitor, phenolic hydroxyl group-containing compounds, N-oxide compounds, piperidine 1-oxyl free radical compounds, pyrrolidine 1-oxyl free radical compounds, N-nitrosophenylhydroxyl amines, diazonium compounds, and cationic dyes, sulfide group-containing compounds, nitro group-containing compounds, transition metal compounds such as $FeCl_3$, and $CuCl_2$ may be exemplified.

More preferred aspects are as follows.

The phenolic hydroxyl group-containing compound is preferably a compound selected from the group consisting of hydroquinone, p-methoxy phenol, di-t-butyl-p-cresol, pyrogallol, t-butyl catechol, benzoquinone, 4,4-thiobis(3-methyl-6-t-butylphenol), 2,2-methylenebis(4-methyl-6-t-butylphenol), phenol resins, and cresol resins.

The N-oxide compound is preferably a compound selected from the group consisting of 5,5-dimethyl-1-pyrroline N-oxide, 4-methylmorpholineN-oxide, pyridine N-oxide, 4-nitropyridine N-oxide, 3-hydroxypyridine N-oxide, picoline acid N-oxide, nicotinic acid N-oxide, and isonicotinic acid N-oxide.

The piperidine 1-oxyl freeradical compound is preferably a compound selected from the group consisting of piperidine 1-oxyl freeradical, 2,2,6,6-tetramethylpiperidine1-oxyl freeradical, 4-oxo-2,2,6,6-tetramethylpiperidine 1-oxyl freeradical, 4-hydroxy-2,2,6,6-tetramethylpiperidine 1-oxyl free radical, 4-acetamide-2,2,6,6-tetramethylpiperidine 1-oxyl freeradical, 4-maleimide-2,2,6,6-tetramethylpiperidine 1-oxyl freeradical, and 4-phosphonoxy-2,2,6,6-tetramethylpiperidine 1-oxyl freeradical.

The pyrrolidine 1-oxyl freeradical compound is preferably 3-carboxyproxyl free radical (3-carboxy-2,2,5,5-tetramethylpyrrolidine 1-oxyl freeradical).

The N-nitrosophenylhydroxyl amine is preferably a compound selected from the compound group consisting of N-nitrosophenylhydroxyl amine cerous salt and N-nitrosophenylhydroxyl amine aluminium salt.

The diazonium compound is preferably a compound selected from the group consisting of hydrogen sulfate of 4-diazophenyldimethylamine, tetrafluoro borate of 4-diazodiphenylamine, and hexafluorophosphate salt of 3-methoxy-4-diazodiphenylamine.

Among Exemplary Compounds described above, a phenolic hydroxyl group-containing compound such as, hydroquinone, p-methoxyphenol, di-t-butyl-p-cresol, pyrogallol, t-butyl catechol, benzoquinone, 4,4-thiobis(3-methyl-6-t-butylphenol), and 2,2'-methylenebis(4-methyl-6-t-butylphenol), a piperidine 1-oxyl freeradical or a piperidine 1-oxyl freeradical compound such as, 2,2,6,6-tetramethylpiperidine 1-oxyl freeradical, 4-oxo-2,2,6,6-tetramethylpiperidinel-oxyl freeradical, 4-hydroxy-2,2,6,6-tetramethylpiperidine 1-oxyl freeradical, 4-acetamide-2,2,6,6-tetramethylpiperidine 1-oxyl freeradical, 4-maleimide-2,2,6,6-tetramethylpiperidine 1-oxyl freeradical, and 4-phosphonoxy-2,2,6,6-tetramethylpiperidine 1-oxyl freeradical, or an N-nitrosophenylhydroxylamine compound such as N-nitrosophenylhydroxylamine cerous salt and N-nitrosophenylhydroxylamine aluminium salt, is preferred, a piperidine 1-oxyl freeradical compound such as 2,2,6,6-tetramethylpiperidine 1-oxyl freeradical, 4-oxo-2,2,6,6-tetramethylpiperidine 1-oxyl freeradical, 4-hydroxy-2,2,6,6-tetramethylpiperidine 1-oxyl freeradical, 4-acetamide-2,2,6,6-tetramethylpiperidine 1-oxyl freeradical, 4-maleimide-2,2,6,6-tetramethylpiperidine1-oxyl freeradical, and 4-phosphonoxy-2,2,6,6-tetramethylpiperidine 1-oxyl freeradical, or an N-nitrosophenylhydroxylamine compound such as N-nitrosophenylhydroxylamine cerous salt and N-nitrosophenylhydroxyl aminealuminium salt is more preferred, and an N-nitrosophenylhydroxylamine compound such as -nitrosophenylhydroxylamine cerous salt and N-nitrosophenylhydroxylamine aluminium salt is further preferred.

The addition amount of the polymerization inhibitor preferably ranges from 0.01 parts by mass to 10 parts by mass, more preferably from 0.01 parts by mass to 8 parts by mass, and most preferably from 0.05 parts by mass to 5 parts by mass based on 100 parts by mass of the (E) polymerization initiator.

Within the range, curing reaction suppression in a non-image portion and curing reaction promotion in an image portion are sufficiently performed, and the image forming property and the sensitivity become good.

[Surfactant]

The curable resin composition for forming a high refractive index layer may contain various kinds of surfactants in view of further improving coatability. As for the surfactant, various surfactants such as a fluorine-based surfactant, a nonionic surfactant, a cationic surfactant, an anionic surfactant, and a silicon-based surfactant may be used.

Particularly, when the curable resin composition for forming a high refractive index layer contains the fluorine-based surfactant, the liquid property (especially, fluidity) of the composition prepared as a coating liquid is further improved, thereby further improving the uniformity of a coating thickness or liquid saving properties.

That is, when a coating liquid which employs a photosensitive transparent composition containing the fluorine-based surfactant is used for film formation, an interfacial tension between a coated surface and a coating liquid is reduced, and thus the wettability to the coated surface is improved, thereby improving the coatability on the coated surface. This is effective because even when a thin film of about several μm is formed by a small amount of liquid, film formation of a uniform thickness with a small thickness unevenness may be further properly performed.

The fluorine content of the fluorine-based surfactant preferably ranges from 3% by mass to 40% by mass, more preferably from 5% by mass to 30% by mass, and particularly preferably from 7% by mass to 25% by mass. The fluorine-based surfactant having the fluorine content within this range is effective in view of the thickness uniformity of a coated film or liquid saving properties, and also has a good solubility in the curable composition.

The surfactant may be used alone, or in a combination of two or more kinds thereof.

The curable composition may or may not contain a surfactant, but when the composition contains the surfactant, the addition amount of the surfactant preferably ranges from 0.001% by mass to 2.0% by mass and more preferably from 0.005% by mass to 1.0% by mass based on the total mass of the curable composition.

[Other Additives]

The curable resin composition for forming a high refractive index layer may contain conventionally known additives such as a plasticizer or a sensitizer in order to improve the physical property of the cured film.

As for the plasticizer, dioctyl phthalate, dododecylphthalate, triethylene glycol dicaprylate, dimethylglycolphthalate, tricresyl phosphate, dioctyl adipate, dibutyl sebacate, and triacetylglycerin may be exemplified, and when a binder polymer is used, the plasticizer may be added in an amount of 10% by mass or less based on the total amount of the polymerizable compound and the binder polymer.

[Ultraviolet Absorber]

The curable resin composition for forming a high refractive index layer may contain an ultraviolet Absorber. As for the ultraviolet absorber, a compound represented by Formula (I) below which is a conjugated dien-based compound is particularly preferred.

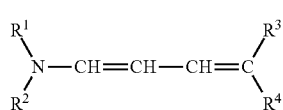

Formula (I)

In Formula (I) above, each of $R^1$ and $R^2$ independently represents a hydrogen atom, an alkyl group having 1 to 20 carbon atoms or an aryl group having 6 to 20 carbon atoms, and $R^1$ and $R^2$ may be the same or different, but never simultaneously represent hydrogen atoms.

In Formula (I), each of $R^3$ and $R^4$ represents an electron withdrawing group. Here, the electron withdrawing group is an electron-withdrawing group having a Hammett's substituent constant σp value (hereinafter, simply referred to as "σp value") in a range of 0.20 to 1.0. Preferably, the electron withdrawing group is an electron-withdrawing group having a σp value ranging from 0.30 to 0.8.

Hammett's rule is an empirical rule suggested by L. P. Hammett 1935 in order to deal quantitatively with the influence of substituents on reactions or equilibria of benzene derivatives, and nowadays, its validity is widely accepted. The substituent constants determined by the Hammett's rule include σp values and σm values, many of which are described in general books and are described in detail, for example, by J. A. Dean in "Lange's Handbook of Chemistry" $12^{th}$ edition, 1979 (McGraw-Hill), and in "Kagaku no Ryoiki Zokan," No. 122, pp. 96 to 103, 1979 (Nankodo), Chemical Reviews, Vol. 91, pp. 165 to 195, 1991. The present invention should not be construed as being limited to the substituents whose values are known and described in literature of these books. Meanwhile, the present invention includes substituents whose values are not known in the literature but fall within the above range when measured in accordance with the Hammett's rule.

Specific examples of the electron-withdrawing group having a σp value of 0.20 to 1.0 may include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, an alkyl group substituted with at least two or more halogen atoms, an alkoxy group substituted with at least two or more halogen atoms, an aryloxy group substituted with at least two or more halogen atoms, an alkylamino group substituted with at least two or more halogen atoms, an alkylthio group substituted with at least two or more halogen atoms, an aryl group substituted with another electron-withdrawing group having a σp value of 0.20 or more, a heterocyclic group, a chlorine atom, a bromine atom, an azo group, and a selenocyanate group. Among these substituents, a group which may further have a substituent may further include the substituents as exemplified above.

Hereinafter, specific preferred examples [Exemplary Compounds (1) to (14)] of the compound represented by Formula (I) above will be described. However, the present invention is not limited thereto.

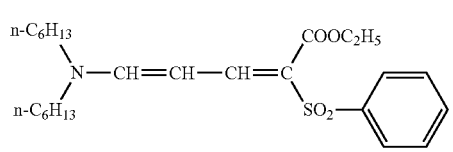

(1)

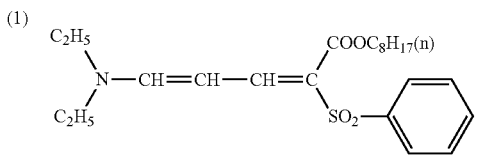

(2)

-continued

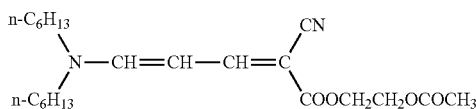  (3)

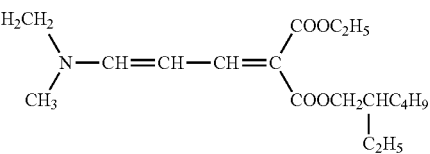  (4)

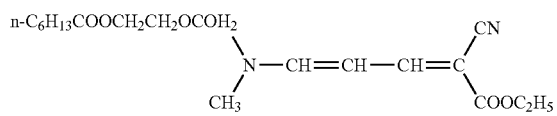  (5)

(6)

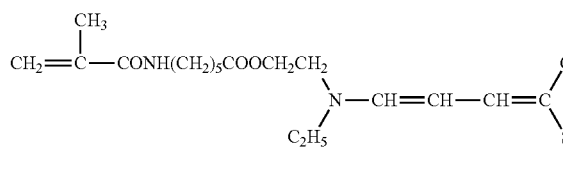

(7)

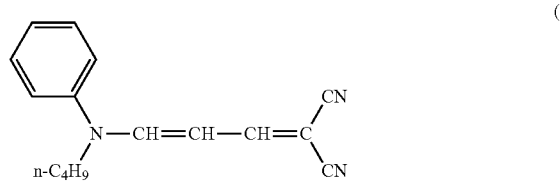

(8)

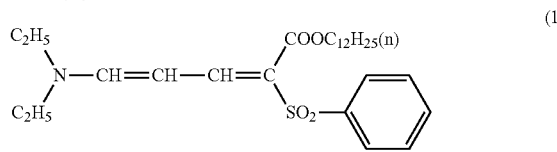

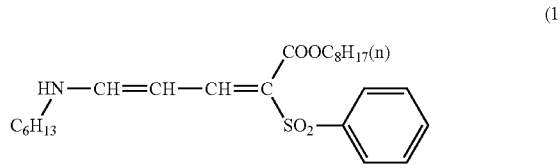  (9)

(10)

  (11)

(12)

  (13)

(14)

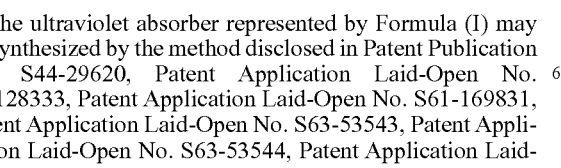

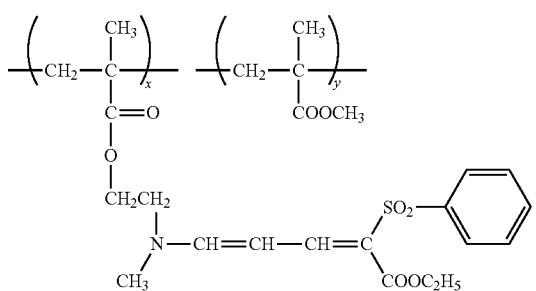

x:y = 80:20
(Mass ratio)

The ultraviolet absorber represented by Formula (I) may be synthesized by the method disclosed in Patent Publication No. S44-29620, Patent Application Laid-Open No. 53-128333, Patent Application Laid-Open No. S61-169831, Patent Application Laid-Open No. S63-53543, Patent Application Laid-Open No. S63-53544, Patent Application Laid-Open No. S63-56651, and pamphlet No. WO2009/123109. Specifically, Exemplary Compound (1) may be synthesized by the method disclosed in paragraph No. 0040 of pamphlet No. WO2009/123109.

The curable resin composition for forming a high refractive index layer may or may not contain the ultraviolet absorber, but when the composition contains the ultraviolet absorber, the content of the ultraviolet absorber preferably ranges from 0.1% by mass to 10% by mass, more preferably from 0.1% by mass to 5% by mass, and particularly preferably from 0.1% by mass to 3% by mass based on the total solid content of the composition.

The curable resin composition for forming a high refractive index layer is preferably filtered through a filter in order to remove foreign matters or reduce defects. The filter to be used is not particularly limited as long as it has conventionally been used for filtration. For example, the filter may be made of a fluorine resin such as PTFE (polytetrafluoroethylene), a polyamide-based resin such as nylon-6 or nylon-6,6, or a polyolefin resin (including high density and ultra-high molecular weight poleolefins) such as polyethylene or polypropylene (PP). Among these materials, polypropylene (including high density polypropylene) is preferred.

A pore diameter of a filter properly ranges from about 0.01 μm to 7.0 μm, preferably from about 0.01 μm to 2.5 μm, and more preferably from about 0.01 μm to 1.5 μm. Within this range, it is possible to securely remove fine foreign matters which are mixed with dissolved pigments, thereby inhibiting preparation of a homogenous and smooth curable composition in subsequent steps.

When the filter is used, another filter may be combined with the filter. Here, filtering with a first filter may be performed once or two or more times. When two or more filterings are performed through a combination of different filters, it is preferable that a pore diameter of second or later filterings is larger than that of the first filtering. Within the above described range, the first filters having different pore diameters may be used in combination. Here, the pore diameter may refer to the nominal value of filter manufacturers. As a commercially available filter, for example, a filter may be selected from various filters provided by Nihon Pall Ltd., Advantec Toyo Kaisha, Ltd., Nihon Entegris K.K. (former Nihon Mykrolis K.K.) or KITZ MICROFILTER CORPORATION.

As for the second filter, a filter made of the same material as that of the above described first filter may be used. The pore diameter of the second filter suitably ranges from about 0.5 μm to 7.0 μm, preferably from about 2.5 μm to 7.0 μm, and more preferably from about 4.5 μm to 6.0 μm. Within this range, it is possible to remove foreign matters which are mixed with a mixed liquid, thereby inhibiting preparation of a homogenous and smooth curable composition in subsequent steps, while allowing component particles contained in the mixed liquid to remain.

For example, the filtering with the first filter may be performed by only a dispersion liquid, and then the second filtering may be performed after other components are mixed.

<Curable Resin Composition for Forming Low Refractive Index Layer>

A curable resin composition for forming a low refractive index layer in the present invention preferably contains a curable resin, more preferably contains a siloxane resin or a fluorine-based resin, and further preferably contains a siloxane resin. As a component to be contained in the composition, hollow particles are preferably used.

In the infrared ray cutoff filter of the present invention, when at least one layer of low refractive index layers is a layer containing a dye having a maximum absorption wavelength in a range of 600 nm to 820 nm, the curable resin composition for forming a low refractive index layer may contain the above described dye.

The siloxane resin may be obtained by using an alkoxysilane raw material to be described later, through a hydrolysis reaction and a condensation reaction. More specifically, the compound may be obtained when a part or all of alkoxy groups of alkyltri alkoxysilane are converted into silanol groups through hydrolysis, and at least a part of the produced silanol groups are condensed to form a Si—O—Si bond. The siloxane resin may be a siloxane resin which has any one of silsesquioxane structures of a cage type, a ladder type, and a random type. The "cage type," "ladder type," and "random type" may refer to, for example, structures of a silsesquioxane material which are described in, for example, Chemistry, Application and Development (published by CMC).

(Silsesquioxane Structure)

The siloxane resin may preferably have a silsesquioxane structure represented by Formula (1) below.

formula (1)

(in Formula (1) above, $R^1$ represents an alkyl group having 1 to 3 carbon atoms. n represents an integer of 20 to 1000.)

The alkyl group represented by $R^1$ is not particularly limited as long as it has carbon atoms within the above described range, but examples thereof may include a methyl group, an ethyl group, a propyl group, and an isopropyl group. Among them, a methyl group, and an ethyl group are preferred, and a methyl group is most preferred. The alkyl group represented by $R^1$ may be an alkyl group not having a substituent or an alkyl group having a substituent, but an alkyl group not having a substituent is preferred.

The substituent which may be possessed by the alkyl group represented by $R^1$ is preferably not a group having a halogen atom, or an ethylenically unsaturated bond, and examples thereof may include an amino group (preferably, an amino group having 0 to 20 carbon atoms, such as amino, N,N-dimethylamino, N,N-diethylamino, N-ethylamino, anilino), a sulfonamide group (preferably, a sulfonamide group having 0 to 20 carbon atoms, such as N,N-dimethylsulfonamide, N-phenylsulfonamide), an acyloxy group (preferably, an acyloxy group having 1 to 20 carbon atoms, such as acetyloxy, benzoyloxy), a carbamoyl group (preferably, a carbamoyl group having 1 to 20 carbon atoms, such as N, N-dimethyl carbamoyl, N-phenyl carbamoyl), and an acylamino group (preferably, an acylamino group having 1 to 20 carbon atoms, such as acetylamino, benzoylamino).

In the present invention, unless specifically stated, a silicon-containing polymer in which a main chain is constituted by a siloxane bond is referred to as polysiloxane or siloxane resin. Since silicon has four bonding hands, a basic constitutional unit of polysiloxane is classified according to the number of organic groups represented by methyl groups or phenyl groups per one silicon atom, and may be classified into four units as described below. In formula below, R is an organic group.

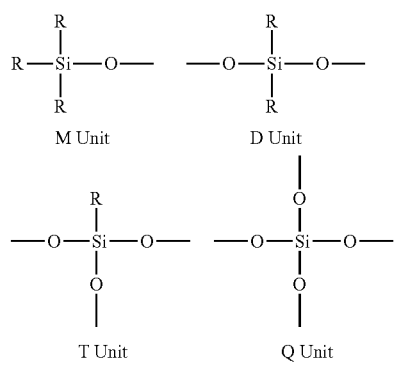

In the present invention, silsesquioxane means a collective term of polysiloxanes having a T unit as a basic constitutional unit, unless specifically stated. Silicon in silsesquioxane is bonded to three oxygens, and oxygen is bonded to two silicons. Thus, the theoretical composition thereof becomes $RSiO_{3/2}$ (3/2 is "SESQUI" in Latin). In the present exemplary embodiment, in the formula of the T unit, R is $R^1$ described above, and the silsesquioxane structural portion is preferably included at the specific content as described above.

In the siloxane resin, silsesquioxane structures described above are contained in a range of 65% by mass to 100% by mass based on the total siloxane resin included in the cured film, that is, in a range of 65% by mass to 100% by mass based on the total siloxane resin included in a resin composition for forming a light transmitting cured film. This ratio preferably ranges from 80% by mass to 100% by mass, more preferably from 95% by mass to 100% by mass, and in actuality, most preferably is 100% by mass (but, even in a case of 100% by mass, other components such as unavoidable impurities may be included in a range not impairing a desired effect.). The siloxane resin may contain one kind of specific polysilsesquioxane structure alone, or two or more kinds thereof.

The siloxane resin is preferably a hydrolytic condensate obtained by hydrolytic condensation of alkyltrialkoxysilane.

(Alkyltrialkoxysilane)

In order to prepare the hydrolytic condensate, as for a starting raw material, an alkoxysilane raw material containing alkyltrialkoxy silane may be used. The alkoxysilane raw material indicates a starting raw material constituted by alkoxysilane (a silicon compound having an alkoxy group). By using alkyltrialkoxysilane as for the raw material, the structure of the obtained hydrolytic condensate becomes more flexible. Thus, due to the presence of organic components, the wettability to the substrate may be further improved.

Alkyltrialkoxysilane is an organic silicon compound in which one alkyl group and three alkoxy groups are bonded to a silicon atom, and may be represented by Formula (2) below.

$$R^2Si(OR^3)_3 \qquad \text{Formula (2)}$$

($R^2$ represents an alkyl group having 1 to 3 carbon atoms, an alkoxyalkyl group having 1 to 8 carbon atoms, or a fluoroalkyl group having 1 to 10 carbon atoms, and $R^3$ represents an alkyl group.)

The alkyl group ($R^2$ in Formula (2)) of alkyltrialkoxysilane is not particularly limited as long as it is within the above described range, but specifically, a methyl group, an ethyl group, a propyl group, an isopropyl group, a methoxymethyl group, a methoxypropyl group, a γ-glycidoxymethyl group, a γ-glycidoxypropyl group, a trifluoromethyl group, a trifluoroethyl group, a trifluoropropyl group, a perfluoro ethyl group, a perfluoro propyl group, and a tridecafluorooctyl group may be exemplified. Among them, a methyl group, an ethyl group, a γ-glycidoxypropyl group, a trifluoromethyl group, a trifluoropropyl group, and a tridecafluorooctyl group are preferred, and a methyl group is most preferred.

The alkoxy group of alkyltrialkoxysilane is not particularly limited, but examples thereof may include a methoxy group, and an ethoxy group. More specifically, $R^3$ in Formula (2) is preferably a straight or branched alkyl group having 1 to 20 carbon atoms. Particularly, it is preferable to have 1 to 10 carbon atoms, and more preferable to have 1 to 4 carbon atoms. Especially, in view of easy control of a hydrolysis speed, an ethoxy group is preferred in which $R^3$ in Formula (2) is an ethyl group.

Examples of alkyltrialkoxysilane may include methyltrimethoxysilane, methyltriethoxysilane, methyltripropoxysilane, ethyltrimethoxysilane, ethyltriethoxysilane, propyltrimethoxysilane, propyltriethoxysilane, γ-glycidoxypropyltrimethoxy silane, trifluoropropyltrimethoxysilane, and tridecafluorooctyl trimethoxysilane. Among them, methyltriethoxysilane, ethyltriethoxysilane, and trifluoropropyltrimethoxysilane are suitably used, methyltriethoxysilane is most preferably used. The alkyltrialkoxysilane may be used either alone or in combination of two or more kinds thereof.

In the alkoxysilane raw material, the content of alkyltrialkoxysilane is preferably 65% by mass or more, and more preferably ranges from 80% by mass to 100% by mass, and further preferably from 95% by mass to 100% by mass. The content within the range is preferable because a good light-receiving sensitivity may be further more effectively achieved.

(Tetraalkoxysilane)

As for the alkoxysilane raw material, alkoxysilanes other than the above described trialkoxysilanes may be used, and among them, tetraalkoxysilane is preferred. The containing of the tetraalkoxysilane is preferable because a crosslinking density in the hydrolytic condensate is increased, and the electrical insulating property, development resistance, and heat resistance of a thin film obtained through film-hardening are further improved.

Tetraalkoxysilane is an organic silicon compound in which four alkoxy groups are bonded to a silicon atom, and may be represented by Formula (3) below.

$$Si(OR^4)_4 \qquad \text{Formula (3)}$$

($R^4$ each independently represents an alkyl group.)

An alkoxy group of tetraalkoxysilane is not particularly limited, but examples thereof may include a methoxy group, and an ethoxy group. More specifically, $R^4$ in Formula (3) is preferably a straight or branched alkyl group having 1 to 20 carbon atoms. Particularly, it is preferable to have 1 to 10 carbon atoms, and more preferable to have 1 to 4 carbon atoms. Especially, in view of easy control of a hydrolysis speed, an ethoxy group is preferred in which $R^4$ in Formula (3) is an ethyl group.

Examples of the tetraalkoxysilane may include tetramethoxysilane, tetraethoxysilane, tetra-n-propoxysilane, tetraisopropoxysilane, tetra-n-butoxysilane, tetraiso butoxysilane, and tetra-tert-butoxysilane. Among them, tetramethoxysilane, and tetraethoxysilane are suitably used.

The tetraalkoxysilane may be used either alone or in combination of two or more kinds thereof.

The content of the tetraalkoxysilane in the alkoxysilane raw material is not particularly limited, but is preferably 35% by mass or less, and more preferably 20% by mass or less because a development-resistant thin film of the composition is more excellent in heat resistance. There is no particular lower limit, but the lower limit is preferably 0.01% by mass or more and more preferably 0.1% by mass or more in order to obtain an addition effect of tetraalkoxysilane.

In the present specification, when compounds are denoted, it is construed that each compound includes, besides the corresponding compound itself, its salt, complex, and ion. Also, within a range showing a desired effect, it is construed that the compound includes a modified derivative in a predetermined form. Also, in the present specification, it is construed that when a substituent (including a linking group) is denoted without description of substitution or unsubstitution, the group may have any substituent. This also applies to a compound denoted without description of substitution or unsubstitution. As a preferred substituent, the following substituent T may be exemplified.

Examples of the substituent T may include the followings.

An alkyl group (preferably, an alkyl group having 1 to 20 carbon atoms such as methyl, ethyl, isopropyl, t-butyl, pentyl, heptyl, 1-ethylpentyl, benzyl, 2-ethoxyethyl, 1-carboxymethyl), an alkenyl group (preferably, an alkenyl group having 2 to 20 carbon atoms such as vinyl, allyl, oleyl), an alkynyl group (preferably, an alkynyl group having 2 to 20 carbon atoms, such as ethynyl, butadiynyl, phenylethynyl), a cycloalkyl group (preferably, a cycloalkyl group having 3 to 20 carbon atoms, such as, cyclopropyl, cyclopentyl, cyclohexyl, 4-methylcyclohexyl), an aryl group (preferably, an aryl group having 6 to 26 carbon atoms, such as, phenyl, 1-naphthyl, 4-methoxy phenyl, 2-chloro phenyl, 3-methyl phenyl), a heterocyclic group (preferably, a heterocyclic group having 2 to 20 carbon atoms, such as 2-pyridyl, 4-pyridyl, 2-imidazolyl, 2-benzimidazolyl, 2-thiazolyl, 2-oxazolyl), an alkoxy group (preferably, an alkoxy group having 1 to 20 carbon atoms, such as methoxy, ethoxy, isopropyloxy, benzyloxy), an aryloxy group (preferably, an aryloxy group having 6 to 26 carbon atoms, such as, phenoxy, 1-naphthyloxy, 3-methylphenoxy, 4-methoxyphenoxy), an alkoxycarbonyl group (preferably, an alkoxycarbonyl group having 2 to 20 carbon atoms, such as, ethoxycarbonyl, 2-ethylhexyloxycarbonyl), an amino group (preferably, an amino group having 0 to 20 carbon atoms, such as, amino, N,N-dimethylamino, N,N-diethylamino, N-ethylamino, anilino), a sulfonamide group (preferably, a sulfonamide group having 0 to 20 carbon atoms, such as, N,N-dimethylsulfonamide, N-phenylsulfonamide), an acyloxy group (preferably, an acyloxy group having 1 to 20 carbon atoms, such as acetyloxy, benzoyloxy), a carbamoyl group (preferably, a carbamoyl group having 1 to 20 carbon atoms, such as, N,N-dimethyl carbamoyl, N-phenyl carbamoyl), an acylamino group (preferably, an acylamino group having 1 to 20 carbon atoms, such as, acetylamino, benzoylamino), a cyano group, or a halogen atom (e.g., a fluorine atom, a chlorine atom, a bromine atom, an iodine atom) may be exemplified, more preferably, an alkyl group, an alkenyl group, an aryl group, a heterocyclic group, an alkoxy group, an aryloxy group, an alkoxycarbonyl group, an amino group, an acylamino group, a cyano group or a halogen atom may be exemplified, and particularly preferably, an alkyl group, an alkenyl group, a heterocyclic group, an alkoxy group, an alkoxycarbonyl group, an amino group, an acylamino group or a cyano group may be exemplified.

When the compound or the substituent contains, for example, an alkyl group, or an alkenyl group, this may be straight or branched, and may be substituted or unsubstituted. When it contains, for example, an aryl group, or a heterocyclic group, this may be a single ring or a condensed ring, and may be substituted or unsubstituted.

(Preparation of Siloxane Resin)

The siloxane resin included in the curable resin composition for forming a low refractive index layer may be obtained by using the above described alkoxysilane raw material through a hydrolysis reaction and a condensation reaction.

As for the hydrolysis reaction and the condensation reaction, conventionally methods may be used, and as necessary, a catalyst such as an acid or a base may be used. The catalyst is not particularly limited as long as it changes pH, and specifically, examples of the acid catalyst (an organic acid, or an inorganic acid) may include a nitric acid, an oxalic acid, an acetic acid, a formic acid, and a hydrochloric acid, and examples of the alkaline catalyst may include ammonia, triethylamine, and ethylenediamine. The amount of the catalyst to be used is not particularly limited as long as the siloxane resin satisfies a predetermined molecular weight.

To a reaction system of the hydrolysis reaction and the condensation reaction, as necessary, a solvent may be added. The solvent is not particularly limited as long as the hydrolysis reaction and the condensation reaction can be performed. Examples thereof may include water, alcohols such as methanol, ethanol, and propanol, ethers such as ethylene glycolmonomethylether, ethylene glycolmonoethylether, and ethylene glycolmonopropylether, esters such as methyl acetate, ethyl acetate, butyl acetate, and propyleneglycolmonomethyletheracetate, and ketones such as acetone, methylethylketone, and methylisoamylketone. Particularly, herein, it is preferable to employ a solvent different from a solvent which contains a siloxane resin to be described later, and it is more preferable to use an alcohol compound having 1 to 5 carbon atoms or an ether compound having 2 to 6 carbon atoms.

As for conditions of the hydrolysis reaction and condensation reaction (temperature, time, solvent amount), optimum conditions are suitably selected according to the kinds of materials to be used.

The weight average molecular weight of the siloxane resin ranges from 1,000 to 50,000. Particularly, it preferably ranges from 2,000 to 45,000, more preferably from 2,500 to 25,000, and particularly preferably from 3,000 to 25,000. The range of the weight average molecular weight easily leads to improvement of a light receiving sensitivity, and thus is preferable.

The weight average molecular weight is measured by using a conventionally known GPC (gel permeation chromatography), and is a value when converted into standard polystyrene. Unless specifically stated, the GPC measurement is carried out by using Waters2695 and Shodex-made GPC column KF-805 L (three columns are directly connected), as for the column, injecting 50 µl of tetrahydrofuran solution (at a column temperature: 40° C., and a sample concentration: 0.5% by mass), allowing tetrahydrofuran as for an elution solvent to flow at a flow rate of 1 ml per minute, and detecting a sample peak by a RI detector (Waters2414) and a UV detector (Waters2996).

The siloxane resin may be used alone, or in a combination of two or more kinds thereof.

The content of the siloxane resin in the curable resin composition for forming a low refractive index layer may be greater than 5% by mass and 50% by mass or less based on the total mass of the composition. Particularly, the content more preferably ranges from 10% by mass to 45% by mass, and particularly preferably from 15% by mass to 40% by mass. When the content is equal to or greater than the lower limit, voids hardly occur, which is particularly advantageous in improvement of a light receiving sensitivity. When the content is equal to or lower than the upper limit, the film thickness becomes sufficiently thick, which does not cause a crack, and thus is sufficiently practical.

The curable resin composition for forming a low refractive index layer in the present invention may contain a curable resin besides the siloxane resin. For example, a copolymer of methacrylic acid, methyl methacrylate, and a monomer in which an alicyclic glycidyl group is introduced to the carboxylic acid terminal of methacrylic acid may be exemplified. As for commercially available products, Cyclomer-P series such as Cyclomer-P ACA230AA may be exemplified.

The content of the curable resin besides the siloxane resin is the same as the above described preferred range for the siloxane resin.

(Surfactant)

The curable resin composition for forming a low refractive index layer preferably contains a surfactant having a polyoxyalkylene structure. The polyoxyalkylene structure refers to a structure in which an alkylene group and a divalent oxygen atom are present adjacent to each other, and specifically, an ethylene oxide (EO) structure, and an propyleneoxide (PO) structure may be exemplified. As for the surfactant having the polyoxyalkylene structure, various surfactants such as a fluorine-based surfactant, a nonionic surfactant, a cationic surfactant, an anionic surfactant, and a silicon-based surfactant, may be used as long as the surfactant has the polyoxyalkylene structure. Among them, a nonionic surfactant, an anionic surfactant, and a silicon-based surfactant are preferred, a nonionic surfactant and an anionic surfactant are further preferred, and an anionic surfactant is most preferred.

When a film formation is performed by using a coating liquid employing the curable resin composition for forming a low refractive index layer, an interfacial tension between a coated surface and a coating liquid is reduced, and thus the wettability to the coated surface is improved, thereby improving the coatability on the coated surface.

Examples of the fluorine-based surfactant may include MEGAFAC F171, F172, F173, F176, F177, F141, F142, F143, F144, R30, F437, F479, F482, F554, F780, F781 (manufactured by DIC Co., Ltd.), FLUORAD FC430, FC431, FC171 (manufactured by Sumitomo 3M Co., Ltd), Surflon S-382, S-141, S-145, SC-101, SC-103, SC-104, SC-105, SC1068, SC-381, SC-383, 5393, KH-40 (manufactured by Asahi Glass Co., Ltd), F-Top EF301, EF303, EF351, EF352 (manufactured by Jemco Co., Ltd.), and PF636, PF656, PF6320, PF6520, PF7002 (manufactured by OMNOVA Co., Ltd.).

Specific examples of the nonionic surfactant may include glycerol, trimethylolpropane, trimethylolethane, their ethoxylates and propoxylates (e.g., glycerolpropoxylate, glycerinethoxylate), polyoxyethylenelaurylether, polyoxyethylenestearyl ether, polyoxyethyleneoleylether (e.g., EMULGEN 404 manufactured by Kao Corporation), polyoxyethyleneoctylphenylether, polyoxyethylenenonylphenylether, polyethyleneglycol dilaurate, polyethyleneglycoldistearate, and ELEBASE BUB-3 manufactured by Aoki Oil Industrial Co., Ltd.

As for the anionic surfactant, specifically, W004, W005, W017 (manufactured by Yosho Co., Ltd.), EMULSOGEN COL-020, EMULSOGEN COA-070, EMULSOGEN COL-080 (manufactured by Clairant Japan Co., Ltd.) and Plysurf A208B (manufactured by DAI-ICHI KOGYO SEIYAKU Co., Ltd.) may be exemplified.

As for the silicon-based surfactant, "Toray Silicon DC3PA", "Toray Silicon SH7PA", "Toray Silicon DC11PA", "Toray Silicon SH21PA", "Toray Silicon SH28PA", "Toray Silicon SH29PA", "Toray Silicon SH30PA", "Toray Silicon SH8400" (manufactured by Dow Corning Toray Co., Ltd.), "TSF-4440", "TSF-4300", "TSF-4445", "TSF-4460", "TSF-4452" (manufactured by Momentive Performance Materials Inc.), "KP341", "KF6001", "KF6002" manufactured by Shin-Etsu Silicone Co., Ltd., "BYK307", "BYK323", "BYK330" (manufactured by BYK Chemie) and "DBE-224", "DBE-621" (manufactured by GELEST) may be exemplified.

The surfactant may be used alone, or in a combination of two or more kinds thereof.

As for the surfactant having a polyoxyalkylene structure, a surfactant represented by Formula (4) below may be exemplified.

$$R^5O(R^6O)_mR^7 \quad \text{Formula (4)}$$

(In the formula above, $R^5$ represents an alkyl group having 1 to 20 carbon atoms, $R^6$ represents an alkylene group having 1 to 4 carbon atoms, and $R^7$ represents a hydrogen atom, a carboxyl group, or —$PO_3H_2$. m represents an integer of 1 to 8.)

More specifically, in Formula (4), $R^5$ may be a straight or branched alkyl group. Particularly, it is preferable to have 5 to 20 carbon atoms, and more preferable to have 12 to 18 carbon atoms. In Formula (4), $R^6$ may be a straight or branched alkylene group, and also a methylene group, an ethylene group, a propylene group, an isopropylene group, a butylene group, and an isobutylene group may be exemplified. Among them, an ethylene group, and an isopropylene group (a group which forms an ethylene oxide structure, or a propyleneoxide structure with an adjacent O atom) are preferred. In Formula (4), $R^7$ is preferably a hydrogen atom or a carboxyl group, and most preferably a carboxyl group.

The addition amount of the surfactant is not particularly limited, but its lower limit of the addition amount is preferably 1 part by mass or more, more preferably 1.5 parts by mass or more, and most preferably 7.5 parts by mass or more based on 100 parts by mass of the above described curable resin. The upper limit is also particularly limited, but is preferably 30 parts by mass or less, and more preferably 15 parts by mass or less.

In the curable resin composition for forming a low refractive index layer, other surfactants may be used along with or separately from the surfactant which has the polyoxyalkylene structure. As for the surfactants, commercially available surfactants may be used, and particularly preferably used in combination with a silicon-based surfactant. As for the preferred silicon-based surfactant, a polysiloxane type surfactant where an organic group is introduced to the side chain or the terminal, or to the side chain and the terminal may be exemplified. Examples of the side chain group may include an amino group, an epoxy group, a carbinol group, a mercapto group, a carboxyl group, a hydrogen group, a polyether group, an aralkyl group, a fluoroalkyl group, and a phenyl group, and examples of the terminal group may include an amino group, an epoxy group, a carbinol group, a methacrylic group, a polyether group, a mercapto group, a carboxyl group, a phenolic group, a silanol group, and a diol group.

Alternatively, an alkylalkoxysilane compound (hereinafter, referred to as "alkoxysilane compoundα") which has a specific number of carbon atoms is preferably contained along with the surfactant having the polyoxyalkylene structure, or three types of surfactants including the surfactant having the polyoxyalkylene structure, the silicon-based surfactant, and the alkoxysilane compoundα may be used in combination. As for the alkoxysilane compoundα, an alkoxysilane compound having an alkyl group having 4 to 12 carbon atoms (more preferably having 6 to 10 carbon atoms) is preferably employed. When this is represented by a Formula, the compound represented by Formula (5) below is preferred.

$$Si(OR^{51})_{n-4}(R^{52})_n \quad \text{Formula (5)}$$

Here, $R^{51}$ is the same group as $R^4$. $R^{52}$ is preferably an alkyl group having 4 to 12 carbon atoms, and more preferably an alkyl group having 6 to 10 carbon atoms. n is an integer of 1 to 3.

The blended amount of the surfactant which is used together with the surfactant having the polyoxyalkylene structure may be arbitrarily adjusted, but the surfactant to be used together with the surfactant having the polyoxyalkylene structure is used preferably in a range of 0.01 parts by mass to 100 parts by mass, more preferably in a range of 1 parts by mass to 100 parts by mass and further preferably in a range of 10 parts by mass to 100 parts by mass, based on 100 parts by mass of the surfactant having the polyoxyalkylene structure.

(Hollow Particles)

The curable resin composition for forming a low refractive index layer preferably contains hollow particles. As for the hollow particles, porous fine particles may be used in addition to particles with a hollow structure. The hollow particle refers to a particle which has a structure having an inner cavity surrounded by the shell, and the porous particle refers to a porous particle having a plurality of cavities. Hereinafter, hollow particles or porous particles are suitably referred to as "certain particles." The certain particles may be organic or inorganic particles.

The porosity of the certain particles preferably ranges from 10% to 80%, more preferably from 20% to 60%, and most preferably from 30% to 60%. The porosity of the certain particles is preferably set to the above described range for the purpose of reducing a refractive index and maintaining the durability of particles.

Among the certain particles, from the viewpoint of easily reducing the refractive index, hollow particles are more preferred, and hollow silica particles are particularly preferred. For example, when the hollow particles are made of silica, the hollow silica particles have air with a low refractive index (refractive index=1.0), and thus the refractive index becomes significantly lower than conventional silica (refractive index=1.6).

As for the method of producing hollow particles, for example, a method disclosed in Patent Application Laid-Open No. 2001-233611 may be employed. As for the method of producing porous particles, for example, methods disclosed in Patent Application Laid-Open Nos. 2003-327424, 2003-335515, 2003-226516, and 2003-238140 may be employed.

An average primary particle diameter of the certain particles preferably ranges from 1 nm to 200 nm, and more preferably from 10 nm to 100 nm.

The average primary particle diameter of the certain particles may be determined from a photograph which is obtained by observing dispersed particles with a transmission electron microscope. A projected area of particles is obtained and a circle equivalent diameter is obtained from the projected area and set as the average primary particle diameter. In the present specification, the average primary particle diameter is calculated by measuring the projected area for 300 or more particles, and obtaining the circle equivalent diameter.

The refractive index of the certain particles preferably ranges from 1.10 to 1.40, more preferably from 1.15 to 1.35, and most preferably from 1.15 to 1.30.

Here, the refractive index represents a refractive index of the particles as a whole, and does not represent only the refractive index of the shells which form hollow particles in a case where the particles are the hollow particles. In a case where the particles are porous particles, the method of measuring the refractive index of the porous particles is the same as that for the metal oxide particles.

The certain particles are preferably hollow or porous inorganic particles in view of reducing the refractive index. As for the inorganic low refractive index particles, magnesium fluoride or silica particles may be exemplified, and in view of the low refractive index property, dispersion stability, and cost, silica particles are more preferred.

The average primary particle diameter of the inorganic particles preferably ranges from 1 nm to 100 nm, and more preferably from 1 nm to 60 nm.

As long as necessary porosity is satisfied, the crystal system of the inorganic particles may be either crystalline or amorphous, and the inorganic particles may be monodispersed particles or aggregated particles as long as the predetermined particle diameter is satisfied. Regarding the shape, a spherical shape is most preferred, however, the shape may be a rosary shape, a shape where the ratio of a long diameter and a short diameter is 1 or more, or an irregular shape.

The specific surface area of the inorganic particles preferably ranges from 10 $m^2/g$ to 2000 $m^2/g$, more preferably from 20 $m^2/g$ to 1800 $m^2/g$, and most preferably from 50 $m^2/g$ to 1500 $m^2/g$.

For the inorganic particles, a physical surface treatment such as a plasma discharge treatment or a corona discharge treatment, or a chemical surface treatment using a surfactant or a coupling agent may be made in order to achieve the dispersion stability in the curable resin composition, or increase the affinity and bonding property with a binder component. The use of a coupling agent is particularly preferred. As for the coupling agent, an alkoxy metal compound (e.g., a titanium coupling agent, or a silane coupling agent) is preferably used. Among them, a silane coupling treatment is particularly effective.

That is, when the inorganic particles are silica particles, and the coupling agent is a silane compound, an organosilyl group (e.g., monoorganosilyl, diorganosilyl, triorganosilyl groups) is bonded to the surface of the silica particles by a reaction between the silane compound and a silanol group. As for the organic group present on the surface of the surface-treated silica particles, a saturated or unsaturated hydrocarbon group having 1 to 18 carbon atoms, and a halogenated hydrocarbon group having 1 to 18 carbon atoms may be exemplified.

The coupling agent may also be used as a surface treatment agent of inorganic particles in order to previously perform surface treatment prior to preparation of a coating liquid for a low refractive index film, or may be added as a further additive at the time of preparing the coating liquid.

It is preferable that the inorganic particles are previously dispersed in a medium, prior to surface treatment, so as to reduce a load of the surface treatment.

According to a more preferred embodiment, the certain particles are silica particles.

As for the certain particles made of silica, commercially available products may be preferably used.

For example, silica particles such as Sururia series (hollow particles, isopropanol (IPA) dispersion, or 4-methyl-2-pentanone (MIBK) dispersion, e.g., Sururia 2320) and OSCAL series manufactured by JGC Catalysts and Chemicals Co., Ltd., Snowtex series (porous particles, IPA dispersion, ethyleneglycol dispersion, methylethylketone (MEK) dispersion, dimethylacetamide dispersion, MIBK dispersion, propyleneglycolmonomethylacetate dispersion, propyleneglycolmonomethylether dispersion, methanol dispersion, ethyl acetate dispersion, butyl acetate dispersion, xylene-n-butanol dispersion, or toluene dispersion, e.g. MIBK-SD-L, MIBK-ST), manufactured by NISSAN CHEMICAL INDUSTRIES, Co., Ltd., SiliNax (porous particles), manufactured by Nittetsu Mining Co., Ltd., PL series (porous particles, IPA dispersion, toluene dispersion, propyleneglycolmonomethylether dispersion, or methylethylketone dispersion, e.g., PL-1-IPA, PL-2L-PGME) manufactured by Fuso Chemical Co., Ltd., and Aerosil series (porous particles, propyleneglycolacetate dispersion, ethylene glycol dispersion, or MIBK dispersion) manufactured by EVONIK Co., Ltd. may be used.

When the silica particles are added to a photosensitive composition as a dispersion liquid which contains the silica particles and a particle dispersant (the details of the particle dispersant will be described later), the content of the silica particles in the silica dispersion liquid preferably ranges from 10% by mass to 50% by mass, more preferably from 15% by mass to 40% by mass, and further preferably from 15% by mass to 30% by mass.

The certain particles may be used either alone or in combination of two or more thereof.

The content of the certain particles preferably ranges from 5% by mass to 95% by mass, more preferably from 10% by mass to 90% by mass, and further preferably from 20% by mass to 90% by mass based on the total solid content of the curable resin composition for forming a low refractive index layer.

When a film is formed by using the curable resin composition for forming a low refractive index layer, the coating amount of the certain particles preferably ranges from 1 $mg/m^2$ to 100 $mg/m^2$, more preferably from 5 $mg/m^2$ to 80 $mg/m^2$, and further preferably from 10 $mg/m^2$ to 60 $mg/m^2$. When the amount is 1 $mg/m^2$ or more, an effect of reducing the refractive index or an effect of improving the scratch resistance may be reliably obtained, and when the amount is 100 $mg/m^2$ or less, it is possible to suppress the occurrence of fine unevenness on the surface of the cured film and the deterioration of the integral reflectance.

(Fluorine-Based Resin)

The curable resin composition for forming a low refractive index layer may include a fluorine-based resin. A fluorine-based siloxane polymer disclosed in Patent Application Laid-Open No. 2004-21036 may be exemplified.

The fluorine-based resin is a resin containing fluorine in a substance molecule, and specific examples thereof may include polytetrafluoroethylene, polyhexafluoropropylene, a tetrafluoroethylene/hexafluoropropylene copolymer, a tetrafluoroethylene/perfluoroalkylvinylether copolymer, a tetrafluoroethylene/ethylene copolymer, a hexafluoropropylene/propylene copolymer, polyvinylidene fluoride, and a vinylidene fluoride/ethylene copolymer. Among them, polytetrafluoroethylene, a tetrafluoroethylene/perfluoroalkyl vinyl ether copolymer, a tetrafluoroethylene/hexafluoropropylene copolymer, a tetrafluoroethylene/ethylene copolymer, and poly vinylidene fluoride are preferred, and particularly, polytetrafluoroethylene, and a tetrafluoroethylene/ethylene copolymer are preferred. Further, poly tetrafluoroethylene is preferred, and polytetrafluoroethylene-containing mixed powder including polytetrafluoroethylene particles and an organic based polymer is also preferably used. The molecular weight of the fluorine-based resin such as poly tetrafluoroethylene preferably ranges from 100000 to 10000000, and more preferably from 100000 to 1000000, which is particularly effective in extrusion moldability and flame retardancy. As for commercially available products of polytetrafluoroethylene, "Teflon (registered trademark)" 6-J, "Teflon (registered trademark)" 6C-J, and "Teflon (registered trademark)" 62-J manufactured by Mitsui•Dupont Fluoro Chemical Co., Ltd, and "Fluon" such as CD1 and CD076 manufactured by Asahi ICI Fluoropolymers Co., Ltd. are commercially available. As for commercially available polytetrafluoroethylene particles and an organic based polymer, "METABLEN (registered trademark)" is commercially available as A series from Mitsubishi Rayon Co., Ltd. and "METABLEN (registered trademark)" A-3000, and "METABLEN (registered trademark)" A-3800 are commercially available. For example, "Teflon (registered trademark)" 6-J which is polytetrafluoroethylene is easily aggregated. Thus, if mechanically strong mixing is made with any other resin compositions by a Henschel mixer or the like, lumps may be produced due to the aggregation. Therefore, there are problems in handling property or dispersibility depending on mixing conditions. Meanwhile, the polytetrafluoroethylene-containing mixed powder including polytetrafluoroethylene particles and an organic based polymer is excellent in the above described handling property and dispersibility, and thus is particularly preferably used. The polytetrafluoroethylene-containing mixed powder including polytetrafluoroethylene particles and an organic based polymer may be polytetrafluoroethylene-containing mixed powder including polytetrafluoroethylene particles and an organic-based polymer as described in Patent Application Laid-Open No. 2000-226523, but not limited thereto. The above-described organic-based polymer includes an organic-based polymer containing 10% by mass or more of an aromatic vinyl monomer, an acrylate monomer, a vinyl cyanide monomer, or may be a mixture thereof, and the content of polytetrafluoroethylene in the polytetrafluoroethylene-containing mixed-powder preferably ranges from 0.1% by mass to 90% by mass.

Further, as for the fluorine resin, an amorphous fluorine resin, a copolymerization oligomer which contains a perfluoroalkyl group-containing acrylate or methacrylate, a fluorine-based coating agent, a fluorine-based surfactant, a fluorine-based surface treatment agent containing an electron beam or ultraviolet curable component, and a fluorine-based surface treatment agent containing a thermosetting component are preferred. As other copolymerization components of the copolymerization oligomer which contains a perfluoroalkyl group-containing acrylate or methacrylate, alkylacrylate or alkylmethacrylate is preferred.

Hereinafter, specific examples will be described. As for the amorphous fluorine resin, Lumiflon, and CYTOP manufactured by Asahi Glass Co., Ltd. may be exemplified. As for the copolymerization oligomer which mainly contains (meth)acrylate and alkyl(meth)acrylate containing a perfluoroalkyl group, MODIPER-F series manufactured by NOF Corporation, UNIDYNE manufactured by Daikin Industries Co., Ltd., and Megafac F470 series, F480 series, F110 series manufactured by Dainippon Ink & Chemicals, Inc. may be exemplified. For copolymerization, block copolymerization is more preferred. As for the fluorine-based coating agent, EGC1700 manufactured by Sumitomo 3M Co., Ltd. may be exemplified. As for the fluorine-based surfactant, Megafac F114, F410 series, 440 series, 450, 490 series manufactured by Dainippon Ink & Chemicals, Inc. may be exemplified. As for the fluorine-based surface treatment agent containing an electron beam or ultraviolet curable component, PolyFox PF-3320 manufactured by OMNOVA Solutions Co., Ltd., CHEMINOX FAMAC-8 manufactured by Unimatec Inc, and EGC1720 manufactured by Sumitomo 3M Co., Ltd may be exemplified. As for the fluorine-based surface treatment agent containing a thermosetting component, EGC1720 manufactured by Sumitomo 3M Co., Ltd, and NH-10, NH-15 manufactured by Dainippon Ink & Chemicals, Inc. may be exemplified.

As for the amorphous fluorine resin, a resin having the structural formula below may be exemplified.

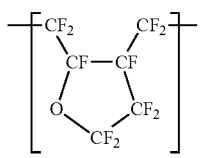

A fluorine resin may be a mixture of a plurality of kinds of fluorine-containing compounds.

The addition amount of the fluorine-based resin is not particularly limited, but is preferably in the same range as the content of the siloxane resin in the same view as that for the siloxane resin.

(Polymerization Initiator)

The curable resin composition for forming a low refractive index layer may further contain a polymerization initiator.

Specific and preferred examples of the polymerization initiator may be the same as the above described specific and preferred examples of the polymerization initiator for the item of the curable resin composition for forming a high refractive index layer.

When the curable resin composition for forming a low refractive index layer contains the polymerization initiator, the content of the polymerization initiator contained in the curable resin composition for forming a low refractive index layer (the total content in a case where there are two or more types) preferably ranges from 0.1% by mass to 10% by mass, more preferably from 0.3% by mass to 8% by mass, and more preferably from 0.5% by mass to 5% by mass based on the total solid content of the curable composition.

(Curing Agent)

The curable resin composition for forming a low refractive index layer may further contain a curing agent. As for the curing agent, a curing agent made of Al, Mg, Mn, Ti, Cu, Co, Zn, Hf and Zr is preferred, and these may be used in combination.

These curing agents may be easily obtained by reacting a chelating agent with a metal alkoxyde. Examples of the chelating agent to be used may include β-diketone such as acetylacetone, benzoylacetone, dibenzoyl methane; and β-keto acid esters such as ethyl acetoacetate, benzoyl ethyl acetate.

Preferred specific examples of the metallic chelate compound may include: aluminium chelate compounds such as ethylacetoacetatealuminium diisopropylate, aluminum tris (ethyl acetoacetate), alkyl acetoacetate aluminiumdiisopropylate, aluminiummono acetylacetatebis(ethyl acetoacetate), aluminiumtris(acetyl acetonate); magnesium chelate compounds such as ethylacetoacetate magnesium monoisopropylate, magnesium bis (ethylaceto acetate), alkylacetoacetatemagnesiummonoisopropylate, magnesiumbis (acetylacetonate); and zirconium tetraacetyl acetoacetate, zirconium tributoxy acetylacetoacetate, zirconiumacetyl acetoacetatebis(ethyl acetoacetate), manganese acetylacetoacetate, cobalt acetyl acetoacetate, copperacetylacetoacetate, titanium acetylacetoacetate, and titanium oxy acetylacetoacetate. Among these, aluminiumtris (acetylacetoacetate), aluminiumtris (ethyl acetoacetate), magnesiumbis (acetylacetoacetate), magnesiumbis (ethyl acetoacetate), and zirconiumtetra acetylacetoacetate are preferred, and in view of the storage stability and easy availability, aluminiumtris (acetylacetoacetate), and aluminiumtris (ethyl acetoacetate) are particularly preferred.

The total content of the curing agent preferably ranges from 0.001 parts by mass to 10 parts by mass, more preferably from 0.01 parts by mass to 5 parts by mass, and particularly preferably from 0.01 parts by mass to 0.5 parts by mass based on the total content of 100 parts by mass of the siloxane resin.

(Solvent)

The curable resin composition for forming a low refractive index layer may be generally constituted by an organic solvent. The organic solvent is basically not particularly limited as long as the solubility of each of components or the coatability of the resin composition for forming the light-transmitting cured film is satisfied. Particularly, it is preferable to select the organic solvent by taking the solubility of the binder, the coatability, and the safety into consideration. In addition, two types of organic solvents may be included when preparing the curable resin composition for forming a low refractive index layer.

Preferred examples of the organic solvent may include: esters such as ethyl acetate, n-butyl acetate, isobutyl acetate, amyl formate, isoamyl acetate, isobutyl acetate, butyl propionate, isopropyl butyrate, ethyl butyrate, butyl butyrate, methyl lactate, ethyl lactate, alkyl oxyacetate (e.g., methyl oxyacetate, ethyl oxyacetate, butyl oxyacetate (e.g., methyl methoxyacetate, ethyl methoxyacetate, butyl methoxyacetate, methyl ethoxyacetate, ethyl ethoxyacetate)), 3-oxypropionic acid alkyl esters (e.g., methyl 3-oxypropionate, ethyl 3-oxypropionate (e.g., methyl 3-methoxypropionate, ethyl 3-methoxypropionate, methyl 3-ethoxypropionate, ethyl 3-ethoxypropionate)), 2-oxypropionic acid alkyl esters (e.g., methyl 2-oxypropionate, ethyl 2-oxypropionate, propyl 2-oxypropionate (e.g., methyl 2-methoxypropionate, ethyl 2-methoxypropionate, propyl 2-methoxypropionate, methyl 2-ethoxypropionate, ethyl 2-ethoxypropionate)), methyl 2-oxy-2-methylpropionate, ethyl 2-oxy-2-methylpropionate (e.g., methyl 2-methoxy-2-methylpropionate, ethyl 2-ethoxy-2-methylpropionate), methyl pyruvate, ethyl pyruvate, propyl pyruvate, methyl acetoacetate, ethyl acetoacetate, methyl 2-oxobutanoate, and ethyl 2-oxobutanoate; ethers such as diethylene glycol dimethyl ether, dipropyleneglycol dimethylether, tetrahydrofuran, ethyleneglycol monomethylether, ethyleneglycol monoethylether, methyl cellosolve acetate, ethyl cellosolve acetate, diethyleneglycol monomethylether, diethylenegly colmonoethylether, diethyleneglycol monobutylether, propyleneglycol monomethylether, propyleneglycolmono n-butylether, propyleneglycolmono tert-butylether, propyleneglycol monomethyletheracetate, propyleneglycol monoethylether acetate, propyleneglycol monopropyletheracetate; ketones such as methylethylketone, cyclohexanone, 2-heptanone, 3-heptanone; and aromatic hydrocarbons such as toluene, xylene.

Particularly preferred examples thereof may include 3-ethoxy propionate methyl, 3-ethoxy propionate ethyl, ethyl cellosolve acetate, ethyl lactate, diethyleneglycoldimethylether, butyl acetate, 3-methoxy propionate methyl, 2-heptanone, cyclohexanone, ethyl carbitol acetate, butyl carbitol acetate, propyleneglycolmethylether, dipropyleneglycoldimethyl ether, propyleneglycolmono n-butylether, propyleneglycolmono tert-butylether, and propyleneglycol methyletheracetate.

In the curable resin composition for forming a low refractive index layer, an applicable solvent is contained preferably in a range of 50% by mass to 99.9% by mass, and more preferably in a range of 60% by mass to 95% by mass based on the total amount of the curable resin composition for forming a low refractive index layer. When the amount of the corresponding compound is equal to or greater than the lower limit, the coatability is good, which is preferable, and when the amount is equal to or lower than the upper limit, the coatability is good in the same manner, which is preferable.

(Viscosity)

It is preferable that the viscosity of the curable resin composition for forming a high refractive index layer or a low refractive index layer is adjusted in view of forming a good high refractive index layer or low refractive index layer. A specific range of the viscosity is not particularly limited, but preferably ranges from 1 cP to 20 cP, more preferably from 2 cP to 15 cP, and particularly preferably from 4 cP to 6 cP. In the present specification, it is assumed that the value of the viscosity, unless specifically stated, is obtained by the measurement method to be described later.

Measuring Method

Measurement is carried out at room temperature (about 25° C.) using an E-type viscometer "TV-20 type viscometer•cone-plate type TVE-20 L" (manufactured by TOKI SANGYO Co., Ltd.). The sampling is based on the average of the values obtained by measuring a viscosity five times every 100 seconds.

The solid concentration of the curable resin composition for forming a high refractive index layer or a low refractive index layer, in view of forming the high refractive index layer or the low refractive index layer, preferably ranges from 10% by mass to 90% by mass, more preferably from 20% by mass to 90% by mass, and most preferably from 30% by mass to 80% by mass.

Here, the composition in the present invention refers to two or more components which substantially uniformly exist in a specific composition. Here, "substantially uniformity" means that each of the components may be unevenly distributed in a range where the effect of the invention is achieved. In addition, a composition also has the meaning that the form of the composition is not particularly limited as long as the definition described above is satisfied, that the composition is not limited to a liquid or paste with fluidity, and that solids, powders, and the like formed of a plurality of components are included. Furthermore, the composition also has a meaning that the composition includes a dispersion state preserved for a predetermined time by stirring due to sedimentation.

The curable resin composition for forming a high refractive index layer or a low refractive index layer of the present invention may be used for an infrared ray cutoff filter at a light receiving side of a substrate in a solid-state imaging device (e.g., an infrared ray cutoff filter for a wafer level lens), or an infrared ray cutoff filter at a rear surface side (opposite to the light receiving side) of a substrate in a solid-state imaging device, and preferably is for a light shielding film at a light receiving side of a substrate in a solid-state imaging device.

The high refractive index layer or the low refractive index layer may be formed by a method of directly applying a curable resin composition for forming a high refractive index layer or a low refractive index layer on a support, and drying the composition.

The support may be a substrate in a solid-state imaging device, an additional substrate provided at a light receiving side of the substrate (e.g., a glass substrate 30 to be described later), or only a layer (such as a planarization layer) provided at a light receiving side of the substrate in the solid-state imaging device.

The coating of the curable resin composition for forming a high refractive index layer or a low refractive index layer on a support may be performed using, for example, an applicator, a spin coater, a slit spin coater, a slit coater, or screen printing, and coating using the spin coater is preferred.

The conditions for drying the coated film are varied according to the respective components, the kinds of solvents, and the usage ratios, but generally include a temperature of 60° C. to 150° C. and a time of 30 sec to 15 min.

The method of forming an infrared ray cutoff filter using a curable resin composition for forming a high refractive index layer or a low refractive index layer of the present invention may include other processes.

Other processes are not particularly limited but may be properly selected according to purposes, and for example, a substrate surface treatment process, a pre-heating process (pre-baking process), a curing treatment process, and a post-heating process (post-baking process) may be exemplified.

<Pre-Heating Process Post-Heating Process>

The heating temperature in the pre-heating process and the post-heating process generally ranges from 80° C. to 200° C., and preferably from 90° C. to 150° C.

The heating time in the pre-heating process and the post-heating process generally ranges from 30 sec to 240 sec and preferably from 60 sec to 180 sec.

<Curing Treatment Process>

The curing treatment process is a process of performing a curing treatment on the formed film, as necessary, and by performing this treatment, a mechanical strength of the infrared ray cutoff filter is improved.

The curing treatment process is not particularly limited, but may be suitably selected according to purposes, and an entire surface exposure treatment and an entire surface heating treatment may be properly exemplified. Here, "exposure" used in the present invention means not only various wavelengths of light, but also radiation irradiation such as electron beams and X-rays.

The exposure is preferably performed by radiation irradiation, and as for the radiation used for the exposure, especially, UV or visible light such as electron beams, KrF, ArF, g-line, h-line, i-line is preferably used. Preferably, KrF, g-line, h-line, i-line are preferred.

As for the exposure method, a stepper exposure, or an exposure using a high-pressure mercury lamp may be exemplified.

The exposure amount preferably ranges from 5 mJ/cm$^2$ to 3000 mJ/cm$^2$, more preferably from 10 mJ/cm$^2$ to 2000 mJ/cm$^2$, and most preferably from 50 mJ/cm$^2$ to 1000 mJ/cm$^2$.

As for the method of the entire surface exposure treatment, for example, a method of exposing the entire surface of the formed film may be exemplified. When the curable resin composition for forming a high refractive index layer or a low refractive index layer contains a polymerizable compound, the curing of a polymerization component in the film formed by the composition is facilitated by the entire surface exposure, and thus the curing of the film is further progressed, thereby improving the mechanical strength and durability.

A device for the entire surface exposure is not particularly limited, but may be properly selected according to purposes, and for example, an UV exposure machine such as an ultra-high pressure mercury lamp may be preferably exemplified.

As for the method for the entire surface heating treatment, a method of heating the entire surface of the formed film may be exemplified. By the entire surface heating, a film strength of a pattern is increased.

In the entire surface heating, the heating temperature preferably ranges from 120° C. to 250° C., and more preferably from 120° C. to 250° C. When the heating temperature is 120° C. or more, the film strength is improved by the heating treatment, and when the heating temperature is 250° C. or less, it is possible to suppress a film quality from becoming weak and brittle by decomposition of components of the film.

The heating time in the entire surface heating preferably ranges from 3 min to 180 min, and more preferably from 5 min to 120 min.

A device for the entire surface heating is not particularly limited, but may be properly selected according to purposes from conventionally known devices. Examples thereof may include a dry oven, a hot plate, and an IR heater.

The low refractive index layer obtained by the heating treatment is mainly composed of organic silicon oxide (SiOC). Accordingly, as necessary, in a case of, for example, a fine pattern, a support or a low refractive index layer may be highly accurately etched, and it may be suitably dealt with in a manufacturing process of a fine solid-state imaging device.

The present invention is also related to an infrared ray cutoff filter which is obtained by the above described curable resin composition for forming a high refractive index layer or a low refractive index layer of the present invention.

The infrared ray cutoff filter of the present invention includes, as illustrated in FIG. 1, two or more high refractive index layers 2 with a refractive index ranging from 1.65 to 2.00, and two or more low refractive index layers 3 with a refractive index ranging from 1.20 to 1.45, in which at least one layer of the respective layers contains a dye having a maximum absorption wavelength in a range of 600 nm to 820 nm.

In the infrared ray cutoff filter of the present invention, a layer containing a dye having a maximum absorption wavelength in a range of 600 nm to 820 nm may be a high refractive index layer with a refractive index ranging from 1.65 to 2.00, which is formed by the curable resin composition for forming the high refractive index layer, or a low refractive index layer with a refractive index ranging from 1.20 to 1.45, which is formed by the curable resin composition for forming the low refractive index layer.

In the infrared ray cutoff filter of the present invention, the high refractive index layer and the low refractive index layer are preferably alternately laminated.

In the infrared ray cutoff filter of the present invention, the film thickness of each of the two or more high refractive index layers and the two or more low refractive index layers preferably ranges from 50 nm to 250 nm, and more preferably from 80 nm to 180 nm.

In the infrared ray cutoff filter of the present invention, the two or more high refractive index layers are preferably a plurality of kinds of layers which have different refractive indexes within a range of 1.65 to 2.00, in view of reducing unwanted vibration (ripple) in spectral characteristics.

The two or more high refractive index layers are preferably a plurality of kinds of layers which have different film thicknesses within a range of 50 nm to 250 nm, in view of reducing ripple.

In the infrared ray cutoff filter of the present invention, the two or more low refractive index layers are preferably a plurality of kinds of layers which have different refractive indexes within a range of 1.20 to 1.45, in view of reducing ripple.

The two or more low refractive index layers are preferably a plurality of kinds of layers which have different film thicknesses within a range of 50 nm to 250 nm, in view of reducing ripple.

In the infrared ray cutoff filter of the present invention, the number of laminations of the two or more high refractive index layers and the two or more low refractive index layers preferably ranges from 4 to 60, more preferably from 8 to 50, and further preferably from 10 to 40.

In the infrared ray cutoff filter of the present invention, the total film thickness of laminations of the two or more high refractive index layers and the two or more low refractive index layers is preferably 10 μm or less, more preferably 8 μm or less, and further preferably 6 μm or less.

The infrared ray cutoff filter of the present invention is formed of the curable resin composition for forming a high refractive index layer or a low refractive index layer of the present invention, and thus is excellent in a near infrared ray shielding property and an infrared ray shielding property.

The infrared ray cutoff filter of the present invention may be an optical article which is independently produced (e.g., on a glass substrate) and used to be incorporated into any of elements, but may be an infrared ray cutoff filter formed on a substrate in a solid-state imaging device.

The present invention also relates to a solid-state imaging device which has an infrared ray cutoff filter of the present invention on a substrate.

The substrate in the solid-state imaging device of the present invention preferably has a color filter layer, and more preferably a color filter layer, a microlens and a planarization layer.

Hereinafter, descriptions will be made on a camera module as one preferred exemplary embodiment of a solid-state imaging device of the present invention.

The camera module according to one preferred exemplary embodiment of a solid-state imaging device of the present invention is a camera module which has a substrate, and an infrared ray cutoff filter of the present invention which is disposed at the light receiving side of the substrate.

Hereinafter, the camera module according to one preferred exemplary embodiment of a solid-state imaging device of the present invention will be described with reference to FIGS. 2 and 3, but the present invention is not limited to the following specific examples.

Figure 2:
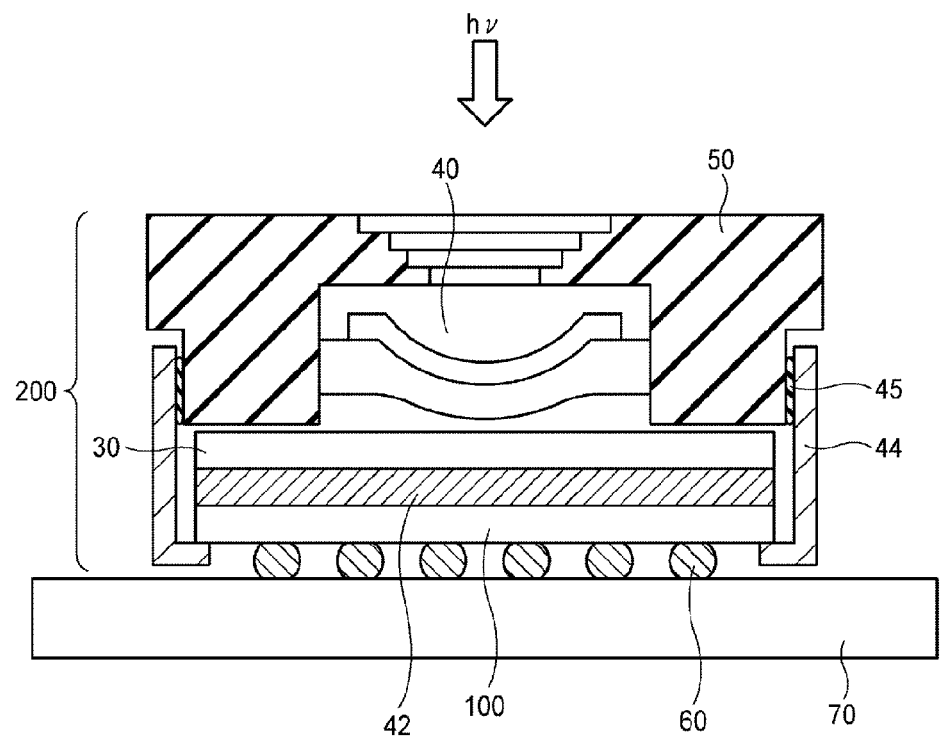
FIG. 2 is a schematic cross-sectional view illustrating a configuration of a camera module according to one preferred exemplary embodiment of a solid-state imaging device of the present invention.
Figure 3:
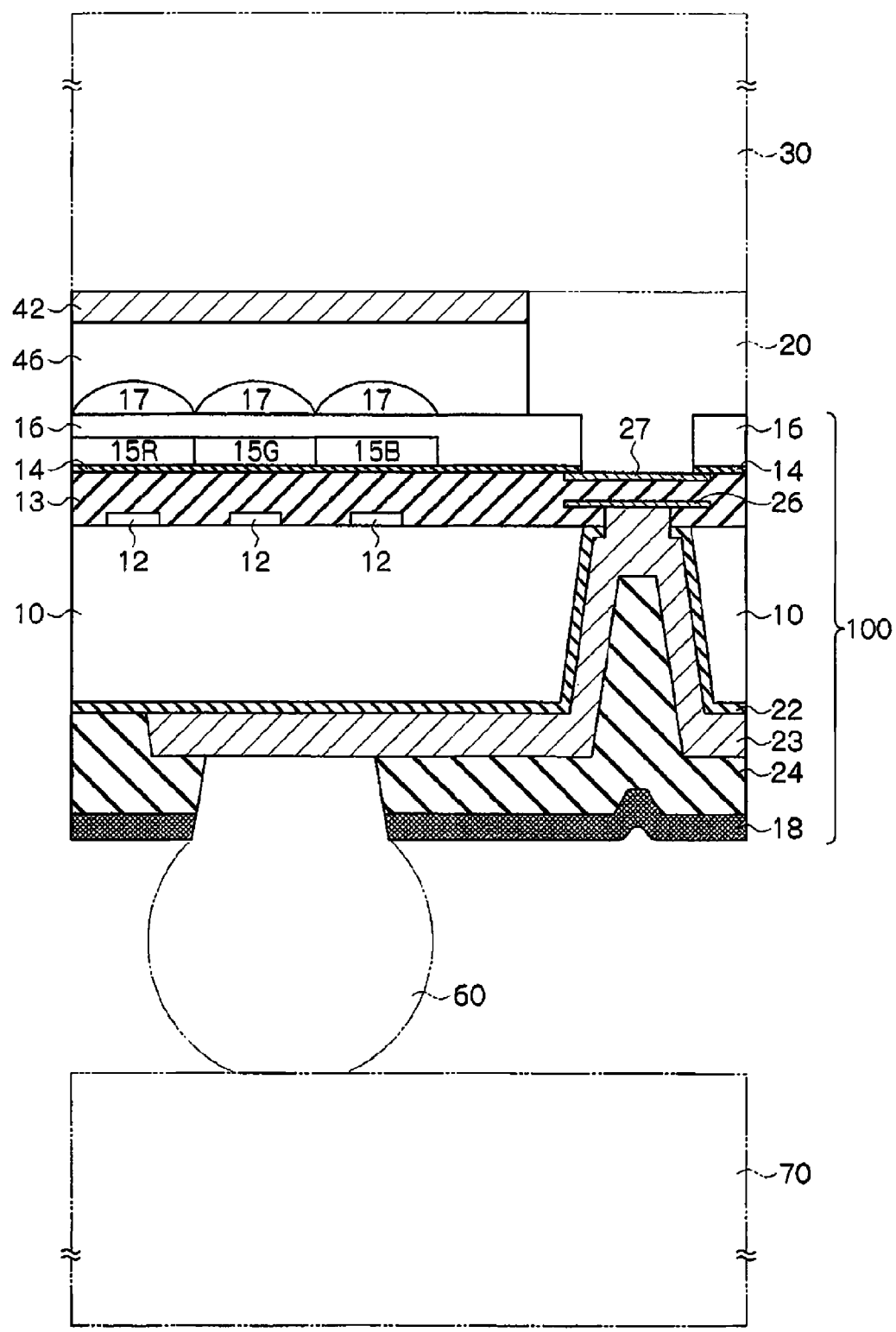
FIG. 3 is a schematic cross-sectional view illustrating a substrate in a solid-state imaging device of the present invention.

Common elements in FIGS. 2 and 3 are denoted by the same reference numerals.

In the explanation, "above", "upward" and "upper side" refer to far sides when viewed from a silicon substrate 10, and "below", "downward" and "lower side" refer to sides closer to the silicon substrate 10.

FIG. 2 is a schematic cross-sectional view illustrating a configuration of a camera module including a solid-state imaging device according to one preferred exemplary embodiment of a solid-state imaging device of the present invention.

A camera module 200 illustrated in FIG. 2 is connected to a circuit board 70 which is a mounting board through solder balls 60 as connecting members.

Specifically, the camera module 200 includes a substrate 100 having an imaging element unit on a first main surface of a silicon substrate, a planarization layer 46 (not illustrated in FIG. 2) provided at the first main surface side (the light receiving side) of the substrate 100, an infrared ray cutoff filter 42 provided on the planarization layer 46, a glass substrate 30 (a light transmissive substrate) disposed at the top side of the infrared ray cutoff filter 42, a lens holder 50 disposed at the top side of the glass substrate 30 and having an imaging lens 40 in the inner space, and a light-shielding and electromagnetic shield 44 disposed to surround the periphery of the substrate 100 and the glass substrate 30. Each member is bonded by adhesives 20 (not illustrated in FIG. 2) and 45.

In the camera module 200, an incident light hv from the outside sequentially passes through the imaging lens 40, the glass substrate 30, the infrared ray cutoff filter 42, and the planarization layer 46 to reach the imaging element unit of the substrate 100.

The camera module 200 is connected to the circuit board 70 through the solder balls 60 (connecting materials) at a second main surface side of the substrate 100.

FIG. 3 is a cross-sectional view illustrating a substrate 100 in FIG. 2 in an enlarged scale.

The substrate 100 includes the silicon substrate 10 as a base, an imaging device 12, an interlayer insulating film 13, a base layer 14, a red color filter 15R, a green color filter 15G, a blue color filter 15B, an overcoat 16, a microlens 17, a light shielding film 18, an insulating film 22, a metal electrode 23, a solder resist layer 24, an internal electrode 26, and an element surface electrode 27.

However, the solder resist layer 24 may be omitted.

First, descriptions will be mainly made on the configuration of the first main surface side of the substrate 100.

As illustrated in FIG. 3, at the first main surface side of the silicon substrate 10 which is a base of the substrate 100, an imaging element unit is provided in which a plurality of imaging devices 12 such as CCD or CMOS are arranged two-dimensionally.

In the imaging element unit, the interlayer insulating film 13 is formed on the imaging devices 12, and the base layer 14 is formed on the interlayer insulating film 13. On the base layer 14, the red color filter 15R, the green color filter 15G, and the blue color filter 15B (hereinafter, these may be collectively referred to as a "color filter 15") are disposed, respectively, to correspond to the imaging devices 12. In the boundary portions between the red color filter 15R, the green color filter 15G, and the blue color filter 15B, and the periphery of the imaging element unit, a light shielding film (not illustrated) may be provided. The light shielding film may be manufactured by using, for example, a conventionally known black color resist.

The overcoat 16 is formed on the color filter 15 and the microlenses 17 are formed on the overcoat 16 to correspond to the imaging devices 12 (the color filter 15).

Then, the planarization layer 46 is provided on the microlenses 17.

A peripheral circuit (not illustrated) and the internal electrode 26 are provided around the imaging element unit at the first main surface side, and the internal electrode 26 is electrically connected to the imaging devices 12 via the peripheral circuit.

Further, on the internal electrode 26, the element surface electrode 27 is formed through the interlayer insulating film 13. Within the interlayer insulating film 13 between the internal electrode 26 and the element surface electrode 27, a contact plug (not illustrated) for electrically connecting these electrodes to each other is formed. The element surface electrode 27 is used to apply a voltage and to read out a signal through the contact plug and the internal electrode 26.

The base layer 14 is formed on the element surface electrode 27. The overcoat 16 is formed on the base layer 14. The base layer 14 and the overcoat 16 formed on the element surface electrode 27 are opened to form a pad opening so that a part of the element surface electrode 27 is exposed.

The configuration of the first main surface side of the substrate 100 has been described above, but the infrared ray cutoff filter 42 may be provided between the base layer 14 and the color filter 15 or between the color filter 15 and the overcoat 16 rather than on the planarization layer 46.

At the first main surface side of the substrate 100, the adhesive 20 is provided at the periphery of the imaging element unit, and the substrate 100 and the glass substrate 30 are bonded to each other through the adhesive 20.

The silicon substrate 10 has a through hole which penetrates the silicon substrate 10, and a through electrode is provided as a part of the metal electrode 23 in the through hole. By the through electrode, the imaging element unit and the circuit board 70 are electrically connected to each other.

Hereinafter, descriptions will be mainly made on the configuration of the second main surface side of the substrate 100.

At the second main surface side, the insulating film 22 is formed over the inner wall of the through hole on the second main surface.

On the insulating film 22, the metal electrode 23 which is patterned from the second main surface side region of the silicon substrate 10 to extend into the through hole is provided. The metal electrode 23 is an electrode for connecting the imaging element unit in the substrate 100 to the circuit board 70.

The through electrode is a portion of the metal electrode 23 formed within the through hole. The through electrode penetrates a part of the silicon substrate 10 and the interlayer insulating film to reach the bottom side of the internal electrode 26, and to be electrically connected to the internal electrode 26.

Further, at the second main surface, the solder resist layer 24 (protective insulating film) configured to cover the second main surface formed with the metal electrode 23 and having an opening for exposing a part of the metal electrode 23 is provided.

Further, at the second main surface, the light shielding film 18 configured to cover the second main surface formed with the solder resist layer 24, and having an opening for exposing a part of the metal electrode 23 is provided.

In FIG. 3, the light shielding film 18 is patterned to cover a part of the metal electrode 23, and expose the remaining portion, but may be patterned to expose the metal electrode 23 in its entirety (this also applies to the patterning of the solder resist layer 24).

The solder resist layer 24 may be omitted, and the light shielding film 18 may be directly formed on the second main surface formed with the metal electrode 23.

The solder balls 60 as connecting members are provided on the exposed metal electrode 23, and the metal electrode 23 of the substrate 100 is electrically connected to a connection electrode (not illustrated) of the circuit board 70 through the solder balls 60.

The configuration of the substrate 100 has been described above, but conventionally known methods disclosed in paragraphs 0033 to 0068 of Patent Application Laid-Open No. 2009-158863, or paragraphs 0036 to 0065 of Patent Application Laid-Open No. 2009-99591 may be used for the formation.

The interlayer insulating film 13 is formed as a $SiO_2$ film or a SiN film by, for example, sputtering or chemical vapor deposition (CVD).

The color filter 15 is formed by photolithography using, for example, a conventionally known color resist.

The overcoat 16 and the base layer 14 are formed by photolithography using, for example, a conventionally known resist for forming an organic interlayer film.

The microlens 17 is formed by photolithography using, for example, a styrene-based resin.

The solder resist layer 24 is preferably formed by photolithography using, for example, a conventionally known solder resist such as a phenolic resin, a polyimide-based resin, or an amine-based resin.

The solder balls 60 are formed by using, for example, Sn—Pb (eutectic), 95 Pb—Sn (high lead/high melting point soldering), and Pb-free soldering such as Sn—Ag, Sn—Cu, or Sn—Ag—Cu. The solder balls 60 are formed in, for example, a spherical shape with a diameter of 100 μm to 1000 μm (preferably, a diameter of 150 μm to 700 μm).

The internal electrode 26 and the element surface electrode 27 are formed as metal electrodes of Cu through, for example, chemical mechanical polishing (CMP), or photolithography and etching.

The metal electrode 23 is formed as a metal electrode of Cu, Au, Al, Ni, W, Pt, Mo, Cu compound, W compound, or Mo compound through, for example, sputtering, photolithography, etching, and electroplating. The metal electrode 23 may have a single-layer configuration or a laminated configuration having two or more layers. The film thickness of the metal electrode 23 ranges from, for example, 0.1 μm to 20 μm (preferably from 0.1 μm to 10 μm). The silicon substrate 10 is not particularly limited, but a thin silicon substrate whose rear surface is ground may be used. The thickness of the substrate is not limited, but for example, a silicon wafer with a thickness of 20 μm to 200 μm (preferably 30 μm to 150 μm) may be used.

The through hole of the silicon substrate 10 is formed by, for example, photolithography and reactive ion etching (RIE).

The camera module according to one preferred exemplary embodiment of a solid-state imaging device of the present invention has been described with reference to FIGS. 2 and 3, but the exemplary embodiment is not limited to that in FIGS. 2 and 3.

EXAMPLES

Hereinafter, the present invention will be described in more detail with reference to examples below, but is not to be construed as being limited to these examples. In these examples, "parts" and "%," unless otherwise specified, are based on mass.

<Curable Resin Composition for Forming High Refractive Index Layer>

[Preparation of Titanium Dioxide Dispersion Liquid (Dispersion Composition)]

For the mixed liquid with the following composition, a dispersion processing was performed by using NPM manufactured by Shinmaru Enterprises Co., Ltd. as a circulation-type dispersing device (bead mill) in the following manner to obtain a titanium dioxide dispersion liquid as a dispersion composition.

—Composition— titanium dioxide (TTO-51(C) manufactured by Ishihara Sangyo Kaisha, Ltd.): 150.0 parts
(crystal form: rutile, TiO2 purity (%): 79% to 85%, surface-treated with $Al_2O_3$ and stearic acid, specific surface area 50 m$^2$/g to 60 m$^2$/g, primary particle diameter 10 nm to 30 nm, oil absorption 24 g/100 g to 30 g/100 g)
following dispersion resin A-1 (solid content 20% PGMEA solution): 165.0 parts propyleneglycol monomethylether acetate (PGMEA): 142.5 parts

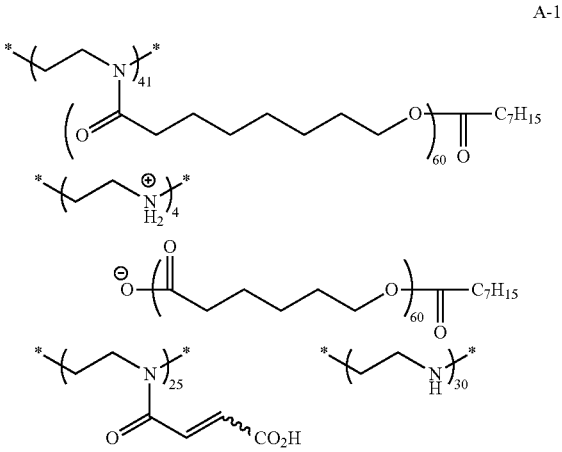

A-1

In A-1, the weight average molecular weight (Mw) is 9000, and the copolymerization ratio (molar ratio) is the same as described above.

The dispersing device was operated under the following conditions.
bead diameter: ϕ 0.05 mm
bead filling rate: 60% by volume
peripheral speed: 10 m/sec
pump supply amount: 30 kg/time
cooling water: tap water
bead mill annular passage volume: 1.0 L
amount of mixed liquid to be used for dispersion processing: 10 kg After dispersion is initiated, the average particle diameter was measured at 30-min intervals (time of one pass).

The average particle diameter was decreased with dispersion time (number of passes), but the change amount was gradually decreased. The dispersion was terminated at a point of time the change of the average particle diameter was 5 nm or less when the dispersion time was prolonged for 30 min. The average particle diameter of titanium dioxide particles in the dispersion liquid was 40 nm.

The average particle diameter of titanium dioxide or the like in the present example refers to a value obtained by measuring a dilution solution through a dynamic light scattering method, in which the dilution solution was obtained by diluting a mixed liquid or a dispersion liquid including the titanium dioxide 80 times with propyleneglycol monomethyletheracetate.

This measurement was performed using a micro track UPA-EX150 manufactured by Nikkiso Co., Ltd.

[Preparation of Curable Resin Composition 1 for Forming High Refractive Index Layer]

titanium dioxide dispersion liquid prepared as described above (dispersion composition) . . . 80.0 parts
solvent: PGMEA . . . 15 parts
polymerizable compound: KAYARAD DPHA (manufactured by Nippon Kayaku Co., Ltd.) . . . 3.6 parts
Polymerization initiator: OXE-01 (trademark) manufactured by BASF Co., Ltd. . . . 0.10 parts
polymer A: benzyl methacrylate/methacrylic acid copolymer (copolymerization ratio: 80/20(% by mass), weight average molecular weight: 12,000) (manufactured by FFFC Co., Ltd.) . . . 1.0 parts
surfactant: MEGAFAC F-781 (manufactured by DIC Co., Ltd.) . . . 0.30 parts To the curable resin composition 1 for forming a high refractive index layer, phthalocyanine dye A (Excolor TX-EX 720 manufactured by Nippon Shokubai; maximum absorption wavelength $(\lambda_{max})$=720 nm (film)) was added to have a solid content of 5% by mass.

[Formation of High Refractive Index Layer]

The curable resin composition 1 for forming a high refractive index layer was coated on a silicon wafer, and pre-baking (100° C., 2 min), and post-baking (230° C., 10 min) were performed to form a high refractive index layer 1.

(Measurement of Refractive Index)

The refractive index of the high refractive index layer was measured using an ellipsometer manufactured by J. A. WOOLLAM JAPAN CO., INC. Under the measurement conditions of 633 nm and 25° C., an average of 5 points was employed. The results are noted in the following table.

By changing the component ratio of the curable composition, and the dye to be used according to the following composition ratios, various curable resin compositions for forming a high refractive index layer were prepared in the same process as the curable resin composition 1 for forming a high refractive index layer. The refractive index measurement results of the respective high refractive index layers are also additionally noted.

In the formulas above, n is 14, the weight average molecular weight of dispersant (A-2) in terms of polystyrene is 6400, the acid value is 80 mgKOH/g.

(Polymerizable Compound)

1031S . . . JER1031 S (manufactured by Japan Epoxy Resin Co., Ltd.)

157S65 . . . JER157S65 (manufactured by Japan Epoxy Resin Co., Ltd.)

(Binder)

Polymer B . . . Acrylic Base (graft copolymer of benzyl methacrylate/i-butyl methacrylate/2-hydroxyethyl methacrylate/methacrylic acid copolymer and methoxy polyethylene glycol, manufactured by Fujikura Kasei Co., Ltd.)

<Curable Resin Composition for Forming Low Refractive Index Layer>

[Preparation of Siloxane]

A hydrolysis•condensation reaction was performed using methyltriethoxysilane (MTES) and/or tetraethoxysilane (TEOS) to obtain hydrolytic condensates S-1, S-2 and S-c1. A solvent used herein was ethanol. The obtained hydrolytic condensate S-1 had a weight average molecular weight of about 10000.

TABLE 33

| Composition for forming high refractive index layer | Titanium dioxide*[1] | Dye | Dispersant | Polymerizable compound*[1] | Polymerization initiator*[1] | Binder*[1] | Surfactant*[1] | Solvent*[1] | Refractive index |
|---|---|---|---|---|---|---|---|---|---|
| 1 | 80 | Phthalocyanine dye A | A-1 | DPHA 3.6 | OXE-01 0.10 | Polymer-A 1.00 | 0.3 | 15 | 1.91 |
| 2 | 67 | Cyanine dye | A-1 | DPHA 6.3 | OXE-01 0.15 | Polymer-A 1.25 | 0.3 | 25 | 1.85 |
| 3 | 86.5 | None | A-1 | DPHA 2.23 | OXE-01 0.07 | Polymer-A 0.1 | 0.3 | 10.8 | 1.95 |
| 4 | 72 | Phthalocyanine dye A | A-2 | 1031S 10.78 | None | Polymer-B 1.28 | 0.11 | 15.83 | 1.90 |

*[1]% by mass based on total mass of composition

<Meaning of Abbreviation>

(Dye)

cyanine dye . . . Daito chmix1371F manufactured by Daito Chemix Corp.; maximum absorption wavelength $(\lambda_{max})$=805 nm (film)

(Dispersant)

A-2 . . . dispersant represented by formula below.

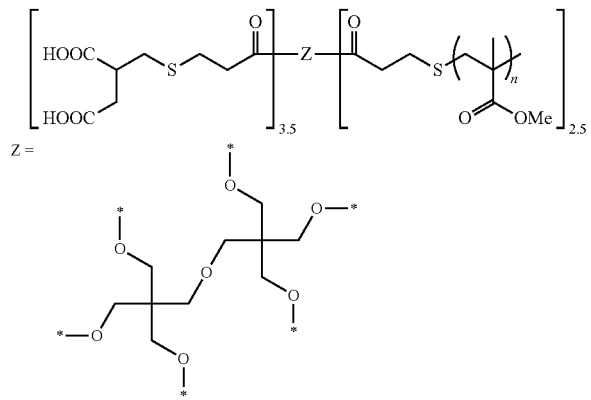

TABLE 34

| | MTES* | TEOS* | Weight average molecular weight |
|---|---|---|---|
| S-1 | 100 | 0 | 10,000 |
| S-2 | 10 | 90 | 12,000 |
| S-c1 | 0 | 100 | 11,000 |

*% by mass

[Preparation of Curable Resin Composition for Forming Low Refractive Index Layer]

By blending the following components, a curable resin composition 1 for forming a low refractive index layer was prepared.

Siloxane: hydrolytic condensate S-1 as described above . . . 20 parts

Solvent: propyleneglycolmonomethyletheracetate (PGMEA) . . . 62 parts

Solvent: 3-ethoxy ethyl propionate (EEP) . . . 16 parts

Surfactant: EMULSOGEN-COL-020 (manufactured by CLARIANT JAPAN CO., LTD) . . . 2 parts To the curable resin composition 1 for forming a low refractive index layer, phthalocyanine dye A (Excolor TX-EX 720 manufactured by Nippon Shokubai; maximum absorption wavelength $(\lambda_{max})$=720 nm (film)) was added to have a solid content of 5% by mass.

By blending the components in the following table, curable resin compositions 2 to 5 for forming a low refractive index layer were prepared.

By blending the following components, a curable resin composition 6 for forming a low refractive index layer was prepared.

Hollow particles: Sururia 2320 (manufactured by JGC Catalysts and Chemicals Co., Ltd.) . . . 80 parts
Curable resin: Cyclomer PACA230AA (abbreviation: 230 AA) (manufactured by Daicel Chemical Industries, Ltd.) . . . 8 parts
Polymerization initiator: OXE-01 (manufactured by BASF) . . . 0.05 parts
Surfactant: MEGAFAC F-781 (manufactured by DIC Co., Ltd.) . . . 0.01 parts
Solvent: PGMEA . . . 11.94 parts To the curable resin composition 6 for forming a low refractive index layer, phthalocyanine dye A (Excolor TX-EX 720 manufactured by Nippon Shokubai; maximum absorption wavelength ($\lambda_{max}$)=720 nm(film)) was added to have a solid content of 5% by mass.

Additionally, the surfactant (MEGAFAC) is composed of a compound which contains a perfluoroalkyl group and has an ethylene oxide chain. The curable resin (Cyclomer PACA230AA) is a copolymer (Mw=14000, acid value 37) of methacrylic acid, and methyl methacrylate, and a monomers where an alicyclic glycidyl group is introduced to the carboxylic acid terminal of methacrylic acid.

The curable resin composition 1 for forming a low refractive index layer was coated on a 4-inch silicon wafer, and pre-baking (100° C., 2 min), and post-baking (230° C., 10 min) were performed to form a low refractive index layer.

Low refractive index layers were manufactured by using the curable resin compositions 2 to 6 for forming a low refractive index layer in the same manner as the method using the curable resin composition 1 for forming a low refractive index layer. The measurement method of the refractive index is the same as that for the high refractive index layer.

Next, on the obtained high refractive index layer, the above prepared curable resin composition 3 for forming a low refractive index layer (containing no dye) was spin-coated to form a coated film, and then pre-heating was performed at 100° C. for 2 min, and post-heating was performed at 140° C. for 10 min.

Then, likewise, formation of the high refractive index layer by the curable resin composition 1 for forming a high refractive index layer (containing phthalocyanine dye A) (10 layers, total film thickness 1.1 μm), and formation of the low refractive index layer by the curable resin composition 3 for forming a low refractive index layer (containing no dye) (10 layers, total film thickness 1.5 μm) were repeated so that an infrared ray cutoff filter 1 having a total of 20 laminates and a total film thickness of 2.6 μm was formed in which the high refractive index layers and the low refractive index layers are alternately laminated, and the high refractive index layer contains phthalocyanine dye A.

<Formation of Infrared Ray Cutoff Filter 2>

The above prepared curable resin composition 3 for forming a high refractive index layer (containing no dye) was spin-coated on a glass substrate to form a coated film, and then pre-heating was performed at 100° C. for 2 min, and post-heating was performed at 140° C. for 10 min.

Next, on the obtained high refractive index layer, the above prepared curable resin composition 1 for forming a low refractive index layer (containing phthalocyanine dye A) was spin-coated to form a coated film, and then pre-heating was performed at 100° C. for 2 min, and post-heating was performed at 140° C. for 10 min.

Then, likewise, formation of the high refractive index layer by the curable resin composition 3 for forming a high refractive index layer (containing no dye) (10 layers, total film thickness 1.1 μm), and formation of the low refractive index layer by the curable resin composition 1 for forming a low refractive index layer (containing phthalocyanine dye A) (10 layers, total film thickness 1.5 μm) were repeated so that an infrared ray cutoff filter 2 having a total of 20 laminates and a total film thickness of 2.6 μm was formed in

TABLE 35

| Composition for forming low refractive index layer | Siloxane | Amount* | Curable resin | Amount* | Hollow particles* | Dye | OXE-01* | Surfactant* | Solvent 1* | Solvent 2* | Refractive index |
|---|---|---|---|---|---|---|---|---|---|---|---|
| 1 | S-1 | 20 | — | — | — | Phthalocyanine dye A | None | 2 | PGMEA 62 | EEP 16 | 1.41 |
| 2 | S-1 | 20 | — | — | — | Cyanine dye | None | 2 | PGMEA 62 | EEP 16 | 1.41 |
| 3 | S-1 | 20 | — | — | — | None | None | 2 | PGMEA 62 | EEP 16 | 1.41 |
| 4 | S-2 | 20 | — | — | — | Phthalocyanine dye A | None | 2 | PGMEA 62 | EEP 16 | 1.41 |
| 5 | S-c1 | 20 | — | — | — | Phthalocyanine dye A | None | 2 | PGMEA 62 | EEP 16 | 1.46 |
| 6 | None | None | 230AA | 8 | 80 | Phthalocyanine dye A | 0.05 | 0.01 | PGMEA 11.94 | | 1.34 |

*% by mass based on total mass of composition

<Formation of Infrared Ray Cutoff Filter 1>

The above prepared curable resin composition 1 for forming a high refractive index layer (containing phthalocyanine dye A) was spin-coated on a glass substrate to form a coated film, and then pre-heating was performed at 100° C. for 2 min, and post-heating was performed at 140° C. for 10 min.

which the high refractive index layers and the low refractive index layers are alternately laminated, and the low refractive index layer contains phthalocyanine dye A.

<Formation of Infrared Ray Cutoff Filter 3, 1-1, 1-2, 2-1 to 2-4>

Infrared ray cutoff filters 3, 1-1, 1-2, 2-1 to 2-4 were formed in the same manner as in the infrared ray cutoff filter 1 except that contents of the curable resin composition for forming a high refractive index layer, the curable resin composition for forming a low refractive index layer, and the dye were changed as noted in the following table.

TABLE 36

| Infrared ray cutoff filter | | | | Number of layers | Total film thickness (μm) | Dye content |
|---|---|---|---|---|---|---|
| 1 | High refractive index layer | Dye | Composition 1 | 10 | 1.1 | 5% |
|   | Low refractive index layer | No dye | Composition 3 | 10 | 1.5 | None |
| 2 | High refractive index layer | No dye | Composition 3 | 10 | 1.1 | None |
|   | Low refractive index layer | Dye | Composition 1 | 10 | 1.5 | 5% |
| 3 | High refractive index layer | Dye | Composition 1 | 10 | 1.1 | 2.5% |
|   | Low refractive index layer | Dye | Composition 1 | 10 | 1.5 | 2.5% |
| 1-1 | High refractive index layer | Dye | Composition 2 | 10 | 1.1 | 5% |
|   | Low refractive index layer | No dye | Composition 3 | 10 | 1.5 | None |
| 1-2 | High refractive index layer | Dye | Composition 4 | 10 | 1.1 | 5% |
|   | Low refractive index layer | No dye | Composition 3 | 10 | 1.5 | None |
| 2-1 | High refractive index layer | No dye | Composition 3 | 10 | 1.1 | None |
|   | Low refractive index layer | Dye | Composition 2 | 10 | 1.5 | 5% |
| 2-2 | High refractive index layer | No dye | Composition 3 | 10 | 1.1 | None |
|   | Low refractive index layer | Dye | Composition 4 | 10 | 1.5 | 5% |
| 2-3 | High refractive index layer | No dye | Composition 3 | 10 | 1.1 | None |
|   | Low refractive index layer | Dye | Composition 5 | 10 | 1.5 | 5% |
| 2-4 | High refractive index layer | No dye | Composition 3 | 10 | 1.1 | None |
|   | Low refractive index layer | Dye | Composition 6 | 10 | 1.5 | 5% |

<Evaluation of Infrared Ray Cutoff Filter>
(Evaluation of Near Infrared Ray Shielding Property, Evaluation of Infrared Ray Shielding Property)

The transmittance at a wavelength 700 nm of the infrared ray cutoff filter obtained as described above was measured using an ultraviolet-visible-near-infrared spectrophotometer UV3600 (manufactured by Shimadzu Corporation). When the value is lower, the near infrared ray shielding property is evaluated to be excellent. For the transmittance at a wavelength of 700 nm, it can be said that a visible light transmittance of 10% or less practically indicates a good near infrared ray shielding property.

Further, the transmittance at a wavelength 1300 nm of the infrared ray cutoff filter was measured using a spectrophotometer U-4100 (manufactured by Hitachi High-Technologies Corporation). When the value is lower, the infrared ray shielding property is evaluated to be excellent. It can be said that an infrared ray transmittance lower than 25% practically indicates a good infrared ray shielding property. In any one of infrared ray cutoff filters, good results satisfying these were obtained.

<Fabrication of Solid-State Imaging Device>

First, a wafer formed with a CMOS sensor was prepared. The CMOS sensor includes a plurality of light receiving elements which are two-dimensionally arranged at a predetermined arrangement pitch on a substrate (at a pixel light receiving portion pitch 2.0 μm, from a photodiode (light receiving portion size 1.0 μm×1.0 μm) of 2592 pixels (X axis direction)×1944 pixels (Y axis direction)), an insulating layer (silicon oxide) having a wiring layer made of Al and a light shielding layer, a passivation layer (silicon nitride), and a waveguide (silicon nitride). In the CMOS sensor, the thickness of the passivation layer was 0.3 μm, the thickness of the insulating layer interposed between the passivation layer and the waveguide was 0.3 μm, and the thickness of the waveguide was 2.1 μm. An inlet planar dimension of the waveguide was 1.5 μm×1.5 μm, and an outlet planar dimension was the same as that of the photodiode, that is, 1.0 μm×1.0 μm. When the refractive index of each of the passivation layer, the insulating layer, and the waveguide was measured by an spectroscopic ellipsometer, the refractive index of the passivation layer was 2.0, the refractive index of the insulating layer was 1.46, the refractive index of the waveguide was 1.88, and the refractive index of the insulating layer at the outside of the waveguide was 1.46. In the following, the values of the refractive index are values at a wavelength 550 nm, unless a wavelength is not particularly specified.

(Formation of Lower Planarization Layer)

On the passivation layer, a photocurable acrylic transparent resin material (CT-2020 L manufactured by Fujifilm Electronic Materials Co., Ltd.) was spin-coated, and then pre-baking, UV entire surface exposure, and post-baking were performed to form a lower planarization layer (thickness 0.3 μm). On the lower planarization layer, a refractive index was measured as described above. As a result, the refractive index was 1.56.

(Formation of Color Filter)

As for negative-type photosensitive red, green and blue materials (materials for R, G, and B), following materials were prepared.

Material for R: SR-4000 L manufactured by Fujifilm Electronic Materials Co., Ltd.

Material for G: SG-4000 L manufactured by Fujifilm Electronic Materials Co., Ltd.

Material for B: SB-4000 L manufactured by Fujifilm Electronic Materials Co., Ltd.

In a formation order of G, R, and B, the above described materials were spin-coated, and then pre-baking, exposure using 1/5 reduction-type i-line stepper, developing, and post-baking were performed to form a color filter (film thickness 0.8 μm). That is, first, on the lower planarization layer, a material for G was coated, exposed and developed, and then post-baking was performed (220° C., for 10 min) to form a green filter in a checkered form. Then, a material for R was coated to cover the green filter, exposed and developed using a photomask, and then post-baking was performed (220° C., for 10 min) to form a red filter. Then, a material for B was coated to cover the red filter and the green filter, exposed and developed using a photomask, and then post-baking was performed (220° C., for 10 min) to form a blue filter.

As for a developer, a 50% dilution of CD-2000 manufactured by Fujifilm Electronic Materials Co., Ltd. was used.

On each color filter of the formed color filters, the refractive index was measured as described above. As a result, the refractive index of the red filter was 1.59 (wavelength 620 nm), the refractive index of the green filter was 1.60 (wavelength 550 nm), and the refractive index of the blue filter was 1.61 (wavelength 450 nm).

(Formation of Upper Planarization Layer)

On the color filter, a photocurable acrylic transparent resin material (CT-2020 L manufactured by Fujifilm Electronic Materials Co., Ltd.) was spin-coated, and then pre-baking, UV entire surface exposure, and post-baking were performed to form an upper planarization layer. The thickness of the formed upper planarization layer was 0.3 μm, and the refractive index measured as described above was 1.56.

(Formation of Microlens)

On the upper planarization layer, MFR401L manufactured by JSR Co., Ltd. as a microlens material was spin-coated, and then pre-baking, exposure using 1/5 reduction-type i-line stepper, developing, post-exposure, melt flow by post-baking were performed to form a microlens (height 0.675 μm). The refractive index of the formed microlens was measured as described above and as a result, the value was 1.61. As for a developer, a solution of 1.19% by mass of tetramethylammonium hydrooxide (TMAH) was used.

Then, a window opening of a bonding pad portion was performed. That is, a positive resist (positive resist PFI-27 for i-line manufactured by Sumitomo Chemical Co., Ltd.) was spin-coated, and then, pre-baking was performed, and exposure and developing were performed using a photomask which has a pattern corresponding to the bonding pad portion and a scribing portion. Accordingly, a resist pattern having an opening in the bonding pad portion and the scribing portion was formed, and oxygen ashing was performed using the resist pattern as a mask, and the planarization layer on the corresponding portion was removed by etching. Then, the positive resist was removed by a resist stripper.

<Formation of Infrared Ray Cutoff Filter>

On the obtained solid-state imaging device, an infrared ray cutoff filter was formed in the same manner as in the infrared ray cutoff filter 1.

Then, dicing of the wafer was performed and package assembly was performed to manufacture the solid-state imaging device A of the present invention.

<Evaluation of Solid-State Imaging Device>

(Measurement and Evaluation of Incident Angle Dependence)

A camera lens was combined with the solid-state imaging device manufactured as described above, and relative sensitivities were measured at respective green pixels having principal ray incident angles of 5°, 10°, 15°, 20°, 25° and 30° when the sensitivity in the effective imaging area (principal ray incident angle 0°) was 100%. From the result, it was found that shading was suppressed.

As described above, according to the curable resin composition for forming a high refractive index layer or a low refractive index layer of the present invention, it is determined that it is possible to create an infrared ray cutoff filter excellent in a near infrared ray shielding property and an infrared ray shielding property.

Also, in the curable resin composition for forming a high refractive index layer or a low refractive index layer of the present invention, the high refractive index layer or the low refractive index layer may be formed by coating. At this point, an infrared ray cutoff filter may be manufactured without requiring a complicated process, and thus the above described insufficient production suitability in the conventional infrared ray cutoff filter may be improved.

As described above, the curable resin composition for forming a high refractive index layer or a low refractive index layer of the present invention is suitable for manufacturing a camera module which has a substrate, and an infrared ray cutoff filter disposed at a light receiving side of the substrate.

INDUSTRIAL APPLICABILITY

According to the present invention, it is possible to provide a curable resin composition capable of forming an infrared ray cutoff filter which has a near infrared light shielding property, and an infrared light shielding property without vapor deposition, and the infrared ray cutoff filter obtained using the same.

According to the present invention, by using the curable resin composition, the infrared ray cutoff filter, and the surface of the substrate in the solid-state imaging device may be brought into close contact with each other with no intervening space, and thus the solid-state imaging device with a suppressed color-shading may be provided.

While the present invention has been described in detail with reference to specific embodiments, it is apparent to those skilled in the art that various changes and modifications may be made without departing from the spirit and scope of the invention.

This application is based on Japanese Patent Application (Japanese Patent Application No. 2012-288697) filed Dec. 28, 2012, the contents of which are incorporated herein by reference.

What is claimed is:

1. An infrared ray cutoff filter comprising:
   two or more high refractive index layers with a refractive index ranging from 1.65 to 2.00, and
   two or more low refractive index layers with a refractive index ranging from 1.20 to 1.45,
   wherein at least one layer of the two or more high refractive index layers and the two or more low refractive index layers contains a dye having a maximum absorption wavelength in a range of 600 nm to 820 nm, and
   the two or more low refractive index layers are a plurality of kinds of layers which have different thickness within a range of 50 nm to 250 nm.

2. The infrared ray cutoff filter according to claim 1, wherein the high refractive index layers and the low refractive index layers are alternately laminated.

3. The infrared ray cutoff filter according to claim 1, wherein the two or more high refractive index layers are a plurality of kinds of layers which have different refractive indexes within a range of 1.65 to 2.00.

4. The infrared ray cutoff filter according to claim 1, wherein the two or more high refractive index layers are a plurality of kinds of layers which have different film-thicknesses within a range of 50 nm to 250 nm.

5. The infrared ray cutoff filter according to claim 1, wherein the two or more low refractive index layers are a plurality of kinds of layers which have different refractive indexes within a range of 1.20 to 1.45.

6. The infrared ray cutoff filter according to claim 1, wherein a number of laminations of the two or more high refractive index layers and the two or more low refractive index layers ranges from 4 to 60.

7. A solid-state imaging device comprising, on a substrate, the infrared ray cutoff filter according to claim 1.

8. The solid-state imaging device according to claim 7, wherein the substrate has a color filter layer.

9. The infrared ray cutoff filter according to claim 6, wherein the number of laminations of the two or more high refractive index layers and the two or more low refractive index layers ranges from 8 to 50.

10. The infrared ray cutoff filter according to claim 6, wherein the number of laminations of the two or more high refractive index layers and the two or more low refractive index layers ranges from 10 to 40.

* * * * *